United States Patent
Imai et al.

(10) Patent No.: US 10,005,905 B2
(45) Date of Patent: Jun. 26, 2018

(54) MOLDING MATERIAL, PREPREG, FIBER-REINFORCED COMPOSITE MATERIAL, FIBER-REINFORCED COMPOSITE MATERIAL LAMINATE, AND PROCESS FOR PRODUCTION OF FIBER-REINFORCED MOLDING BASE MATERIAL

(75) Inventors: Naokichi Imai, Iyo-gun (JP); Kaori Narimatsu, Iyo-gun (JP); Masato Honma, Otsu (JP); Shunsuke Horiuchi, Nagoya (JP); Koji Yamauchi, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 997 days.

(21) Appl. No.: 13/997,451

(22) PCT Filed: Jan. 11, 2012

(86) PCT No.: PCT/JP2012/050316
§ 371 (c)(1),
(2), (4) Date: Jul. 15, 2013

(87) PCT Pub. No.: WO2012/096273
PCT Pub. Date: Jul. 19, 2012

(65) Prior Publication Data
US 2013/0295806 A1 Nov. 7, 2013

(30) Foreign Application Priority Data

Jan. 14, 2011 (JP) .................................. 2011-005731
Jan. 14, 2011 (JP) .................................. 2011-005732
(Continued)

(51) Int. Cl.
*C08L 81/04* (2006.01)
*C08J 3/22* (2006.01)
(Continued)

(52) U.S. Cl.
CPC .............. *C08L 81/04* (2013.01); *B29B 15/12* (2013.01); *B29B 15/125* (2013.01); *B29B 15/14* (2013.01);
(Continued)

(58) Field of Classification Search
CPC ....... B29B 15/12; B29B 15/125; B29B 15/14; C08L 81/04; Y10T 428/2958; Y10T 442/20
(Continued)

(56) References Cited

U.S. PATENT DOCUMENTS

| | | | |
|---|---|---|---|
| 4,489,129 A | 12/1984 | Shue et al. | |
| 4,841,018 A * | 6/1989 | Gaughan | C08G 75/04 528/212 |
| 2012/0165501 A1* | 6/2012 | Kaiho | C08G 75/06 528/373 |

FOREIGN PATENT DOCUMENTS

| | | |
|---|---|---|
| JP | 59-33330 | 2/1984 |
| JP | 05-039371 | 2/1993 |

(Continued)

OTHER PUBLICATIONS

Machine translation of jp08208849.*
(Continued)

*Primary Examiner* — Vincent Tatesure
(74) *Attorney, Agent, or Firm* — RatnerPrestia

(57) ABSTRACT

A molding material is provided including a composite having 1 to 50 wt % of (A) a bundle of continuous reinforcing fibers and 0.1 to 40 wt % of (B) a polyarylene sulfide prepolymer or (B') a polyarylene sulfide; and 10 to 98.9 wt % of (C) a thermoplastic resin adhered to the composite; wherein the composite further has (D) a zero-valent transition metal compound or (E) a low-valent iron compound in an amount of 0.001 to 20 mol % based on the
(Continued)

amount of sulfur atoms contained in the component (B) or (B'). A prepreg and a method of producing a fiber-reinforced molding base material is also provided. By using the molding material according to the present invention which exhibits excellent economic efficiency and productivity, a molded article having excellent mechanical characteristics can be easily produced.

14 Claims, 3 Drawing Sheets

(30) Foreign Application Priority Data

Jan. 14, 2011 (JP) .................................. 2011-005733
Jan. 14, 2011 (JP) .................................. 2011-005734

(51) Int. Cl.
*C08J 5/24* (2006.01)
*B29B 15/14* (2006.01)
*B29B 15/12* (2006.01)
*C08J 5/10* (2006.01)

(52) U.S. Cl.
CPC .................. *C08J 3/226* (2013.01); *C08J 5/10* (2013.01); *C08J 5/24* (2013.01); *C08J 2381/04* (2013.01); *C08J 2481/04* (2013.01); *Y10T 428/2958* (2015.01); *Y10T 442/20* (2015.04)

(58) Field of Classification Search
USPC .................................. 442/59; 428/389, 292.1
See application file for complete search history.

(56) References Cited

FOREIGN PATENT DOCUMENTS

| | | | |
|---|---|---|---|
| JP | 08-118489 | | 5/1996 |
| JP | 08-208849 | | 8/1996 |
| JP | 08208849 | * | 8/1996 |
| JP | 09-025346 | | 1/1997 |
| JP | 09-194592 | | 7/1997 |
| JP | 10-138379 | | 5/1998 |
| JP | 2008231292 A | * | 2/2008 |
| JP | 2008-163223 | | 7/2008 |
| JP | 2008163223 A | * | 7/2008 |
| JP | 2008-231237 | | 10/2008 |
| JP | 2008-231289 | | 10/2008 |
| JP | 2008-231291 | | 10/2008 |
| JP | 2008-231292 | | 10/2008 |
| JP | 2010-196018 | | 9/2010 |
| WO | WO 2008-114573 | | 9/2008 |
| WO | WO 2011-013686 | | 2/2011 |

OTHER PUBLICATIONS

Machine translation of jp2008231292.*
Machine translation of JP2008-163223a.*
International Search Report for International Application No. PCT/JP2012/050316 dated Mar. 27, 2012.

* cited by examiner

[Fig. 1]
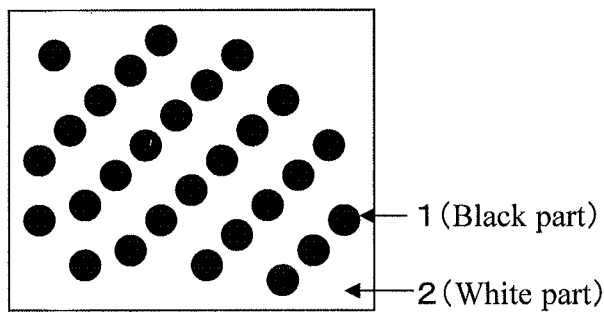
1 (Black part)
2 (White part)
[Fig. 2]
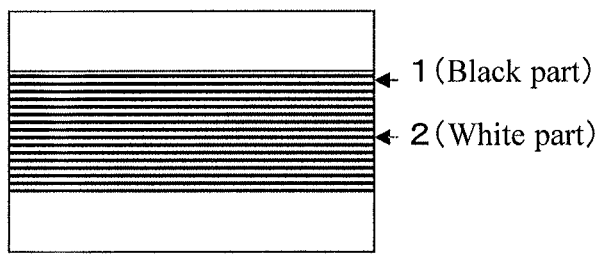
1 (Black part)
2 (White part)
[Fig. 3]
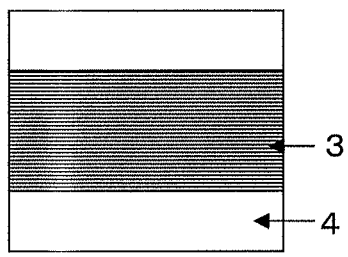
3
4
[Fig. 4]
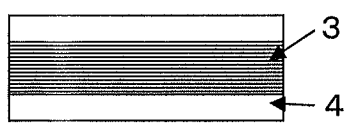
3
4
[Fig. 5]
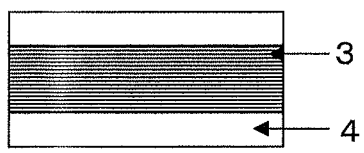
3
4

[Fig. 6]
[Fig. 7]
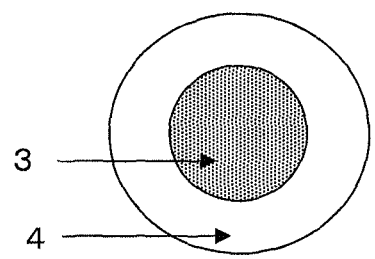
[Fig. 8]
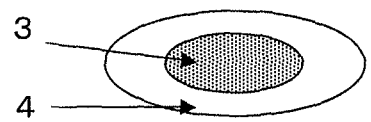
[Fig. 9]
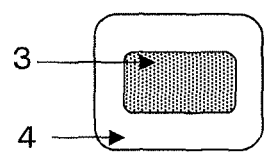
[Fig. 10]
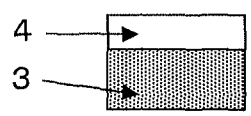
[Fig. 11]
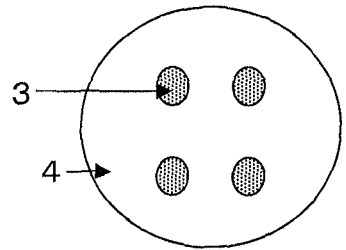

[Fig. 12]
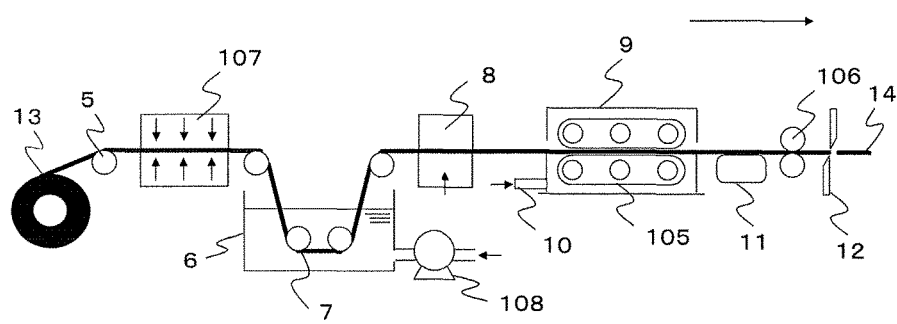
[Fig. 13]
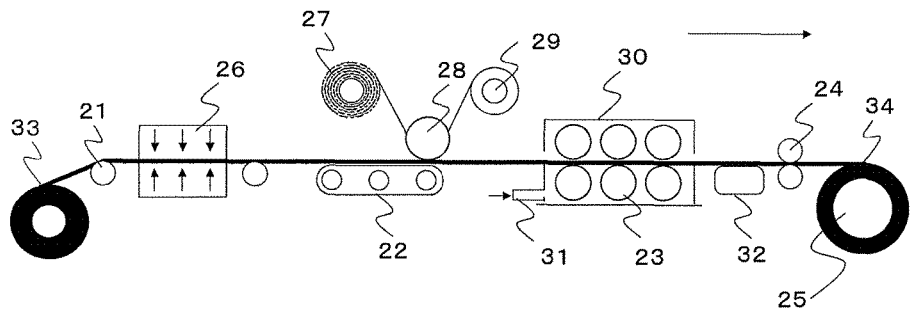
[Fig. 14]
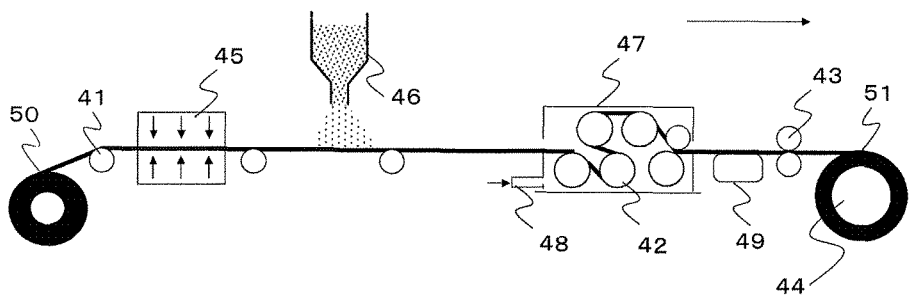

MOLDING MATERIAL, PREPREG, FIBER-REINFORCED COMPOSITE MATERIAL, FIBER-REINFORCED COMPOSITE MATERIAL LAMINATE, AND PROCESS FOR PRODUCTION OF FIBER-REINFORCED MOLDING BASE MATERIAL

CROSS-REFERENCE TO RELATED APPLICATIONS

This application is a U.S. National Phase Application of PCT International Application No. PCT/JP2012/050316, filed Jan. 11, 2012, which claims priority to Japanese Patent Application No. 2011-005731, filed Jan. 14, 2011; Japanese Patent Application No. 2011-005732, filed Jan. 14, 2011; Japanese Patent Application No. 2011-005733, filed Jan. 14, 2011; and Japanese Patent Application No. 2011-005734, filed Jan. 14, 2011, the contents of each of these applications being incorporated by reference herein in their entireties for all purposes.

FIELD OF INVENTION

The present invention relates to: a molding material having excellent heat resistance, productivity, handling property and moldability; a prepreg useful for preparing a high-performance fiber-reinforced composite material; and methods of producing a fiber-reinforced composite material, a fiber-reinforced composite material laminate and a fiber-reinforced molding base material which utilize the molding material or the prepreg and are suitable for aerospace and general industrial applications.

BACKGROUND OF THE INVENTION

As molding materials comprising a bundle of continuous reinforcing fibers and a thermoplastic resin as matrix resins, a wide variety of forms, such as thermoplastic prepregs, yarns and glass mats (GMT), are known. Such molding materials are characterized in that they are easily molded because of the properties of the thermoplastic resin; that they do not impose burden of storage as in the case of a thermosetting resin; and that they yield molded articles having high toughness and excellent recyclability. Particularly, those molding materials processed into the form of a pellet can be applied to a molding method having excellent economical efficiency and productivity, such as injection molding and stamping molding; therefore, such molding materials are useful as industrial materials.

However, for impregnating a bundle of continuous reinforcing fibers with a thermoplastic resin in the process of producing a molding material, there are problems in terms of the economical efficiency and the productivity; therefore, such a technique is not widely employed at present. For example, it is well known that impregnation of a resin into a bundle of reinforcing fibers becomes more difficult as the melt viscosity of the resin increases. A thermoplastic resin having excellent mechanical characteristics such as toughness and elasticity is a polymer having a particularly high molecular weight. As compared to a thermosetting resin, a thermoplastic resin has a higher viscosity and requires a higher processing temperature; therefore, it is unsuitable for producing a molding material with ease and good productivity.

Meanwhile, when a low-molecular-weight, that is, low-viscosity thermoplastic resin is used as a matrix resin because of the ease of impregnation, there is a problem that the resulting molded article has considerably inferior mechanical characteristics.

A fiber-reinforced composite material composed of reinforcing fibers and a matrix resin is light-weight and capable of providing excellent strength characteristics. Further, by controlling the fiber orientation, the resulting composite material can have an arbitrary strength design. Therefore, such fiber-reinforced material is widely used in, for example, sports applications such as golf club shafts and fishing rods; aerospace applications such as aircraft components and satellite parts; and general industrial applications such as automobiles, ships, electrical and electronic instruments, robot parts, windmills, tanks, bathtubs and helmets. Further, in the production of a fiber-reinforced composite material, a method in which a prepreg comprising reinforcing fibers impregnated with a matrix resin in advance is used as an intermediate substrate and laminated to produce a laminate is widely employed because the fiber content in the resulting laminate is generally easily increased and the laminate is relatively easy to hand. In prepregs, as a matrix resin to be impregnated into reinforcing fibers, a thermosetting resin such as an unsaturated polyester resin, a vinylester resin or an epoxy resin is often used because of the ease of impregnation into a fiber bundle. However, a thermosetting resin is cured to become an insoluble and infusible polymer having a three-dimensional mesh structure and such a polymer is difficult to recycle; therefore disposal thereof presents a more serious problem.

Meanwhile, as a thermoplastic matrix resin of a prepreg, a variety of resins such as polyethylene, polyester, polyamide and polycarbonate can be employed. In those applications where high performance is required, such as aerospace applications, polyether ether ketone, polyether imide, polyphenylene sulfide and the like, which are excellent in terms of the heat resistance, chemical resistance and mechanical properties, are preferably employed, and polyarylene sulfides such as polyphenylene sulfide are particularly preferably employed.

However, since such thermoplastic resin prepregs have a higher molecular weight as compared to that of a thermosetting resin, a high-temperature and high-pressure condition is required in the process of impregnating the matrix resin into a fiber bundle. A prepreg having a high fiber content is difficult to produce and there are 1.0 problems that, for example, the resulting prepregs are often non-impregnated prepregs and their mechanical properties are not satisfactory.

A fiber-reinforced composite material composed of a continuous reinforcing fiber substrate and a matrix resin is light-weight and has excellent mechanical characteristics. Therefore, such composite material is widely used in sporting goods, aerospace applications, general industrial applications and the like. Particularly, s composite material comprising a carbon fiber as a reinforcing fiber (CFRP) has a specific strength and a specific rigidity that are superior to those of metal materials; therefore, such composite material has been increasingly used primarily in aerospace applications. Conventionally, thermosetting resins have been preferably used as matrix resins because of their good impregnation into a reinforcing fiber base materials. A thermoplastic resin is a polymer having a high molecular weight and, as compared to a thermosetting resin, a thermoplastic resin has a higher viscosity and requires a higher processing temperature. Therefore, a thermoplastic resin is unsuitable for producing a fiber-reinforced molding base material with ease and good productivity.

In recent years, however, composite materials comprising a thermoplastic resin as a matrix resin have been drawing attention in various applications because they effectively shorten the molding time and molded articles obtained therefrom are advantageously recycled and have excellent post-processability for thermal adhesion, thermal reformation and the like. Among thermoplastic resins, a polyarylene sulfide has high elastic modulus and heat resistance as well as excellent fluidity. Therefore, a polyarylene sulfides can be suitably in a fiber-reinforced composite material from the standpoint of improving the mechanical characteristics of the resulting molded article. Accordingly, there is a demand for a more economical and productive method of producing a fiber-reinforced molding base material comprising a continuous reinforcing fiber substrate and a polyarylene sulfide.

PATENT DOCUMENTS

Patent Document 1 proposes a method of producing a molding material in which, in order to easily impregnate a bundle of continuous reinforcing fibers with a thermoplastic resin, the fibers are first impregnated with a low-molecular-weight thermoplastic resin and then integrated with a high-molecular-weight thermoplastic resin.

Patent Document 2 discloses a molding material in which a high-molecular-weight thermoplastic resin is arranged in contact with a composite comprising a polyarylene sulfide prepolymer and a continuous reinforcing fiber. A polyarylene sulfide prepolymer is an excellent material which easily impregnates into a bundle of reinforcing fibers and thereby improves the productivity of a molding material. In addition, a polyarylene sulfide prepolymer is easily dispersed in or compatibilized with a matrix resin to improve the dispersion of a reinforcing fiber into the resulting molded article.

Patent Document 3 discloses a molding material in which a high-molecular-weight thermoplastic resin is arranged in contact with a composite comprising a high-molecular-weight polyarylene sulfide and a continuous reinforcing fiber. This molding material comprises a high-molecular-weight polyarylene sulfide having a small heat loss; therefore, it exhibits excellent heat resistance and is not likely to generate decomposition gas.

Patent Document 4 discloses a method of producing a prepreg in which impregnation of polyarylene sulfides into a glass fiber mat is facilitated by preparing a slurry of the polyarylene sulfides in a dispersion medium. Furthermore, Patent Document 5 discloses a method of producing a laminate without using a prepreg, in which method a polyarylene sulfide of a relatively low molecular weight is made into the form of a sheet and laminated with a fiber base material.

In Patent Document 6, a prepreg prepared by impregnating a reinforcing fiber with a low-molecular-weight cyclic polyarylene sulfide is disclosed. This method can yield a prepreg having excellent impregnation property, and a laminate having excellent mechanical properties can be obtained by heat-polymerizing the cyclic polyarylene sulfide.

Patent Document 7 proposes a method in which a thermoplastic resin is impregnated into a bundle of reinforcing fibers by arranging a film of crystalline thermoplastic resin on the backside of a sheet-form base material composed of continuous reinforcing fibers and then applying thereto a pressure of 5 to 30 kg/cm$^2$ (about 0.5 to 3 MPa) at a temperature 150° C. higher than the melting point of the resin.

Patent Document 8 discloses a method of producing a fiber-reinforced molding base material which comprises compositing a bundle of continuous reinforcing fibers with a low-molecular-weight cyclic polyarylene sulfide and heating the resulting composite to 200 to 450° C., thereby polymerizing the cyclic polyarylene sulfide into a high-molecular-weight polyarylene sulfide. This is an excellent production method by which a fiber-reinforced molding base material comprising a bundle of continuous reinforcing fibers and a high-molecular-weight polyarylene sulfide can be easily produced with good productivity.

[Patent Document 1] JP H10-138379A
[Patent Document 2] JP 2008-231291A
[Patent Document 3] JP 2008-231292A
[Patent Document 4] JP HS-39371A
[Patent Document 5] JP H9-25346A
[Patent Document 6] JP 2008-231237A
[Patent Document 7] JP H8-118489A
[Patent Document 8] JP 2008-231289A

SUMMARY OF THE INVENTION

In the method disclosed in Patent Document 1, satisfactory impregnation property is attained by using a low-molecular-weight thermoplastic resin; however, this method presents such problems that the handling property of the resulting molding material is not satisfactory and that the properties of a molded article are difficult to improve.

The molding material disclosed in Patent Document 2 has a problem in that, since the polyarylene sulfide prepolymer has a low molecular weight, the added amount thereof and the mechanical properties of the resulting molded article are in a trade-off relationship. As a method for further improving the productivity and the moldability of this molding material, it is thought to further increase the amount of the polyarylene sulfide prepolymer to be used. There is an increasing demand for a technology by which a molded article having excellent mechanical characteristics can be obtained even under such circumstances.

Furthermore, since fiber-reinforced composite materials are now used in harsher environments, higher heat resistance is demanded in matrix resins.

Under such condition, since a low-molecular-weight thermoplastic resin generate decomposition gas by undergoing a thermal decomposition reaction at the mold-processing temperature, there arise problems that a special equipment must be installed in order to prevent the generated decomposition gas from contaminating the vicinity of the molding equipment and that the decomposition gas forms voids in the resulting molded article to cause deterioration in the mechanical characteristics. Therefore, there is also an increasing demand for a molding material which has excellent heat resistance and is not likely to generate decomposition gas.

In the molding material disclosed in Patent Document 3, there is a problem that polymerization of the high-molecular-weight polyarylene sulfide requires a high-temperature heating process. Accordingly, from standpoints of the industrial economical efficiency and productivity, a molding material which can be easily produced is increasingly demanded.

In method disclosed in Patent Document 4, not only equipments and time are required for drying the dispersion medium, but also it is difficult to remove the dispersion medium completely; therefore, the method has a problem in that satisfactory mechanical properties are not attained due to the voids generated by evaporation of the dispersion medium during the lamination and molding steps. In addition, the method disclosed in Patent Document 5 also has problems in that the molding is required to be carried out in a high-temperature and high-pressure condition and that satisfactory mechanical properties are not attained due to a defect such as absence of impregnation.

In the prepreg disclosed in Patent Document 6, from the standpoints of the industrial economical efficiency and productivity, there is an increasing demand for a method capable of producing a fiber-reinforced molding base material at a lower temperature in a shorter time.

In the method disclosed in Patent Document 7, since a severely high temperature is required for impregnation of the thermoplastic resin and such temperature induces thermal decomposition of the resin, the properties of the resulting molded article cannot be sufficiently improved and it is difficult to produce a molding base material in an economical and productive manner.

In the method disclosed in Patent Document 8, from the standpoints of the industrial economical efficiency and productivity, there is an increasing demand for a method capable of producing a fiber-reinforced molding base material at a lower temperature in a shorter time.

In an attempt to make improvements in the above-described drawbacks of the prior art, the present invention provides a molding material which comprises a bundle of continuous reinforcing fibers and a thermoplastic resin and exhibits excellent productivity, handling property and moldability; and a molding material which, when injection molded, sufficiently allows its reinforcing fibers to disperse into the resulting molded article, from which molding material a molded article having excellent heat resistance and mechanical characteristics can be easily produced with generation of decomposition gas being inhibited.

The present invention also provides, with good productivity, a prepreg with which the above-described problems are solved and a laminate having excellent moldability and mechanical properties can be produced. The present invention also provides, using the prepreg, a fiber-reinforced composite material having excellent mechanical properties and flame retardancy.

Further, in an attempt to make improvements in the prior art, the present invention also provides a method of producing a fiber-reinforced molding base material which comprises a continuous reinforcing fiber substrate and a polyarylene sulfide more easily with good productivity.

In order to solve the above-described problems, the molding material according to embodiments of the present invention has either of the following constitutions. That is, A molding material comprising: a composite comprising 1 to 50 wt % of (A) a bundle of continuous reinforcing fibers and 0.1 to 40 wt % of (B) a polyarylene sulfide prepolymer or (B') a polyarylene sulfide; and 10 to 98.9 wt % of (C) a thermoplastic resin adhered to the composite; wherein the composite further comprises (D) a zero-valent transition metal compound in an amount of 0.001 to 20 mol % based on the amount of sulfur atoms contained in the component (B) or (B'); or A molding material comprising: a composite comprising 1 to 50 wt % of (A) a bundle of continuous reinforcing fibers and 0.1 to 40 wt % of (B) a polyarylene sulfide prepolymer or (B') a polyarylene sulfide; and 10 to 98.9 wt % of (C) a thermoplastic resin adhered to the composite; wherein the composite further comprises (E) a low-valent iron compound in an amount of 0.001 to 20 mol % based on the amount of sulfur atoms contained in the component (B) or (B').

Further, in order to solve the above-described problems, the prepreg according to embodiments of the present invention has either of the following constitutions. That is, A prepreg comprising (A') a reinforcing fiber substrate impregnated with a resin composition, wherein the resin composition comprises (B) a polyarylene sulfide prepolymer or (B') a polyarylene sulfide, which resin composition further comprises (D) a zero-valent transition metal compound in an amount of 0.001 to 20 mol % based on the amount of sulfur atoms contained in the component (B) or (B'); and wherein the content of the (A') reinforcing fiber substrate is 60 to 80 wt %; or A prepreg comprising (A') a reinforcing fiber substrate impregnated with a resin composition, wherein the resin composition comprises (B) a polyarylene sulfide prepolymer or (B') a polyarylene sulfide, which resin composition further comprises (E) a low-valent iron compound in an amount of 0.001 to 20 mol % based on the amount of sulfur atoms contained in the component (B) or (B'); and wherein the content of the (A') reinforcing fiber substrate is 60 to 80 wt %.

In order to solve the above-described problems, the fiber-reinforced composite material according to embodiments of the present invention has the following constitution. That is, A fiber-reinforced composite material, which is obtained by polymerizing the resin composition contained in the above-described prepreg, which resin composition contains the above-described polyarylene sulfide prepolymer.

Further, in order to solve the above-described problems, the fiber-reinforced composite material according to embodiments of the present invention has the following constitution. That is, A fiber-reinforced composite material laminate, which is obtained by laminating the above-described prepreg and then polymerizing the above-described resin composition containing the above-described polyarylene sulfide prepolymer.

In order to solve the above-described problems, the method of producing a fiber-reinforced molding base material according to embodiments of the present invention has either of the following constitution. That is, A method of producing a fiber-reinforced molding base material, the method comprising the steps of: (I) withdrawing and continuously feeding (A') a continuous reinforcing fiber substrate; (II) compositing the component (A') with (B) a polyarylene sulfide prepolymer; (III) heating the thus obtained composite to convert the component (B) into (B') a polyarylene sulfide; and (IV) cooling and taking up the resulting composite; wherein in the step (III), the component (B) is converted into the component (B') by polymerizing the component (B) under heat in the presence of (D) a zero-valent transition metal compound; or A method of producing a fiber-reinforced molding base material, said method comprising the steps of: (I) withdrawing and continuously feeding (A') a continuous reinforcing fiber substrate; (II) compositing the component (A') with (B) a polyarylene sulfide prepolymer; (III) heating the thus obtained composite to convert the component (B) into (B') a polyarylene sulfide; and (IV) cooling and taking up the resulting composite; wherein in the step (III), the component (B) is converted into the component (B') by polymerizing the component (B) under heat in the presence of (E) a low-valent iron compound.

In the molding material according to the present invention, it is preferred that the above-described component (D) be a compound which contains a metal belonging to one of Groups 8 to 11 and one of Periods 4 to 6 of periodic table.

In the molding material according to the present invention, it is preferred that the above-described component (D) be a compound containing palladium and/or nickel.

In the molding material according to the present invention, it is preferred that the above-described component (E) be a divalent iron compound.

In the molding material according to the present invention, it is preferred that the above-described component (B') be a polyarylene sulfide obtained by heat-polymerization of the above-described component (B).

In the molding material according to the present invention, it is preferred that the above-described component (B) contain a cyclic polyarylene sulfide in an amount of at least 50 wt % and have an weight-average molecular weight of less than 10,000.

In the molding material according to the present invention, it is preferred that the above-described component (B') be a polyarylene sulfide which has a weight-average molecular weight of not less than 10,000 and a dispersion degree, which is represented by weight-average molecular weight/number-average molecular weight, of not higher than 2.5.

In the molding material according to the present invention, it is preferred that the weight reduction by heating of the component (B') satisfies the following equation:

$$\Delta Wr=(W1-W2)/W1\times 100\leq 0.20(\%)$$

(wherein, $\Delta Wr$ represents a weight reduction rate (%) which is calculated from a sample weight (W2) at 330° C. based on a sample weight (W1) at 100° C., the samples weights being determined by a thermogravimetric analysis where the sample is heated from 50° C. to an arbitrary temperature of not lower than 330° C. at a heating rate of 20° C./min in a non-oxidizing atmosphere under atmospheric pressure).

In the molding material according to the present invention, it is preferred that the above-described component (A) contain at least 10,000 carbon fiber monofilaments.

In the molding material according to the present invention, it is preferred that the above-described component (C) be at least one selected from polyamide resins, polyether imide resins, polyamide imide resins, polyether ether ketone resins and polyphenylene sulfide resins.

In the molding material according to the present invention, it is preferred that the above-described component (A) be arranged substantially parallel to the direction of the shaft center and have substantially the same length as the molding material.

It is preferred that the molding material according to the present invention have a core-in-sheath structure in which the above-described composite comprising the above-described component (A), the above-described component (B) or (B') and the above-described component (D) or (E) low-valent iron compound constitutes a core structure and the above-described component (C) surrounds the composite.

It is preferred that the molding material according to the present invention be in the form of a long-fiber pellet.

In the prepreg according to the present invention, it is preferred that the above-described component (D) be a compound which contains a metal belonging to one of Groups 8 to 11 and one of Periods 4 to 6 of periodic table.

In the prepreg according to the present invention, it is preferred that the above-described component (D) be a compound containing palladium and/or nickel.

In the prepreg according to the present invention, it is preferred that the above-described component (E) be a divalent iron compound.

In the prepreg according to the present invention, it is preferred that the above-described component (B) contain a cyclic polyarylene sulfide in an amount of at least 50 wt % and have a weight-average molecular weight of less than 10,000.

In the method of producing a fiber-reinforced molding base material according to the present invention, it is preferred that the above-described component (D) be a compound which contains a metal belonging to one of Groups 8 to 11 and one of Periods 4 to 6 of periodic table.

In the method of producing a fiber-reinforced molding base material according to the present invention, it is preferred that the above-described component (D) be a compound containing palladium and/or nickel.

In the method of producing a fiber-reinforced molding base material according to the present invention, it is preferred that the above-described component (E) be a divalent iron compound.

In the method of producing a fiber-reinforced molding base material according to the present invention, it is preferred that the conversion rate of the above-described component (B) into the above-described component (B') in the step (III) be 70% or higher.

In the method of producing a fiber-reinforced molding base material according to the present invention, it is preferred that the above-described steps (I) to (IV) be performed on-line.

In the method of producing a fiber-reinforced molding base material according to the present invention, it is preferred that, in the step (III), the above-described component (B) be polymerized at a temperature of 180 to 320° C.

In the method of producing a fiber-reinforced molding base material according to the present invention, it is preferred that the ratio of the above-described component (B') be 10 to 90 wt % with respect to 100 wt % of the fiber-reinforced molding base material.

By using the molding material according to the present invention, which comprises (B) a polyarylene sulfide prepolymer and exhibits excellent economical efficiency and productivity, a molded article having excellent mechanical characteristics can be easily produced.

By using the molding material according to the present invention which comprises (B') a polyarylene sulfide, a molded article which exhibits good dispersion of reinforcing fibers therein when injection-molded and has excellent heat resistance and mechanical characteristics can be easily produced without generating any environmental pollution.

The prepreg according to the present invention exhibits excellent handling property and moldability and can have a high fiber content; therefore, it is capable of yielding a fiber-reinforced composite material having excellent mechanical properties. Further, the fiber-reinforced composite material according to the present invention not only has excellent mechanical properties but also exhibits excellent flame retardancy. Moreover, since the fiber-reinforced composite material can be produced by heating the prepreg at a low temperature for a short period of time, excellent economical efficiency, productivity and handling property can be attained.

According to the production method of the present invention, a polyarylene sulfide can be easily composited with a continuous reinforcing fiber substrate, so that the productivity can be improved by, for example, increasing the taking up rate, and the economical efficiency can be improved by lowering the processing temperature; therefore, the production method of the present invention can be suitably used to produce a fiber-reinforced molding base material such as a prepreg, a semipreg or a fabric.

BRIEF DESCRIPTION OF THE DRAWINGS

FIG. 1 is a schematic view showing one exemplary embodiment of a composite which comprises (A) a bundle of reinforcing fibers, (B) a polyarylene sulfide prepolymer or (B') a polyarylene sulfide, and (D) a zero-valent transition metal compound or (E) a low-valent iron compound.

FIG. 2 is a schematic view showing one example of preferred embodiment of the molding material according to the present invention.

FIG. 3 is a schematic view showing one example of the cross-sectional configuration of a preferred embodiment of the molding material according to the present invention in the shaft center direction.

FIG. 4 is a schematic view showing one example of the cross-sectional configuration of a preferred embodiment of the molding material according to the present invention in the shaft center direction.

FIG. 5 is a schematic view showing one example of the cross-sectional configuration of a preferred embodiment of the molding material according to the present invention in the shaft center direction, FIG. 6 is a schematic view showing one example of the cross-sectional configuration of a preferred embodiment of the molding material according to the present invention in the shaft center direction.

FIG. 7 is a schematic view showing one example of the cross-sectional configuration of a preferred embodiment of the molding material according to the present invention in the orthogonal direction.

FIG. 8 is a schematic view showing one example of the cross-sectional configuration of a preferred embodiment, of the molding material according to the present invention in the orthogonal direction.

FIG. 9 is a schematic view showing one example of the cross-sectional configuration of a preferred embodiment of the molding material according to the present invention in the orthogonal direction.

FIG. 10 is a schematic view showing one example of the cross-sectional configuration of a preferred embodiment of the molding material according to the present invention in the orthogonal direction, FIG. 11 is a schematic view showing one example of the cross-sectional configuration of a preferred embodiment of the molding material according to the present invention in the orthogonal direction.

FIG. 12 shows one example of the production apparatus used in the method of producing a fiber-reinforced molding base material according to the present invention; The arrow represents the direction of taking up a fiber-reinforced molding base material.

FIG. 13 shows one example of the production apparatus used in the method of producing a fiber-reinforced molding base material according to the present invention. The arrow represents the direction of taking up a fiber-reinforced molding base material.

FIG. 14 shows one example of the production apparatus used in the method of producing a fiber-reinforced molding base material according to the present invention. The arrow represents the direction of taking up a fiber-reinforced molding base material.

DETAILED DESCRIPTION OF EMBODIMENTS OF THE INVENTION

The molding material according to the present invention is constituted by (A) a bundle of continuous reinforcing fibers; (B) a polyarylene sulfide prepolymer or (B') a polyarylene sulfide; (C) a thermoplastic resin; and (D) a zero-valent transition metal compound or (E) a low-valent iron compound. First, these components will be each described.

<(A) Bundle of Reinforcing Fibers>

The reinforcing fiber used in the present invention is not particularly restricted, and examples thereof include carbon fibers, glass fibers, aramid fibers, boron fibers, alumina fibers, mineral fibers and silicon carbide fibers. Two or more types of these fibers may be used in combination as well, Particularly, from the standpoint of improving the mechanical characteristics of the resulting molded article, carbon fibers are preferred since they have excellent specific strength and specific rigidity. Among the above-described fibers, from the standpoint of obtaining a molded article having a light weight, high strength and high elastic modulus, it is preferred to use a carbon fiber, particularly one which has a tensile elastic modulus of 200 to 700 GPa. Moreover, since carbon fibers and metal-coated reinforcing fibers have high electrical conductivity, they are particularly preferably applied in the chassis of electronics and the like where electromagnetic wave-shielding property is required.

Further, in a more preferred embodiment of a carbon fiber, for example, the amount of surface functional groups (O/C), which is determined by X-ray photoelectron spectroscopy as an atomic ratio of oxygen (O) and carbon (C) on the fiber surface, is in the range of 0.05 to 0.4. The higher the value of O/C, the greater the amount of functional groups on the carbon fiber surface, so that the adhesion of the carbon fiber to a matrix resin can be improved. However, when the value of O/C is excessively high, there is a concern that the crystal structure of the carbon fiber surface may be disrupted. A molded article having particularly well-balanced mechanical characteristics can be obtained when the value of O/C is in the above-described preferred range.

The amount of surface functional groups (O/C) can be determined by X-ray photoelectron spectroscopy in accordance with the following procedures. First, a sizing agent and the like are removed from the carbon fiber with a solvent and the resulting carbon fiber is cut and spread on a copper sample support. Then, X-ray photoelectron spectroscopy is performed at a photoelectron emission angle of 90° C. using Mg $K_{\alpha 1,2}$ as an X-ray source with the pressure inside the sample chamber being maintained at $1 \times 10^{-8}$ Torr. As a correction of the peaks attributed to the electrostatic charge generated during the measurement, the kinetic energy value (K.E.) of the C1S main peak is adjusted to 969 eV. The area of the C1S peak is determined by drawing a straight baseline in the K.E. range of 958 to 972 eV. The area of the O1S peak is determined by drawing a straight baseline in the K.E. range of 714 to 726 eV. Here, the amount of surface functional groups (O/S) is determined as an atomic ratio which is calculated from the area ratio of the above-described O1S peak and C1S peak using the relative sensitivity factor unique to the apparatus.

A bundle of reinforcing fibers is more advantageous in terms of the economical efficiency when it contains a greater number of reinforcing fiber monofilaments; therefore, the number of monofilaments is preferably not less than 10,000. Meanwhile, a greater number of reinforcing fiber monofilaments tends to be more disadvantageous in terms of the impregnation property of the matrix resin; therefore, in cases where a carbon fiber bundle is used as the bundle of reinforcing fibers, from the standpoint of attaining both satisfactory economical efficiency and impregnation property, the number of monofilaments is more preferably 15,000 to 100,000, particularly preferably 20,000 to 50,000. In particular, a bundle of reinforcing fibers having a greater number of fibers is suitable for attaining the effects of the present invention, which are excellent impregnation property of the thermoplastic resin in the process of producing a molding material and good dispersion of the reinforcing fibers in the resulting molded article upon injection molding.

Further, in order to bind monofilaments into the form of a bundle of reinforcing fibers, in the present invention, a sizing agent may also be used in addition to the component (B). By adhering the sizing agent to the bundle of reinforcing fibers, in order to improve the handling property of the reinforcing fibers during transport and the processability thereof in the process of producing a molding material, one or more sizing agents, for example, various thermoplastic resins such as epoxy resins, urethane resins and acrylic resins, can also be used in combination in such an amount which does not adversely affect the objects of the present invention.

The "(A) bundle of continuous reinforcing fibers" used in the molding material of the present invention refers to a bundle of reinforcing fibers in which the monofilaments are unidirectionally arranged and continuous in the longitudinal direction; however, it is not necessary that all of the monofilaments be continuous over the full-length of the bundle of reinforcing fibers, and some of the monofilaments may be fragmented in the middle. Examples of such bundle of continuous reinforcing fibers include unidirectional fiber bundles, bidirectional fiber bundles and multidirectional fiber bundles; however, from the standpoint of the productivity in the process of producing a molding material, a unidirectional fiber bundle can be more preferably used.

<(B) Polyarylene Sulfide Prepolymer>

In the present invention, as the (8) polyarylene sulfide prepolymer, a polyarylene sulfide prepolymer which contains a cyclic polyarylene sulfide in an amount of at least 50 wt % and has a weight-average molecular weight of less than 10,000 is preferably employed. The term "cyclic polyarylene sulfide" used herein refers to a cyclic compound represented by the following Formula (a) which contains a repeating unit, —(Ar—S)—, as a main structural unit in an amount of preferably not less than 80 wt %, more preferably not less than 90 wt %, still more preferably not less than 95 wt %. Examples of Ar include those units that are represented by the below-described Formulae (b) to (1), among which a unit represented by the Formula (b) is particularly preferred.

[Chemical formula 1]

$$-(Ar-S)_m-$$ (a)

[Chemical formula 2]

(b)

(c)

(d)

(e)

(f)

(g)

(h)

(i)

(j)

(k)

(l)

(wherein, R1 and R2 each represent a substituent selected from a hydrogen, an alkyl group having 1 to 12 carbon atoms, an alkoxy group having 1 to 12 carbon atoms, an arylene group having 6 to 24 carbon atoms and a halogen group; and R1 and R2 may be the same or different)

As long as the cyclic polyarylene sulfide contains the above-described repeating unit as a main structural unit, it may also contain a small amount of a branch unit or cross-linking unit which is represented by the following Formulae (o) to (q) or the like. It is preferred that the amount of such a branch unit or cross-linking unit to be copolymerized be in the range of 0 to 1 mol % with respect to 1 mol of the repeating unit, —(Ar—S)—.

[Chemical formula 3]

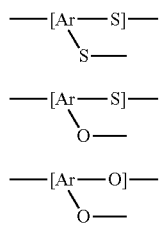

Further, in the present invention, the cyclic polyarylene sulfide may also be any of a random copolymer, a block copolymer and a mixture thereof, which contain the above-described repeating unit.

Representative examples thereof include cyclic polyphenylene sulfides (represented by the above-described Formulae (b), (c) and (g) to (l)); cyclic polyphenylene sulfide sulfones (represented by the above-described Formula (e)); cyclic polyphenylene sulfide ketones (represented by the above-described Formula (d)); cyclic polyphenylene sulfide ethers (represented by the above-described Formula (f)); and cyclic random or block copolymers containing any of these compounds; and mixtures of the above-described compounds. Examples of particularly preferred cyclic polyarylene sulfide include cyclic polyphenylene sulfides (hereinafter, may be abbreviated as "cyclic PPS") containing, as a main structural unit, a p-phenylene sulfide unit:

[Chemical formula 4]

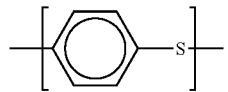

in an amount of not less than 80 wt %, particularly not less than 90 wt %, which are represented by the following Formula (r):

[Chemical formula 5]

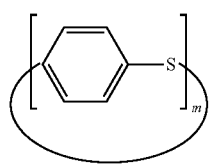

(wherein, m represents the number of repeating units).

The number of repeating units, m, in the cyclic polyarylene sulfide represented by above-described Formula (a) is not particularly restricted; however, it is, for example, in the range of preferably 4 to 50, more preferably 4 to 25, still more preferably 4 to 15. When m is in this preferred range, since the melting point of the cyclic polyarylene sulfide does not become excessively high, it is easily impregnated into a reinforcing fiber substrate.

Further, the cyclic polyarylene sulfide may either be a single compound having a single number of repeating units or a mixture of cyclic polyarylene sulfides having different numbers of repeating units; however, a mixture of cyclic polyarylene sulfides having different numbers of repeating units is more preferred because it tends to have a lower melting point and is more easily impregnated into a reinforcing fiber substrate as compared to a single compound having a single number of repeating units.

In the present invention, it is particularly preferred that the component contained in the (B) polyarylene sulfide prepolymer other than the cyclic polyarylene sulfide be a linear polyarylene sulfide oligomer. The term "linear polyarylene sulfide oligomer" used herein refers to a homo-oligomer or co-oligomer which contains a repeating unit, —(Ar—S)—, as a main structural unit in an amount of preferably not less than 80 mol %. Examples of Ar include those units that are represented by the above-described Formulae (b) to (l), among which a unit represented by the Formula (b) is particularly preferred. As long as the linear polyarylene sulfide oligomer contains the above-described repeating unit as a main structural unit, it may also contain a small amount of a branch unit or cross-linking unit which is represented by the above-described Formulae (o) to (q) or the like. It is preferred that the amount of such a branch unit or cross-linking unit to be copolymerized be in the range of 0 to 1 mol % with respect to 1 mol of the repeating unit, —(Ar—S)—. Further, the linear polyarylene sulfide oligomer may also be any of a random copolymer, a block copolymer and a mixture thereof, which contain the above-described repeating unit.

Representative examples thereof include polyphenylene sulfide oligomers, polyphenylene sulfide sulfone oligomers, polyphenylene sulfide ketone oligomers and polyphenylene sulfide ether oligomers, as well as random copolymers, block copolymers and mixtures of these compounds. Examples of particularly preferred linear polyarylene sulfide oligomer include linear polyphenylene sulfide oligomers containing a p-phenylene sulfide unit as a main structural unit of the polymer in an amount of not less than 80 mol %, particularly not less than 90 mol %.

In the present invention, the (B) polyarylene sulfide prepolymer contains a cyclic polyarylene sulfide in an amount of preferably at least 50 wt %, more preferably not less than 70 wt %, still more preferably not less than 80 wt %, yet still more preferably not less than 90 wt %. Further, the upper limit of the amount of the cyclic polyarylene sulfide contained in the (B) polyarylene sulfide prepolymer is not particularly restricted; however, it is in the range of, for example, not more than 98 wt %, preferably not more than 95 wt %. Normally, the higher the weight ratio of the cyclic polyarylene sulfide in the (B) polyarylene sulfide prepolymer, the lower becomes the melt viscosity thereof, which is preferred from the standpoint of the productivity of molding material.

Further, the higher the weight ratio of the cyclic polyarylene sulfide in the (B) polyarylene sulfide prepolymer, the higher does the polymerization degree of the (IV)

polyarylene sulfide obtained by heating tend to become. In the present invention, by adjusting the ratio of the cyclic polyarylene sulfide contained in the (B) polyarylene sulfide prepolymer, the polymerization degree of the resulting (B') polyarylene sulfide can be adjusted, so that the amount of gas generated during the heating can be preferably further reduced.

In the present invention, the upper limit of the molecular weight of the (B) polyarylene sulfide prepolymer is, in terms of weight-average molecular weight, preferably less than 10,000, more preferably not higher than 5,000, still more preferably not higher than 3,000. Meanwhile, the lower limit is, in terms of weight-average molecular weight, preferably not less than 300, more preferably not less than 400, still more preferably not less than 500. When the weight-average molecular weight is less than the above-described preferred upper limit value, the (B) polyarylene sulfide prepolymer sufficiently impregnates into the bundle of reinforcing fibers, so that the productivity is not impaired. In addition, detachment of the bundle of reinforcing fibers from the resulting molding material does not occur and the handling property is not deteriorated.

Further, the melting point of the (B) polyarylene sulfide prepolymer used in the molding material of the present invention is, from the standpoint of the moldability of the molding material, preferably 100 to 300° C., more preferably 130 to 280° C., most preferably 150 to 250° C.

By having the molting point in the above-described range, the (B) polyarylene sulfide prepolymer not only can be handled in a solid form at room temperature, but also is capable of forming a composite with the (A) bundle of continuous reinforcing fibers without requiring severe processing temperature in an impregnation die, coater, film-forming apparatus or the like.

In the present invention, the (B) polyarylene sulfide prepolymer can be produced by, for example, the following method [B1] or [B2].

[B1] A method of producing a polyarylene sulfide prepolymer, which comprises the steps of: heating a mixture containing at least a polyhalogenated aromatic compound, a sulfiding agent and an organic polar solvent to obtain a polyarylene sulfide resin by polymerization; separating a granular polyarylene sulfide resin using a 80-mesh screen (pore size: 0.125 mm); preparing a mixture containing a polyarylene sulfide component, which is a polyarylene sulfide component generated by the polymerization but is different from the above-described granular polyarylene sulfide resin (hereinafter, referred to as "polyarylene sulfide oligomer"), an organic polar solvent, water and a halogenated alkali metal salt; separating and recovering the polyarylene sulfide oligomer from the mixture; and subjecting the thus obtained polyarylene sulfide oligomer to a purification process.

[B2] A method of producing a polyarylene sulfide prepolymer, which comprises the steps of: heating a mixture containing at least a polyhalogenated aromatic compound, a sulfiding agent and an organic polar solvent to obtain a polyarylene sulfide resin by polymerization; removing the organic polar solvent after the completion of the polymerization to prepare a mixture containing the polyarylene sulfide resin, water and a halogenated alkali metal salt; purifying the thus obtained mixture to obtain a polyarylene sulfide resin containing a polyarylene sulfide prepolymer; extracting the polyarylene sulfide prepolymer with a solvent which does not substantially dissolve the polyarylene sulfide resin but dissolves the polyarylene sulfide prepolymer; and recovering the thus extracted polyarylene sulfide prepolymer.

In embodiments of the present invention, from the standpoint of reducing the generation of decomposition gas during the production of molding material, the weight reduction of the (B) polyarylene sulfide prepolymer when heated ($\Delta Wr$), which is determined by the below-described equation (i), is not greater than 5%, preferably not greater than 3%, more preferably not greater than 2%, still more preferably not greater than 1%, Further, by selecting a polyarylene sulfide prepolymer satisfying such requirement, the reduction in the material during the heat polymerization of the polyarylene sulfide prepolymer into a polyarylene sulfide can be minimized.

Moreover, in the present invention, such (B) polyarylene sulfide prepolymer can be easily converted into (B') a polyarylene sulfide by polymerizing the (B) polyarylene sulfide prepolymer under heat in the presence of the below-described (D) zero-valent transition metal compound or (E) low-valent iron compound.

<(B') Polyarylene Sulfide>

In an embodiment of the present invention, the (B') polyarylene sulfide (hereinafter, may also be abbreviated as "PAS") is a homopolymer or a copolymer which contains a repeating unit, —(Ar—S)—, as a main structural unit in an amount of preferably not less than 80 mol %, more preferably not less than 90 wt %, still more preferably not less than 95 wt %. Examples of Ar include those units that are represented by the above-described Formulae (b) to (l), among which a unit represented by the Formula (b) is particularly preferred.

As long as the (B') polyarylene sulfide contains the above-described repeating unit as a main structural unit, it may also contain a small amount of a branch unit or cross-linking unit which is represented by the above-described Formulae (o) to (q) or the like. It is preferred that the amount of such a branch unit or cross-linking unit to be copolymerized be in the range of 0 to 1 mol % with respect to 1 mol of the repeating unit, —(Ar—S)—.

Further, in the present invention, the (B') polyarylene sulfide may also be any of a random copolymer, a block copolymer and a mixture thereof, which contain the above-described repeating unit.

Representative examples thereof include polyphenylene sulfides, polyphenylene sulfide sulfones, polyphenylene sulfide ketones and polyphenylene sulfide ethers, as well as random copolymers, block copolymers and mixtures of these compounds. Examples of particularly preferred (B') polyarylene sulfide include polyphenylene sulfides (hereinafter, may also be abbreviated as "PPS") containing a p-phenylene sulfide unit as a main structural unit of the polymer in an amount of not less than 80 wt %, particularly not less than 90 wt %.

In an embodiment of the present invention, the molecular weight of the (B) polyarylene sulfide is, in terms of weight-average molecular weight, not less than 10,000, preferably not less than 15,000, more preferably not less than 18,000. When the weight-average molecular weight of the (B') polyarylene sulfide is not less than the above-described preferred lower limit value, the resulting molded article has satisfactory mechanical characteristics. Further, even when the molding process is performed at a higher temperature (for example, 360° C.), a low-molecular-weight component is not likely to undergo a thermal decomposition reaction, so that a decomposition gas does not cause environmental contamination in the vicinity of the molding equipment. The upper limit of the weight-average molecular weight is not particularly restricted; however, it is, for example, preferably not higher than 1,000,000, more preferably not higher than 500,000, still more preferably not higher than 200,000. In this range, the resulting molding material can attain a high moldability.

In an embodiment of the present invention, the extent of the molecular weight distribution of the (B') polyarylene sulfide, that is, the dispersion degree represented by the ratio of the weight-average molecular weight and the number-average molecular weight (weight-average molecular weight/number-average molecular weight) is not higher than 2.5, preferably not higher than 23, more preferably not higher than 2.1, still more preferably not higher than 2.0. When the dispersion degree is in this preferred range, the (B') polyarylene sulfide contains only a small amount of low-molecular-weight component, so that the resulting molded article has satisfactory mechanical characteristics and environmental contamination in the vicinity of the molding equipment does not occur. Here, the above-described weight-average molecular weight and number-average molecular weight can be determined by ordinary GPC (gel-permeation chromatograph) such as the above-described SEC (size-exclusion chromatography).

Further, in the present invention, the melt viscosity of the (B') polyarylene sulfide is not particularly restricted; however, it is usually preferred to be in the range of, for example, 5 to 10,000 Pa·s (300° C., shear rate of 1,000/sec).

Further, in the present invention, it is preferred that the (B') polyarylene sulfide contain substantially no halogen other than chlorine, namely fluorine, bromine, iodine or astatine. In the present invention, when the (B') polyarylene sulfide contains chlorine as a halogen, since chlorine is stable in the temperature range where the (B') polyarylene sulfide is normally used, a small amount of chlorine does not significantly affect the mechanical characteristics of the (B') polyarylene sulfide and a gas generated therefrom has no effect on the human body. However, when the (B') polyarylene sulfide contains a halogen other than chlorine, a decomposition gas generated because of the unique properties of such halogen may adversely affect the environment around the molding equipment. Therefore, a large-scale equipment is required for removal of such decomposition gas. Here, the term "contain substantially no halogen other than chlorine" means that, for example, when the subject polymer is combusted and a solution which has absorbed the resulting combustion gas is quantitatively analyzed by ion chromatography or the like, the amount of halogens other than chlorine is below the detection limit. Further, in an embodiment of the present invention, even when the (B') polyarylene sulfide contains only chlorine as a halogen, from the same reason as described in the above, the amount of chlorine is not greater than 1 wt %, more preferably not greater than 0.5 wt %, still more preferably not greater than 0.2 wt %.

From the standpoint of reducing the generation of a decomposition gas during molding, it is preferred that the weight reduction by heating of the (B') polyarylene sulfide used in the present invention satisfy the following equation (i).

$$\Delta Wr=(W1-W2)/W1\times 100\leq 0.20(\%) \quad (i)$$

(wherein, $\Delta Wr$ represents a weight reduction rate (%) which is calculated from a sample weight (W2) at 330° C. based on a sample weight (W1) at 100° C., the samples weights being determined by a thermogravimetric analysis where the sample is heated from 50° C. to an arbitrary temperature of not lower than 330° C. at a heating rate of 20° C./min in a non-oxidizing atmosphere under atmospheric pressure)

In the (B') polyarylene sulfide used in an embodiment of the present invention, the value of $\Delta Wr$ is not higher than 0.20%, preferably not higher than 0.16%, still more preferably not higher than 0.13%, yet still more preferably not higher than 0.10%. When the value of $\Delta Wr$ is in the above-described preferred range, for example, even if a fiber-reinforced resin member is heated in the event of a fire, the amount of gas generated therefrom is small. The $\Delta Wr$ can be determined by conventional thermogravimetric analysis. In this analysis, measurements are performed at the atmospheric pressure in a non-oxidizing atmosphere. The term "non-oxidizing atmosphere" used herein refers to an atmosphere containing substantially no oxygen, that is, an inert gas atmosphere such as nitrogen, helium or argon.

Further, in the measurement of $\Delta Wr$, the thermogravimetric analysis is performed by heating the sample from 50° C. to an arbitrary temperature of not lower than 330° C. at a heating rate of 20° C./min. Further, in the present invention, the thermogravimetric analysis is performed by holding the sample at 50° C. for 1 minute and subsequently heating the sample at a heating rate of 20° C./min.

In the present invention, the (B') polyarylene sulfide can be obtained by heating the (B) polyarylene sulfide prepolymer in the presence of (D) a zero-valent transition metal compound or (E) a low-valent iron compound. According to this method, as compared to a case where (D) a zero-valent transition metal compound or (E) a low-valent iron compound is not used, the (B') polyarylene sulfide having the above-described properties can be obtained at a lower temperature and a higher rate. Here, the term "conversion rate of the (B) polyarylene sulfide prepolymer into (B') a polyarylene sulfide" refers to a ratio of the cyclic polyarylene sulfide in the (B) polyarylene sulfide prepolymer converted to a high-molecular-weight polyarylene sulfide.

In the present invention, the rate at which the (B) polyarylene sulfide prepolymer is converted to (B') a polyarylene sulfide by heating is preferably not lower than 70%, more preferably not lower than 80%, still more preferably not lower than 90%. When the conversion rate is 70% or higher, a polyarylene sulfide having excellent mechanical characteristics can be obtained.

<(D) Zero-Valent Transition Metal Compound>

In the present invention, a variety of (D) zero-valent transition metal compounds can be used as a polymerization catalyst. As the (D) zero-valent transition metal, a metal belonging to one of Groups 8 to 11 and one of Periods 4 to 6 of periodic table is preferably used. Examples of such metal species include nickel, palladium, platinum, iron, ruthenium, rhodium, copper, silver and gold, and palladium and/or nickel is particularly preferably used. As the (D) zero-valent transition metal compound, various complexes are suitable, and examples thereof include complexes containing, as a ligand, triphenylphosphine, tri-t-butylphosphine, tricyclohexylphosphine, 1,2-bis(diphenylphosphino)ethane, 1,1'-bis(diphenylphosphino)ferrocene, dibenzylideneacetone, dimethoxydibenzylideneacetone, cyclooctadiene or carbonyl. Specific examples include bis(dibenzylideneacetone)palladium, tris(dibenzylideneacetone)dipalladium, tetrakis(triphenylphosphine)palladium, bis(tri-t-butylphosphine)palladium, bis[1,2-bis(diphenylphosphino)ethane]palladium, bis(tricyclohexylphosphine)palladium, [P,P'-1,3-bis(di-i-propylphosphino)propane][P-1,3-bis(di-i-propylphosphino)propane]palladium, 1,3-bis(2,6-di-i-propylphenyl)imidazol-2-ylidene(1,4-naphthoquinone)

palladium dimer, 1,3-bis(2,4,6-trimethylphenyl)imidazol-2-ylidene(1,4-naphthoquinone)palladium dimer, bis(3,5,3',5'-dimethoxydibenzylideneacetone)palladium, bis(tri-t-butylphosphine)platinum, tetrakis(triphenylphosphine) platinum, tetrakis(trifluorophosphine)platinum, ethylenebis(triphenylphosphine)platinum, platinum-2,4,6,8-tetramethyl-2,4,6,8-tetravinylcyclotetrasiloxane complex, tetrakis(triphenylphosphine)nickel, tetrakis(triphenylphosphite)nickel, bis(1,5-cyclooctadiene)nickel, triiron dodecacarbonyl, iron pentacarbonyl, tetrarhodium dodecacarbonyl, hexarhodium hexadecacarbonyl and triruthenium dodecacarbonyl. These polymerization catalysts may be used individually, or two or more thereof may be used as a mixture or in combination.

As such polymerization catalyst, the above-described (D) zero-valent transition metal compound may be added, or the (D) zero-valent transition metal compound may be formed in the system. Examples of a method of forming the (D) zero-valent transition metal compound in the system as in the latter case include a method of forming a complex of a transition metal in the system by adding a transition metal compound, such as a transition metal salt, and a compound functioning as a ligand; and a method in which a complex formed by a transition metal compound such as a transition metal salt and a compound functioning as a ligand is added.

Examples of a transition metal compound, a ligand and a complex formed by a transition metal compound and a ligand, which may be used in the present invention, are listed below. Examples of a transition metal compound used for forming the (D) zero-valent transition metal compound in the system include acetates and halides of various transition metals. Here, examples of the transition metal species include acetates and halides of nickel, palladium, platinum, iron, ruthenium, rhodium, copper, silver and gold, and specific examples thereof include nickel acetate, nickel chloride, nickel bromide, nickel iodide, nickel sulfide, palladium acetate, palladium chloride, palladium bromide, palladium iodide, palladium sulfide, platinum chloride, platinum bromide, iron acetate, iron chloride, iron bromide, iron iodide, ruthenium acetate, ruthenium chloride, ruthenium bromide, rhodium acetate, rhodium chloride, rhodium bromide, copper acetate, copper chloride, copper bromide, silver acetate, silver chloride, silver bromide, gold acetate, gold chloride and gold bromide. Further, the ligand to be added simultaneously so as to form the (D) zero-valent transition metal compound within the system is not particularly restricted as long as it generates a zero-valent transition metal when the (B) polyarylene sulfide prepolymer and the transition metal compound are heated together; however, the ligand is preferably a basic compound and examples thereof include triphenylphosphine, tri-t-butylphosphine, tricyclohexylphosphine, 1,2-bis(diphenylphosphino)ethane, 1,1'-bis(diphenylphosphino)ferrocene, dibenzylideneacetone, sodium carbonate and ethylenediamine. Moreover, examples of the complex formed by a transition metal compound and a compound functioning as a ligand include complexes that are composed of the above-described various transition metal salts and ligands. Specific examples of such complexes include bis(triphenylphosphine)palladium diacetate, bis(triphenylphosphine)palladium dichloride, [1,2-bis(diphenylphosphino)ethane]palladium dichloride, [1,1'-bis(diphenylphosphino)ferrocene]palladium dichloride, dichloro(1,5'-cyclooctadiene)palladium, bis(ethylenediamine)palladium dichloride, bis(triphenylphosphine)nickel dichloride, [1,2-bis(diphenylphosphino)ethane]nickel dichloride, [1,1'-bis(diphenylphosphino)ferrocene]nickel dichloride and dichloro(1,5'-cyclooctadiene)platinum.

These polymerization catalysts and ligands may be used individually, or two or more thereof may be used as a mixture or in combination.

The valence state of a transition metal compound can be determined by X-ray absorption fine structure (XAFS) analysis. The valence of a transition metal compound can be analyzed by irradiating the transition metal compound which is used as a catalyst in the present invention, a cyclic polyarylene sulfide containing the transition metal compound or a polyarylene sulfide containing the transition metal compound with X-ray and comparing the peak maxima of absorption coefficient in normalized absorption spectra.

For example, when evaluating the valence of a palladium compound, it is effective to compare absorption spectra relating to the X-ray absorption near-edge structure (XANES) of the L3 edge, and the valence can be determined by comparing the peak maxima of absorption coefficient that are obtained by designating the point at which the energy of the X-ray is 3,173 eV as reference and normalizing the average absorption coefficient in the range of 3,163 to 3,168 eV and the average absorption coefficient in the range of 3,191 to 3,200 eV to be 0 and 1, respectively. In the case of palladium, a zero-valent palladium compound tends to show a smaller peak maximum of normalized absorption coefficient as compared to a divalent palladium compound. Further, a transition metal compound having a greater effect of facilitating the conversion of the (B) polyarylene sulfide prepolymer tends to show a smaller peak maximum. This is speculated to be because an absorption spectrum relating to XANES corresponds to the transition of an inner-shell electron to a vacant orbital and the absorption peak intensity is influenced by the electron density of the d-orbital.

In order to allow a palladium compound to facilitate the conversion of the (B) polyarylene sulfide prepolymer to (B') a polyarylene sulfide, the peak maximum of normalized absorption coefficient is preferably not larger than 6, more preferably not larger than 4, still more preferably not larger than 3. In this range, the conversion of cyclic polyarylene sulfide can be facilitated, Specifically, divalent palladium chloride which does not facilitate the conversion of the (B) polyarylene sulfide prepolymer shows a peak maximum of 6.32, while zero-valent tris(dibenzylideneacetone)dipalladium, tetrakis(triphenylphosphine)palladium and bis[1,2-bis(diphenylphosphino)ethane]palladium that facilitate the conversion of the (B) polyarylene sulfide prepolymer show a peak maximum of 3.43, 2.99 and 2.07, respectively.

<(E) Low-Valent Iron Compound>

In the present invention, a variety of (E) low-valent iron compounds can be used as a polymerization catalyst. It is known that an iron atom can theoretically assume a valence state of −II, −I, 0, I, II, III, IV, V, VI, and the term "low-valent iron compound" refers to an iron compound having a valence of −II to II. Further, the term "(E) low-valent iron compound" used herein refers to an iron compound having a valence of −II to II in the reaction system when the cyclic polyarylene sulfide is converted to a polyarylene sulfide by heating.

Examples of the (E) low-valent iron compound include those iron compounds having a valence of −II to II; however, from the standpoints of the stability, ease of handling, availability and the like thereof, as the (E) low-valent iron compound in the present invention, an iron compound having a valence of 0 (zero-valent), I (monovalent) or II (divalent) is preferably employed and thereamong, an divalent iron compound is particularly preferred.

As the divalent iron compound, a variety of iron compounds are suitable, and examples thereof include halides, acetate, sulfate, phosphate and ferrocene compound of divalent iron. Specific examples of such iron compounds include iron chloride, iron bromide, iron iodide, iron fluoride, iron acetate, iron sulfate, iron phosphate, iron nitrate, iron sulfide, iron methoxide, iron phthalocyanine and ferrocene. Thereamong, from the standpoint of uniformly dispersing the iron compound in the cyclic polyarylene sulfide, an iron halide having good dispersibility in the cyclic polyarylene sulfide is preferred and, from the standpoints of the economical efficiency and the properties of the resulting polyarylene sulfide, iron chloride is more preferred. Examples of the properties of the polyarylene sulfide include solubility to 1-chloronaphthalene. By using the preferred (E) low-valent iron compound of the present invention, a polyarylene sulfide having a small part, preferably no part that is insoluble to 1-chloronaphthalene tends to be obtained. This means that the polyarylene sulfide contains a small amount of branch unit or cross-linking unit and this may be regarded as a desirable property of the polyarylene sulfide from the standpoint of obtaining a molded article having high moldability and high mechanical strength.

As a monovalent iron compound, a variety of iron compounds are suitable, and specific examples thereof include cyclopentadienyl iron dicarbonyl dimer and 1,10-phenanthroline ferrous sulfate complex.

As a zero-valent iron compound, a variety of iron compounds are suitable, and specific examples thereof include triiron dodecacarbonyl and iron pentacarbonyl.

These polymerization catalysts may be used individually, or two or more thereof may be used as a mixture or in combination.

As such polymerization catalyst, the above-described (E) low-valent iron compound may be added, or the (E) low-valent iron compound may be formed in the system. Examples of a method of forming the (E) low-valent iron compound in the system as in the latter case include a method of forming (E) a low-valent iron compound by heating a high-valent iron compound; and a method in which a low-valent iron compound is formed in the system by adding a high-valent iron compound and a compound having a property of reducing the high-valent iron compound (co-catalyst) to a cyclic polyarylene sulfide. Examples of the method of forming (E) a low-valent iron compound by heating a high-valent iron compound include a method in which (E) a low-valent iron compound is formed by heating a high-valent halogenated iron compound. In this case, it is speculated that (E) a low-valent iron compound is formed when the high-valent halogenated iron compound is heated and a part of the halogen constituting the high-valent halogenated iron compound is consequently dissociated.

In the present invention, in cases where the (E) low-valent iron compound is a substance which is gradually deteriorated during storage, a method in which a more stable high-valent iron compound is added and the (E) low-valent iron compound is formed therefrom in the system during the process of converting the (B) polyarylene sulfide prepolymer into (B') a polyarylene sulfide is preferably employed. Such a method is preferred because it enables long-term storage of the resulting molding material and is capable of improving the rate at which the (B) polyarylene sulfide prepolymer is converted into (B') a polyarylene sulfide.

Examples of high-valent iron compound which may be used in the present invention are listed below. As a high-valent iron compound used for forming (E) low-valent iron compound within the system, a variety of iron compounds are suitable, and examples thereof include trivalent iron compounds such as iron chloride, iron bromide, iron fluoride, iron citrate, iron nitrate, iron sulfate, iron acetylacetonate, iron acetylacetonate, iron diethyldithiocarbamate, iron ethoxide, iron isopropoxide and iron acrylate. Thereamong, from the standpoint of uniformly dispersing the iron compound in the cyclic polyarylene sulfide, an iron halide having good dispersibility in the cyclic polyarylene sulfide is preferred and, from the standpoints of the economical efficiency and the properties of the resulting polyarylene sulfide, iron chloride is more preferred. Examples of the properties of the polyarylene sulfide include solubility to 1-chloronaphthalene. By using the preferred (E) low-valent iron compound of the present invention, a polyarylene sulfide having a small part, preferably no part that is insoluble to 1-chloronaphthalene tends to be obtained. This means that the polyarylene sulfide contains a small amount of branch unit or cross-linking unit and this may be regarded as a desirable property of the polyarylene sulfide from the standpoint of obtaining a molded article having high moldability and high mechanical strength.

Examples of co-catalyst which may be used in the present invention are listed below. The co-catalyst to be added for the formation of (E) low-valent iron compound in the system is not particularly restricted as long as it generates a low-valent iron compound by undergoing a reaction with a high-valent iron compound when a cyclic polyarylene sulfide and the high-valent iron compound are heated together. As the co-catalyst, a compound having a property of reducing various organic and inorganic substances is preferably used, and examples of such compound include copper (I) chloride, tin (II) chloride, titanium (III) chloride, ethylenediamine, N,N'-dimethylethylenediamine, triphenylphosphine, tri-t-butylphosphine, tricyclohexylphosphine and 1,2-bis(diphenylphosphino)ethane. Thereamong, copper (I) chloride, tin (II) chloride and titanium (III) chloride are preferred, and copper (I) chloride and tin (II) chloride, which can be safely handled in a solid state, are more preferred.

These polymerization catalysts and co-catalysts may be used individually, or two or more thereof may be used as a mixture or in combination.

The valence state of the iron compound and the structure in the vicinity of the iron atom can be determined by X-ray absorption fine structure (XAFS) analysis. The valence state of the iron compound and the structure in the vicinity of the iron atom can be determined by irradiating the iron compound used as a catalyst, or the iron compound-containing cyclic polyarylene sulfide, or the iron compound-containing polyarylene sulfide with X-ray, and comparing the shapes of the absorption spectra.

When evaluating the valence of the iron compound, it is effective to compare the absorption spectra relating to the X-ray absorption near-edge structure (XANES) of the K edge, and the valence can be evaluated by comparing the energies at which the respective spectra rise. The spectrum obtained by the measurement of a divalent iron compound and the spectrum obtained by the measurement of a zero-valent iron compound have a tendency that the main peak rises at a point of lower energy than the spectrum obtained by the measurement of a trivalent iron compound. Concretely, the rise of the main peak of a trivalent iron compound such as iron(III) chloride or iron(III) oxide is observed at about 7120 eV while the rise of the main peak of a divalent iron compound such as iron(II) chloride or iron(II) chloride tetrahydrate is observed from about 7110 to about 7115 eV, and a shoulder structure is observed from about 7110 eV in the spectrum of a zero-valent iron compound such as iron metal(0). There is also a tendency that the peak top of the main peak of the spectrum obtained by the measurement of a divalent iron compound is located at a point of lower energy than that of the spectrum obtained by the measurement of a trivalent iron compound. Concretely, the peak top of the main peak of a trivalent iron compound is observed from about 7128 to about 7139 eV, and that of a divalent iron compound is observed from about 7120 to about 7128 eV. More concretely, the peak tops of the main peak of iron(III) chloride and iron(III) oxide which are trivalent iron compounds are observed from about 7128 to about 7134 eV and at about 7132 eV, respectively; and the peak tops of the main peak of iron(II) chloride and iron(II) chloride tetrahydrate which are divalent iron compounds are observed at about 7120 eV and at about 7123 eV, respectively.

When evaluating the structure in the vicinity of the iron atom of in iron compound, it is effective to compare the radial distribution functions obtained by extended X-ray absorption fine structure (EXAFS) of the K-edge, and the structure can be evaluated by comparing the distances between the points at which the respective peaks are observed. With iron metal (0), peaks resulting from Fe—Fe bond are observed at about 0.22 nm and at about 0.44 nm. With iron(III) chloride, a peak resulting from Fe—Cl bond is observed from about 0.16 to about 0.17 nm. With iron(II) chloride, a peak resulting from Fe—Cl bond is observed at about 0.21 urn; with iron(II) chloride tetrahydrate, a peak resulting from Fe—Cl bond is observed from about 0.16 to about 0.17 nm and also a subpeak thought to be resulting from another Fe—Cl bond is observed at about 0.21 nm. With iron(III) oxide, a peak resulting from Fe—O bond is observed from about 0.15 to about 0.17 nm, and a peak resulting from Fe—Fe bond and so on is observed from about 0.26 to about 0.33 nm.

Thus, the valence state of the iron compound and the structure in the vicinity of the iron atom can be determined by comparing the spectrum obtained by X-ray absorption fine structure (XAFS) analysis during the reaction or of the reaction product with spectra of various iron compounds.

When adding the above-described iron compound, it is preferred that the addition be performed in the absence of moisture. The moisture content of a gas phase with which with the cyclic polyarylene sulfide and the added iron compound come into contact is preferably 1 wt % or less, more preferably 0.5 wt % or less, still more preferably 0.1 wt % or less, and it is particularly preferred that the gas phase contain substantially no moisture. The molar ratio of the total amount of the moisture contained in the cyclic polyarylene sulfide, the moisture contained in the polymerization catalyst and the moisture contained in the polymerization catalyst in a hydrate form is, with respect to the added amount of the polymerization catalyst, not higher than 9, preferably not higher than 6, more preferably not higher than 3, still more preferably not higher than 1, yet still more preferably not higher than 0.1. It is even more preferred that the polymerization catalyst contain substantially no moisture. When the moisture content is not higher than the above-described amount, side reactions such as oxidation reaction and hydrolysis reaction of the (E) low-valent iron compound can be inhibited. Accordingly, an hydrate is more preferred than a hydrate as the form of the iron compound to be added.

Further, when adding an iron compound, in order to prevent moisture from being incorporated into the cyclic polyarylene sulfide and the iron compound, the iron compound and a desiccant may be added in combination. Examples of the desiccant include metals, neutral desiccants, basic desiccants and acidic desiccants. In order to inhibit oxidation of the (E) low-valent iron compound, it is important not to allow an oxidizing substance to exist in the system; therefore, neutral desiccant and basic desiccants are preferred. Specific examples thereof include, as neutral desiccants, calcium chloride, aluminum oxide, calcium sulfate, magnesium sulfate and sodium sulfate; and, as basic desiccants, potassium carbonate, calcium oxide and barium oxide. Thereamong, calcium chloride and aluminum oxide, which have a relatively large moisture absorption capacity and are easy to handle, are preferred. In cases where an iron compound and a desiccant are added in combination, the amount of moisture removed by the desiccant is not included in the total amount of the moisture contained in the cyclic polyarylene sulfide, the moisture contained in the polymerization catalyst and the moisture contained in the polymerization catalyst in a hydrate form.

The above-described moisture content can be determined by Karl Fisher method. Further, the amount of moisture contained in the gas phase with which the cyclic polyarylene sulfide and the added iron compound come into contact can be also calculated from the temperature and relative humidity of the gas phase. Further, the amount of the moisture contained in the cyclic polyarylene sulfide and that of the moisture contained in the polymerization catalyst can be determined by using an infrared moisture meter or gas chromatography, or from the change in the weight thereof before and after being heated at a temperature of about 100 to 110° C.

When adding the above-described iron compound, it is preferred that the addition be performed in a non-oxidizing atmosphere. The term "a non-oxidizing atmosphere" used herein refers to an atmosphere having an oxygen concentration of not higher than 5% by volume, preferably not higher than 2% by volume in the gas phase with which the cyclic polyarylene sulfide and the added iron compound come into contact, and more preferably an atmosphere containing substantially no oxygen, that is, an inert gas atmosphere such as nitrogen, helium or argon. Thereamong, particularly from the standpoints of the economical efficiency and the ease of handling, a nitrogen atmosphere is preferred. Further, when adding the above-described iron compound, it is preferred that the addition be performed in the absence of an oxidizing substance. The term "in the absence of an oxidizing substance" used herein means that the molar ratio of the oxidizing substance contained in the cyclic polyarylene sulfide with respect to the added polymerization catalyst is not higher than 1, preferably not higher than 0.5, more preferably not higher than 0.1. The term "in the absence of an oxidizing substance" still more preferably means a condition containing substantially no oxidizing agent. The term "oxidizing substance" refers to a compound which oxidizes the above-described polymerization catalyst and has no catalytic activity, such as a substance which converts the polymerization catalyst into iron (III) oxide. Examples of such oxidizing substance include oxygen, organic peroxide and inorganic peroxide. Under such a condition, side reactions such as oxidation reaction of the low-valent iron compound can be inhibited.

The concentration at which the (D) zero-valent transition metal compound or the (E) low-valent iron compound is used varies depending on the intended molecular weight of the resulting (B') polyarylene sulfide and the type of the (D) zero-valent transition metal compound or the (E) low-valent iron compound; however, it is usually 0.001 to 20 mol %, preferably 0.005 to 15 mol %, still more preferably 0.01 to 10 mol %, based on the amount of sulfur atoms contained in the (B) polyarylene sulfide prepolymer. When the concentration is 0.001 mol % or higher, the (B) polyarylene sulfide prepolymer is sufficiently converted into (B') a polyarylene sulfide, while when the concentration is 20 mol % or lower, (B') polyarylene sulfide having the above-described properties can be obtained.

Further, in the present invention, the (D) zero-valent transition metal compound or the (E) low-valent iron compound remains even after polymerizing the (B') polyarylene sulfide by heating. Therefore, the (D) zero-valent transition metal compound or the (E) low-valent iron compound is characteristically contained at a concentration of 0.001 to 20 mol %, preferably 0.005 to 15 mol %, more preferably 0.01 to 10 mol %, also based on the amount of sulfur atoms contained in the (B') polyarylene sulfide.

When adding the (D) zero-valent transition metal compound or the (E) low-valent iron compound, it may be added as is and, after the addition to the (B) polyarylene sulfide prepolymer, it is preferred to be uniformly. Examples of a method of uniformly dispersing the (D) zero-valent transition metal compound or the (E) low-valent iron compound include a mechanical dispersion method and a dispersion method using a solvent. Specific examples of the mechanical dispersion method include those methods utilizing a pulverizer, a stirrer, a mixer, a shaker or a mortar. Specific examples of the dispersion method using a solvent include a method in which the (B) polyarylene sulfide prepolymer is dissolved or dispersed in a solvent and a prescribed amount of the (D) zero-valent transition metal compound or the (E) low-valent iron compound is added thereto, followed by removal of the solvent. Further, in cases where the (D) zero-valent transition metal compound or the (E) low-valent iron compound is in the form of a solid when dispersed, in order to allow more uniform dispersion, it is preferred that the (D) zero-valent transition metal compound or the (E) low-valent iron compound have an average particle size of not larger than 1 mm.

<(C) Thermoplastic Resin>

The (C) thermoplastic resin used in the present invention is not particularly restricted, and examples thereof include polyester-based resins such as polyethylene terephthalate (PET) resins, polybutylene terephthalate (PBT) resins, polytrimethylene terephthalate (PTT) resins, polyethylene naphthalate (PENp) resins and liquid crystal polyesters; polyolefin resins such as polyethylene (PE) resins, polypropylene (PP) resins and polybutylene resins; styrene-based resins; urethane resins; polyoxymethylene (POM) resins; polyamide (PA) resins; polycarbonate (PC) resins; polymethyl methacrylate (PMMA) resins; polyvinyl chloride (PVC) resins; polyphenylene sulfide (PPS) resins; polyphenylene ether (PPE) resins; modified PPE resins; polyimide (PI) resins; polyamide imide (PAI) resins; polyether imide (PEI) resins; polysulfone (PSU) resins; modified PSU resins; polyether sulfone (PES) resins; polyketone (PK) resins; polyether ketone (PEK) resins; polyether ether ketone (PEEK) resins; polyether ketone ketone (PEKK) resins; polyallylate (PAR) resins; polyether nitrile (PEN) resins; phenolic resins; phenoxy resin resins; fluorine-based resins such as polytetrafluoroethylene; copolymers and modified forms of these resins; and blends of two or more of these resins.

Among these thermoplastic resins, from the standpoint of further improving the effects of the present invention, a resin having excellent heat resistance can be preferably selected. The term "resin having excellent heat resistance" refers to, for example, a crystalline resin having a melting point of not lower than 200° C., preferably not lower than 220° C., more preferably not lower than 240° C., still more preferably not lower than 260° C., or an amorphous resin having a deflection temperature under load of not lower than 120° C., preferably not lower than 140° C., more preferably not lower than 160° C., still more preferably not lower than 180° C. Accordingly, examples of preferred resin include polyamide resins, polyimide resins, polyamide imide resins, polyether imide resins, polyether ketone resins, polyether ether ketone resins, polyether ketone ketone resins, polyether sulfone resins, polyphenylene sulfide resins, polyamide resins, polyether imide resins, polyamide imide resins, polyether ether ketone resins and polyphenylene sulfide resins. In cases where the (C) thermoplastic resin is a polyphenylene sulfide resin, the polyphenylene sulfide resin and the above-described component (B') may be the same or different; however, in order to attain the objects of the present invention, it is preferred to use a PPS resin having a molecular weight higher than that of the above-described component (B').

Further, in the present invention, from the standpoint of the mechanical characteristics of the molded article obtained by molding the molding material, the molecular weight of the (C) thermoplastic resin is, in terms of weight-average molecular weight, preferably not less than 10,000, more preferably not less than 20,000, particularly preferably not less than 30,000. A higher weight-average molecular weight is more advantageous because the strength and elasticity of the matrix resin are thereby improved. Meanwhile, the upper limit of the weight-average molecular weight is not particularly restricted; however, from the standpoint of the fluidity in molding, it is, for example, preferably not higher than 1,000,000, more preferably not higher than 500,000. Here, the above-described weight-average molecular weight can be determined by ordinary GPC (gel-permeation chromatograph) such as the above-described SEC (size-exclusion chromatography).

The (C) thermoplastic resin exemplified in the above may also contain a fiber-reinforcing agent(s), an impact resistance-improving agent(s) such as an elastomer or a rubber component, other filler(s) and/or an additive(s) in such an amount which does not adversely affect the objects of the present invention. Examples thereof include an inorganic filler, a flame retardant, a conductivity-imparting agent, a crystal nucleating agent, an ultraviolet absorber, an antioxidant, a damping agent, an antibacterial agent, an insect repellent, a deodorizer, a coloring inhibitor, a heat stabilizer, a mold-releasing agent, an antistatic agent, a plasticizer, a lubricant, a coloring agent, a pigment, a dye, a foaming agent, an anti-foaming agent and a coupling agent.

<Molding Material>

The molding material according to embodiments of the present invention is constituted by (A) a bundle of reinforcing fibers; (B) a polyarylene sulfide prepolymer or (B') a polyarylene sulfide; (C) a thermoplastic resin; and (D) a zero-valent transition metal compound or (E) a low-valent iron compound.

When the total amount of the components (A) to (C) is taken as 100 wt %, the amount of the (A) bundle of reinforcing fibers is 1 to 50 wt %, preferably 5 to 45 wt %, more preferably 10 to 40 wt %. When the amount of the (A) bundle of reinforcing fibers is less than 1 wt %, the mechanical characteristics of the resulting molded article may not be satisfactory, while when the amount is greater than 50 wt %, the fluidity of the molding material at the time of injection molding may be reduced.

Further, when the total amount of the components (A) to (C) is taken as 100 wt %, the amount of the (B) polyarylene sulfide prepolymer or the (B') polyarylene sulfide is 0.1 to 40 wt %, preferably 0.5 to 30 wt %, more preferably 1 to 20 wt %. By using the (B) polyarylene sulfide prepolymer or the (B') polyarylene sulfide in this range, a molding material having excellent moldability and handling property can be obtained. When the amount of the component (B) or (B') is less than 0.1 wt %, the impregnation thereof into the (A) bundle of reinforcing fibers may not be sufficient, so that the handling property of the resulting molding material may not be satisfactory. Meanwhile, when the amount of the component (B) or (B') is greater than 40 wt %, the mechanical characteristics of the resulting molded article may not be satisfactory.

Moreover, when the total amount of the components (A) to (C) is taken as 100 wt %, the amount of the (C) thermoplastic resin is 10 to 98.9 wt %, preferably 25 to 94.5 wt %, more preferably 40 to 89 wt %. By using the (C) thermoplastic resin in this range, a molding material having excellent moldability and handling property can be obtained. When the amount of the component (C) is less than 10 wt %, the fluidity of the molding material at the time of injection molding may be reduced, while when the amount is greater than 98.9 wt %, the mechanical characteristics of the resulting molded article may not be satisfactory.

The molding material according to the present invention is preferably constituted in such a manner that (C) a thermoplastic resin is arranged in contact with a composite composed of (A) a bundle of continuous reinforcing fibers, (B) a polyarylene sulfide prepolymer or (B') a polyarylene sulfide, and (D) a zero-valent transition metal compound or (E) a low-valent iron compound.

A composite is formed by three components, which are (A) a bundle of reinforcing fibers; (B) a polyarylene sulfide prepolymer or (B') a polyarylene sulfide; and (D) a zero-valent transition metal compound or (E) a low-valent iron compound. This composite has such a configuration shown in FIG. 1 and the spaces between the monofilaments of the (A) bundle of reinforcing fibers are filled with the (B) polyarylene sulfide prepolymer or the (B') polyarylene sulfide. That is, the (A) reinforcing fibers are dispersed in the form of islands in the sea of the (B) polyarylene sulfide prepolymer or the (B') polyarylene sulfide.

Further, it is preferred that, because of the role as a polymerization catalyst, the (D) zero-valent transition metal compound or the (E) low-valent iron compound preferably exist in the sea of the (B) polyarylene sulfide prepolymer or the (B') polyarylene sulfide and/or at the interface between the (A) bundle of reinforcing fibers and the (B) polyarylene sulfide prepolymer or the (B') polyarylene sulfide In a preferred embodiment of the molding material of the present invention, as shown in FIG. 2, the (A) bundle of reinforcing fibers is arranged substantially parallel to the direction of the shaft center of the molding material and has substantially the same length as that of the molding material.

The term "arranged substantially parallel" used herein refers to a condition where the major axis of the bundle of reinforcing fibers and that of the molding material are oriented in the same direction, and the angular displacement between these axes is preferably not larger than 20°, more preferably not larger than 10°, more preferably not larger than 5°. Further, for example, in the case of a pellet-form molding material, the term "substantially the same length" used herein refers to a condition where the bundle of reinforcing fibers is not broken in the middle of the pellet or the pellet contains substantially no reinforcing fiber bundle significantly shorter than the full-length of the pellet. The amount of reinforcing fiber bundle significantly shorter than the full-length of the pellet is not particularly defined here; however, when the content of reinforcing fibers having a length of 50% or less of the full-length of the pellet is not greater than 30 wt %, the molding material is evaluated to contain substantially no reinforcing fiber bundle significantly shorter than the full-length of the pellet. Further, the content of reinforcing fibers having a length of 50% or less of the full-length of the pellet is preferably 20 wt %. Here, the term "full-length of the pellet" refers to the length of the pellet in the direction of the reinforcing fiber orientation. By allowing the (A) bundle of reinforcing fibers to have a length equivalent to that of the molding material, the length of the reinforcing fibers in the resulting molded article can be increased, so that a molded article having excellent mechanical characteristics can be obtained.

FIGS. 3 to 6 each schematically show an example of the cross-sectional configuration of the molding material according to the present invention in the shaft center direction and FIGS. 7 to 10 each schematically show an example of the cross-sectional configuration of the molding material in the orthogonal direction.

The cross-sectional configuration of the molding material is not particularly restricted to the ones shown in the above-described figures as long as the (C) thermoplastic resin is arranged in contact with the composite composed of the (A) bundle of continuous reinforcing fibers, the (B) polyarylene sulfide prepolymer or the (B) polyarylene sulfide, and the (D) zero-valent transition metal compound or the (E) low-valent iron compound. However, as depicted in FIGS. 3 to 5 each showing a cross-section in the shaft center direction, it is preferred that the molding material have a constitution in which the composite serving as the core is sandwiched by the (C) thermoplastic resin in layers.

Further, as depicted in FIGS. 7 to 9 each showing a cross-section in the orthogonal direction, it is preferred that the molding material have a constitution in which the (C) thermoplastic resin is arranged to surround the composite serving as the core in the form of a core-in-sheath structure. In cases where a plurality of composites are arranged to be covered by the (C) thermoplastic resin as shown in FIG. 11, the number of composites is preferably 2 to 6 or so.

The composite and the (C) thermoplastic resin may also be adhered with each other at their boundary to be in a condition where the (C) thermoplastic resin partially impregnates into the composite near the boundary and is compatibilized with the (B) polyarylene sulfide prepolymer or the (B') polyarylene sulfide in the composite, or a condition where the (C) thermoplastic resin impregnates into the reinforcing fibers.

The molding material may continuously maintain substantially the same cross-sectional shape in the shaft center direction. Depending on the molding method, such a continuous molding material may be cut at a certain length.

In the molding material according to the present invention, for example, by a method such as injection molding or press molding, the composite composed of the (A) bundle of continuous reinforcing fibers, the (B) polyarylene sulfide prepolymer or the (B') polyarylene sulfide, and the (D) zero-valent transition metal compound or the (E) low-valent iron compound can be kneaded with the (C) thermoplastic resin to produce a final molded article. From the standpoint of the handling property of the molding material, it is important that the above-described composite and the (C) thermoplastic resin be not separated and maintain the above-described configuration until the molding material is molded. Since the (B) polyarylene sulfide prepolymer has a low molecular weight, it is often a solid which is generally relatively fragile and thus easily broken at room temperature. Therefore, it is desired that the (C) thermoplastic resin be arranged in such a manner to protect the composite and to thereby prevent the (B) polyarylene sulfide prepolymer from being broken and scattered due to a shock, abrasion or the like that may occur during the transport and handling of the molding material before the molding step. Further, since the composite and the (C) thermoplastic resin are totally different in their shape (size and aspect ratio), specific gravity and weight, they may be separated during the transport and handling of the material before the molding process or during the transfer of the material in the molding step, causing variations in the mechanical characteristics of the resulting molded articles, a reduction in the fluidity which leads to clogging of the mold, and/or blocking in the molding step.

Therefore, as illustrated in FIGS. 7 to 9, it is preferred that the molding material have a constitution in which the (C) thermoplastic resin is arranged to surround the composite composed of the (A) bundle of reinforcing fibers, the (B) polyarylene sulfide prepolymer or the (B') polyarylene sulfide, and the (D) zero-valent transition metal compound or the (E) low-valent iron compound, that is, a core-in-sheath structure in which the composite composed of the (A) bundle of reinforcing fibers, the (B) polyarylene sulfide prepolymer or the (B') polyarylene sulfide, and the (D) zero-valent transition metal compound or the (E) low-valent iron compound forms the core and the (C) thermoplastic resin surrounds the composite.

In such a configuration, since the high-molecular-weight (C) thermoplastic resin covers the fragile (B) polyarylene sulfide prepolymer and is arranged on the surface that is likely to be subjected to abrasion, the shape of the molding material is easily maintained. Further, with regard to which constitution—a constitution in which the (C) thermoplastic resin is arranged to surround the composite composed of the (A) bundle of reinforcing fibers, the (B) polyarylene sulfide prepolymer or the (B') polyarylene sulfide, and the (D) zero-valent transition metal compound or the (E) low-valent iron compound, or a constitution in which the composite and the (C) thermoplastic resin are arranged in layers—is more advantageous, from the standpoints of the ease of production and the ease of handling of the materials, it is more preferred that the (C) thermoplastic resin be arranged to surround the composite.

As described in the above, it is desired that the (A) bundle of reinforcing fibers be completely impregnated with the (B) polyarylene sulfide prepolymer or the (B') polyarylene sulfide. However, this is difficult to achieve from the practical standpoint; therefore, the composite composed of the (A) bundle of reinforcing fibers and the (B) polyarylene sulfide prepolymer or the (B') polyarylene sulfide contains voids to some extent. Particularly, when the content of the (A) bundle of reinforcing fibers is large, the amount of voids becomes also large; however, even when the composite contains voids to some extent, the effects of the present invention to facilitate impregnation and fiber dispersion can be attained. The void ratio is in the range of preferably 0 to 40%, more preferably 20% or less. When the void ratio is in the above-described preferred range, excellent effects of facilitating impregnation and fiber dispersion are attained. The void ratio is determined by measuring the relevant part of the composite in accordance with the test method prescribed in ASTM D2734 (1997).

The molding material according to the present invention is preferably cut at a length of 1 to 50 mm to be used. By adjusting the length in the above-described range, the fluidity and the handling property of the molding material at the time of molding can be sufficiently improved. A particularly preferred embodiment of the molding material that is cut at such an appropriate length is a long-fiber pellet used for injection molding.

Further, depending on the molding method, the molding material according to the present invention can also be used as is in a continuous and lengthy form. For example, as a thermoplastic yarn prepreg, the molding material may be wrapped around a mandrel with heating to obtain a roll-form molded article. Examples of such molded article include a tank of liquefied natural gas. Moreover, it is also possible to prepare a thermoplastic prepreg by paralleling and heat-fusing a plurality of the molding materials of the present invention. Such a prepreg can be applied in those fields where heat resistance, high strength, elastic modulus and impact resistance are required, such as the fields of automobile members and aircraft members.

<Method of Producing Molding Material Using (B') Polyarylene Sulfide>

In the present invention, from the standpoint of easily producing the above-described configuration, it is preferred that a molding material comprising (B) a polyarylene sulfide be produced by the following steps. That is, the method of producing the molding material comprises the steps of: [1] preparing a mixture composed of (B) a polyarylene sulfide prepolymer and (D) a zero-valent transition metal compound or (F) a low-valent iron compound; [2] preparing a composite by impregnating (A) a bundle of continuous reinforcing fibers with the thus obtained mixture; and [3] adhering the thus obtained composite and (C) a thermoplastic resin, in which method the (B) polyarylene sulfide prepolymer is, after the step [2], converted to (B') a polyarylene sulfide by polymerizing the (B) polyarylene sulfide prepolymer under heat in the presence of the (D) zero-valent transition metal compound or the (E) low-valent iron compound.

<Step [1]>

The apparatus used in the step [1] to prepare the mixture is not particularly restricted as long as it comprises a mechanism for mixing the loaded (B) polyarylene sulfide prepolymer and (D) zero-valent transition metal compound or (E) low-valent iron compound; however, from the standpoint of uniformly mixing the component (B) and the component (D) or (E), it is preferred that the apparatus comprise a heat source for heat-melting the components. Further, in order to promptly transfer the resulting molten mixture to the step [2], it is more preferred that the apparatus also comprise a liquid transfer mechanism. Examples of the drive system for liquid transfer include selfweight-type, air pressure-type, screw-type and pump-type systems.

Further, it is preferred to perform the heating in a non-oxidizing atmosphere and it is also preferred to perform the heating under reduced pressure. By this, occurrence of undesirable side reactions, such as cross-linking reactions and decomposition reactions of the (B) polyarylene sulfide prepolymer and the (B') polyarylene sulfide generated by the heating as well as such reactions between the (B') polyarylene sulfide and the (B) polyarylene sulfide prepolymer, tends to be inhibited. The term "a non-oxidizing atmosphere" used herein refers to an atmosphere having an oxygen concentration of not higher than 5% by volume, preferably not higher than 2% by volume in the gas phase with which the (B) polyarylene sulfide prepolymer comes into contact, and more preferably an atmosphere containing substantially no oxygen, that is, an inert gas atmosphere such as nitrogen, helium or argon. Thereamong, particularly from the standpoints of the economical efficiency and the ease of handling, a nitrogen atmosphere is preferred. Further, the term "under reduced pressure" means that the pressure inside the system where the reaction is carried out is lower than the atmospheric pressure. The upper limit of the pressure is preferably not higher than 50 kPa, more preferably not higher than 20 kPa, still more preferably not higher than 10 kPa. The lower limit of the pressure is, for example, not lower than 0.1 kPa, preferably not' lower than 0.2 kPa. When the heating is performed under reduced pressure of not lower than the above-described preferred lower limit, the low-molecular-weight cyclic compound represented by the above-described Formula (a), which is contained in the cyclic polyarylene sulfide, is not likely to be vaporized, while when the heating is performed at a pressure of not higher than the above-described preferred upper limit, undesirable side reactions such as cross-linking reaction are not likely to occur.

In the step [1], it is preferred that the temperature and time of the melt-kneading be set such that heat-polymerization reaction of the (B) polyarylene sulfide prepolymer is inhibited as much as possible. The melt-kneading is performed at a temperature of 180 to 270° C., preferably 190 to 260° C., more preferably 200° C. to 250° C. When the heating is performed at the above-described preferred temperature, while the (B) polyarylene sulfide prepolymer is easily melted in a short time, polymerization thereof does not progress rapidly. In addition, an increase in the viscosity caused by the generation of (B') polyarylene sulfide is not likely to occur and the impregnation property in the subsequent step [2] is also good.

In the step [1], the time of the melt-kneading is not particularly restricted; however, in order to prevent the polymerization of the (B) polyarylene sulfide prepolymer from progressing and to thereby avoid an increase in the viscosity, once the mixing of the (B) polyarylene sulfide prepolymer and the (D) zero-valent transition metal compound or the (E) low-valent iron compound is completed, it is preferred to promptly move on to the subsequent step [2]. Accordingly, the time of the heating is in the range of 0.01 to 300 minutes, preferably 1 to 120 minutes, more preferably 5 to 60 minutes. When the heating is performed for the above-described preferred time, while the (B) polyarylene sulfide prepolymer and the (D) zero-valent transition metal compound or the (E) low-valent iron compound are sufficiently mixed, an increase in the viscosity caused by the generation of (B') polyarylene sulfide is not likely to occur and the impregnation property in the subsequent step [2] is also good.

<Step [2]>

The apparatus used in the step [2] is not particularly restricted as long as it comprises a mechanism for impregnating the (A) bundle of continuous reinforcing fibers with the mixture obtained in the step [1]. Examples of such apparatus include one in which the (A) bundle of continuous reinforcing fibers is allowed to pass through a molding die, such as a T-die or a slit die, simultaneously with the molten mixture is fed to the molding die; one in which the molten mixture is fed to a melting bath with the aid of a gear pump and the (A) bundle of continuous reinforcing fibers is allowed to pass through the melting bath while being stretched; one in which the molten mixture is fed to a kiss coater with the aid of a plunger pump, from which kiss coater the molten mixture is applied onto the (A) bundle of continuous reinforcing fibers; and one in which the molten mixture is fed onto a heated rotary roll and the (A) bundle of continuous reinforcing fibers is then allowed to pass on the roll surface. In order to improve the impregnation property, these apparatuses may be used in combination. Alternatively, the resulting composite may be passed through the same apparatus for a plurality of times in a looping manner.

In the step [2], the melt-kneaded mixture is impregnated at a temperature of 180 to 320° C., preferably 190 to 300° C., more preferably 200° C. to 260° C. When the heating is performed at the above-described preferred temperature, the (B) polyarylene sulfide prepolymer is not likely to cause a viscosity increase by coagulation or to solidify, so that excellent impregnation property is attained. Further, undesirable side reactions, such as cross-linking reactions and decomposition reactions of the (B) polyarylene sulfide prepolymer and the (B') polyarylene sulfide generated by the heating as well as such reactions between the (B') polyarylene sulfide and the (B) polyarylene sulfide prepolymer, are not likely to occur, In the step [2], the melt-kneaded mixture is impregnated for a period of 0.01 to 1,000 minutes, preferably 0.02 to 120 minutes, more preferably 0.05 to 60 minutes, still more preferably 0.1 to 10 minutes. When the impregnation time is in the above-described preferred range, the melt-kneaded mixture is sufficiently impregnated into the (A) bundle of reinforcing fibers and good productivity of molding material is attained as well.

<Step [3]>

The apparatus used in the step [3] is not particularly restricted as long as it comprises a mechanism for adhering (C) a thermoplastic resin to the composite obtained in the step [2]. Examples of such apparatus include one in which the composite is allowed to pass through a molding die, such as a T-die or a slit die, simultaneously with molten (C) thermoplastic resin is fed to the molding die; one in which molten (C) thermoplastic resin is fed to a melting bath with the aid of a gear pump and the composite is then passed through the melting bath; one in which molten (C) thermoplastic resin is fed to a kiss coater with the aid of a plunger pump, from which kiss coater the molten (C) thermoplastic resin is applied onto the composite; and one in which molten (C) thermoplastic resin is fed onto a heated rotary roll and the composite is then allowed to pass on the roll surface.

In the step [3], the temperature at which the composite and the (C) thermoplastic resin are adhered cannot be generalized because it varies depending on the properties of the (C) thermoplastic resin to be used, such as molecular structure, molecular weight and composition; however, the lower limit of the temperature can be, for example, the melting point of the (C) thermoplastic resin used. The upper limit of the temperature can be higher than the above-described melting point by, for example, 80° C., preferably 50° C., more preferably 30° C., still more preferably 20° C. In such temperature range, the (C) thermoplastic resin can be easily adhered to the composite and phenomena that are undesirable in the production process, such as thermal decomposition of the (C) thermoplastic resin, can be inhibited. Here, the melting point can be determined by using a differential scanning calorimeter (DSC) or the like.

In the step [3], the time for which the composite is allowed to pass through the apparatus used for adhering the composite and the (C) thermoplastic resin is not particularly restricted; however, it is, for example, 0.0001 to 120 minutes, preferably 0.0002 to 60 minutes, more preferably 0.002 to 30 minutes. When the time is in the above-described preferred range, the composite and the (C) thermoplastic resin are easily adhered and good productivity of molding material is attained as well, In the method of producing a molding material according to the present invention, the (B) polyarylene sulfide prepolymer may be converted to (B') a polyarylene sulfide in any of the steps [1] to [3]; however, in order to efficiently impregnate the (B) polyarylene sulfide prepolymer into the (A) bundle of reinforcing fibers, it is preferred that the (B) polyarylene sulfide prepolymer be selectively polymerized in the step [2] or later. In order to satisfy this requirement, the above-described conditions of the steps [1] to [3], such as apparatus, temperature and time, are suitably adopted.

Further, after the steps [1] to [3], it is also significant to subject the resulting molding material to a heat treatment at 180 to 320° C., preferably 190 to 300° C., more preferably 200° C. to 260° C., thereby heat-polymerizing the (B) polyarylene sulfide prepolymer remaining in the molding material.

<Method of Producing Molded Article by Using Molding Material Comprising (B) Polyarylene Sulfide Prepolymer>

In the molding material according to the present invention, when a molded article is produced by molding a molding material comprising (B) a polyarylene sulfide prepolymer, the (B) polyarylene sulfide prepolymer is converted to (B') a polyarylene sulfide by heat-polymerization in the presence of (D) a zero-valent transition metal compound or (E) a low-valent iron compound.

In the present invention, since the (B) polyarylene sulfide prepolymer has excellent impregnation property and is thus capable of easily yielding a composite with (A) a bundle of reinforcing fibers, the (B) polyarylene sulfide prepolymer has an effect of improving the productivity of molding material. In addition, since the (B) polyarylene sulfide prepolymer also has excellent fluidity, for example, when the molding material according to the present invention is injection-molded, the (B) polyarylene sulfide prepolymer, which is melt-kneaded in a cylinder of an injection-molding machine and has good fluidity, diffuses into the (C) thermoplastic resin to assist the dispersion of the (A) bundle of reinforcing fibers in the (C) thermoplastic resin. Further, the (B) polyarylene sulfide prepolymer is easily replaced by the (C) thermoplastic resin, thereby allowing the (A) bundle of reinforcing fibers to be more readily dispersed. Because of the above-described effects, the (B) polyarylene sulfide prepolymer assumes the role as a so-called impregnation aid/dispersion aid.

Further, in the present invention, the (D) zero-valent transition metal compound or the (E) low-valent iron compound assumes the role as a so-called polymerization catalyst to facilitate the conversion of the (B) polyarylene sulfide prepolymer into (B') a polyarylene sulfide by heating. When producing a molded article by molding the molding material according to the present invention, the (B) polyarylene sulfide prepolymer can be converted to (B') a polyarylene sulfide by polymerizing the (B) polyarylene sulfide prepolymer under heat in the presence of the (D) zero-valent transition metal compound or (E) low-valent iron compound. Because of such effect of the (D) zero-valent transition metal compound or (E) low-valent iron compound, for example, when the molding material according to the present invention is injection-molded, polymerization of the (B) polyarylene sulfide prepolymer progresses in the cylinder and mold during the injection-molding step, so that a molded article having excellent mechanical characteristics can be obtained.

In the molding material according to the present invention, the molding material comprising the (B) polyarylene sulfide prepolymer can be heat-melted to be molded into a prescribed shape. The temperature at which the molding material is melted varies depending on the selected starting materials; however, the preferred range thereof is, for example, 180° C. to 400° C., more preferably 200° C. to 380° C., still more preferably 230° C. to 360° C. In the above-described preferred temperature range, the (B) polyarylene sulfide prepolymer and/or the (C) thermoplastic resin is/are easily melted, so that the molding material attains excellent moldability. Further, deterioration of the physical properties and void generation in the resulting molded article, which are caused by thermal decomposition of the (C) thermoplastic resin, do not occur.

Further, in the molding material according to the present invention, the molding material comprising the (B) polyarylene sulfide prepolymer may also be preheated prior to being molded. The temperature at which the molding material is preheated varies depending on the selected materials; however, it is, for example, 180° C. to 400° C., more preferably 200° C. to 380° C., still more preferably 230° C. to 360° C. By preheating the molding material in such temperature range, the conversion of the (B) polyarylene sulfide prepolymer to (B') a polyarylene sulfide is advanced; therefore, there is an effect of shortening the molding time. From the standpoint of the productivity, after the preheating step, the resulting molding material may also be directly loaded to a molding machine.

Further, in the molding material according to the present invention, separately from the above-described preheating step, the molding material comprising the (B) polyarylene sulfide prepolymer may also, be subjected to a pretreatment to such an extent which does not adversely affect the objects of the present invention. Examples of the pretreatment include drying, degreasing, degassing, cutting, shaping, lamination, arrangement and adhesion.

<Molding Method>

The molding material according to the present invention can be processed into a molded article of a final shape by a variety of molding methods. Examples of the molding method include press molding, stampable molding, transfer molding, injection molding and combinations of these molding methods.

The molding material according to the present invention can be molded into a variety of shapes to produce a complex-shaped molded article, such as a rib, a hub or a gear, or a wide-width molded article such as a flat plate, a square plate or a round plate. In the case of producing a complex-shaped molded article, injection molding and transfer molding are preferably employed and, from the standpoint of the productivity, injection molding is more preferably employed. For the production of a wide-width molded article, press molding and stamping molding are preferably employed.

In cases where the molding material according to the present invention is injection-molded, it is preferred that the molding material be in the form of a pellet. In injection molding, heat, pressure and kneading are applied when plasticizing the pellet-form molding material; therefore, according to the present invention, the (B) polyarylene sulfide prepolymer or (B') polyarylene sulfide exerts excellent effect as a dispersion/impregnation aid. In this case, a conventional in-line screw-type injection molding machine can be used and, even when the kneading effect provided by a screw is weak due to the use of a screw having a shape of a low compression ratio or a low back pressure in the plasticization of the material, the reinforcing fibers can be dispersed sufficiently in the matrix resin, so that a molded article in which the fibers are well-impregnated with the resin can be obtained, Further, the molded article obtained by molding the molding material of the present invention may also be subjected to a heat treatment. The temperature at which the molded article is heated varies depending on the starting materials used for the production of the molding material; however, it is, for example, 180° C. to 400° C., more preferably 200° C. to 380° C., still more preferably 230° C. to 360° C. By heat-treating the molded article in such temperature range, the conversion of the (B) polyarylene sulfide prepolymer to (B') a polyarylene sulfide is advanced, so that the mechanical characteristics of the molded article may be improved.

Moreover, separately from the above-described heating step, the molded article obtained in the present invention may also be subjected to a post-treatment to such an extent which does not adversely affect the objects of the present invention. Examples of the post-treatment include annealing, polishing, cutting, grinding, adhesion and coating.

<Molded Article>

Examples of a molded article produced from the molding material according to the present invention include automobile components such as cylinder head covers, bearing retainers, intake manifolds and pedals; tools such as wrenches, spanners and screw-drivers; and small parts such as gears. Since the molding material according to the present invention has excellent fluidity, a thin molded article of 0.5 to 2 mm in thickness can be relatively easily produced therefrom. Examples of applications where such a thin molded article is required include components of electrical and electronic instruments that are represented by, for example, chassis used in personal computers and cell phones and keyboard support members that support a keyboard in a personal computer. In such components of electrical and electronic instruments, it is more preferred that an electroconductive carbon fiber be used as a reinforcing fiber because electromagnetic wave-shielding property is thereby imparted.

<Prepreg>

The prepreg according to embodiments of the present invention is a prepreg obtained by impregnating a reinforcing fiber with a resin composition comprising (B) a polyarylene sulfide prepolymer, which contains a cyclic polyarylene sulfide in an amount of at least 50 wt % and has a weight-average molecular weight of not lower than 10,000, and (D) a zero-valent transition metal compound or (E) a low-valent iron compound.

Examples of a method of producing the (B) polyarylene sulfide prepolymer in the present invention include the above-described methods [B1] and [B2].

The resin composition used in the present invention may also contain a component(s) other than the (B) polyarylene sulfide prepolymer. The component other than the (B) polyarylene sulfide prepolymer is not particularly restricted, and polymers and oligomers of various thermoplastic resins, various thermosetting resins, and various additives such as inorganic fillers, compatibilizing agents, antioxidants, heat stabilizers, ultraviolet absorbers, flame retardants, coloring agents and adhesives, may be blended.

Specific examples of the thermoplastic resins include linear or cyclic polymers and oligomers of polyethylene, polyamide, polyester, polystyrene, polycarbonate, polyphenylene oxide, polyimide, polyamide imide, polyether ketone, polyvinyl formal, polyvinyl acetal, polysulfone and polyether sulfone.

Specific examples of the thermosetting resins include unsaturated polyester resins, vinylester resins and epoxy resins.

Further, in order to facilitate lamination of the resulting prepreg, it is preferred that a tackifier be added to the above-described resin composition. As the tackifier, a compound which has a softening point of not higher than 150° C. and contains a polar group in the molecule is suitably employed. The term "softening point" used herein refers to the Vicat softening temperature prescribed in JIS K7206-1999. Since a compound whose softening point is not higher than 150° C. has a relatively low molecular weight, such a compound exhibits good fluidity and improves the adhesion at the time of prepreg lamination. Further, a compound having a polar group in the molecule is also preferred since it induces formation of a weak bond, such as a hydrogen bond, and thereby improves the adhesion at the time of prepreg lamination. Specifically, for example, an ethylene-ethyl acrylate copolymer, an ethylene-vinylacrylate copolymer, a terpene polymer, a terpene-phenol copolymer, a polyurethane elastomer or an acrylonitrile butadiene rubber (NIR) is suitably employed.

In the present invention, a variety of zero-valent transition metal compounds can be used as a polymerization catalyst. As a zero-valent transition metal compound, the above-described (D) zero-valent transition metal compound is preferably used.

In the present invention, a variety of low-valent iron compounds can be used as a polymerization catalyst. As a low-valent iron compound, the above-described (E) low-valent iron compound is preferably used.

The prepreg according to the present invention is obtained by impregnating reinforcing fibers with the above-described resin composition.

In the present invention, the form and alignment of the reinforcing fibers may be, for example, those of unidirectionally aligned fibers, a woven fabric (cloth), a knit, a braid, a tow or a mat. Thereamong, unidirectionally aligned fibers are preferably used since the strength characteristics can be easily designed based on its laminated structure, and a woven fabric is also preferably used since it can be easily shaped to have a curved surface.

In the present invention, the weight content of the reinforcing fibers in the prepreg can be characteristically increased by impregnating the reinforcing fibers with a resin composition containing a cyclic polyarylene sulfide in a prescribed amount or more (wt %). In embodiments of the present invention, from the standpoint of the balance between the mechanical properties and the moldability, the weight content of the reinforcing fibers in the prepreg is set at 60 to 80 wt %. When the weight content is less than the lower limit value, satisfactory flexural strength and mechanical properties are not attained, while when the weight content is higher than the upper limit value, it becomes difficult to impregnate the reinforcing fibers with the resin composition.

The weight content of the reinforcing fibers can be determined by eluting the resin from the prepreg with an organic solvent or the lie and measuring the weight of the fibers.

The prepreg of the present invention can be produced by a wet method in which the resin composition is dissolved or dispersed in a solvent to have a reduced viscosity thereof and then impregnated, or a hot-melt method in which the viscosity of the resin composition is reduced by heating and the resulting resin composition is subsequently impregnated.

In the wet method, the prepreg is obtained by immersing the reinforcing fibers into a solution or dispersion of the resin composition; removing the resulting fibers therefrom; and then evaporating the solvent using an oven or the like.

In the hot-melt method, the prepreg is obtained by a process in which the resin composition is heated to have a reduced viscosity and then allowed to directly impregnate into the reinforcing fibers under heat and pressure, or by a process in which a resin film prepared in advance by coating the resin composition onto a mold-releasing paper or the like is laminated on either or both sides of the reinforcing fibers and then heat and pressure are applied thereto to allow the resin to impregnate into the fibers. In the hot-melt method, since a solvent is not used, it is required that the resin viscosity be reduced to some extent in the step of impregnating the reinforcing fibers with the resin; however, substantially no solvent remains in the resulting prepreg, which is preferred.

Further, the fiber-reinforced composite material according to the present invention can be obtained by, in the above-described prepreg, polymerizing the resin composition containing the (B) polyarylene sulfide prepolymer. That is, after laminating one or more prepregs described in the above in an arbitrary constitution, the resin composition containing the (B) polyarylene sulfide prepolymer is polymerized under heat and pressure. The heating temperature and pressure are not particularly restricted, and the heating temperature is, for example, 150° C. to 300° C., preferably 180° C. to 270° C. The pressure is, for example, 0.1 MPa to 10 MPa, preferably 0.2 MPa to 5 MPa.

As a method of applying heat and pressure, for example, a press-molding method in which the prepreg of an arbitrary constitution is placed in a mold or on a press plate and pressure is applied by subsequently closing the mold or the press plate; an autoclave molding method in which the prepreg of an arbitrary constitution is placed in an autoclave where the prepreg is subsequently pressed and heated; a bag-molding method in which the prepreg of an arbitrary constitution is wrapped with a nylon film or the like and the pressure therein is then reduced, followed by heating of the wrapped prepreg in an oven under atmospheric pressure; a wrapping tape method in which the prepreg of an arbitrary constitution is wrapped with a tape with tension and the wrapped prepreg is subsequently heated in an oven; or an internal pressure molding method in which the prepreg of an arbitrary constitution is placed in a mold and pressure is applied thereto by injecting a gas or a liquid into a core placed in the same mold, can be employed.

The fiber-reinforced composite material according to the present invention obtained in the above-described manner comprises (B) a polyarylene sulfide as the matrix resin and is, therefore, excellent in terms of, for example, heat resistance, mechanical properties, flame retardancy and chemical resistance. Further, since the matrix resin is a thermoplastic (B) polyarylene sulfide and can be plasticized by heating or the like, the fiber-reinforced composite material can be easily recycled or repaired.

<Method of Producing Fiber-Reinforced Molding Base Material>

The method of producing a fiber-reinforced molding base material according to the present invention will now be concretely described.

In an embodiment of the production method according to the present invention, a fiber-reinforced molding base material comprising (B') a polyarylene sulfide as a matrix resin is produced by using, as starting materials, (A') a continuous reinforcing fiber substrate, (B) a polyarylene sulfide prepolymer and (D) a zero-valent transition metal compound or (E) a low-valent iron compound. First, these components will be each described.

<(A') Reinforcing Fiber Substrate>

In the (A') reinforcing fiber substrate used in the present invention, the reinforcing fiber is not particularly restricted, and examples thereof include carbon fibers, glass fibers, aramid fibers, boron fibers, alumina fibers, mineral fibers and silicon carbide fibers. Two or more types of these fibers may be used in combination as well. Thereamong, from the standpoint of obtaining a molded article having a light weight, high strength and high elastic modulus, a carbon fiber is preferably used. As the carbon fiber, for example, a PAN-based carbon fiber, a rayon-based carbon fiber, a lignin-based carbon fiber or a pitch-based carbon fiber can be employed, and two or more thereof may be used in combination. Thereamong, from the standpoint of the balance between the cost and the strength, a PAN-based carbon fiber is preferred. Further, from the standpoint of the mechanical characteristics of the resulting molded article, a PAN-based carbon fiber having a tensile elastic modulus of 200 to 700 GPa is more preferred, The f and alignment of the (A') reinforcing fiber substrate used in the present invention are not particularly restricted as long as the reinforcing fiber is continuous. For example, the (A') reinforcing fiber substrate may be a bundle of reinforcing fibers in which continuous reinforcing fibers are converged into the form of a bundle (hereinafter, may be simply referred to as "reinforcing fiber bundle"), a substrate in which continuous reinforcing fibers are unidirectionally arranged (hereinafter, may be simply referred to as "unidirectionally-oriented substrate"), a woven fabric (cloth), a nonwoven fabric, a mat, a knit, a braid, a yarn or tow. Thereamong, a reinforcing fiber bundle is preferred since it can be continuously withdrawn at a high rate, and a unidirectionally-oriented substrate is preferred since the strength characteristics can be easily designed based on its laminated structure. Further, a woven fabric is also preferred since it can be easily shaped to have a curved surface, and a nonwoven fabric and a mat are also preferably used since they can be easily molded in the thickness direction. Here, the term "unidirectionally-oriented substrate" refers to a substrate in which a plurality of reinforcing fibers are arranged parallel to each other. Such unidirectionally-oriented substrate can be produced by, for example, a method by which plural bundles of continuous reinforcing fibers are unidirectionally paralleled and then leveled into the form of a sheet.

In cases where the (A') reinforcing fiber substrate is a reinforcing fiber bundle, a greater number of reinforcing fiber monofilaments is more advantageous in terms of the economical efficiency; therefore, the number of the monofilaments is preferably not less than 10,000. Meanwhile, a greater number of reinforcing fiber monofilaments tends to be more disadvantageous in terms of the impregnation property of the matrix resin; therefore, in cases where a carbon fiber bundle is used as the reinforcing fiber bundle, from the standpoint of attaining both satisfactory economical efficiency and impregnation property, the number of monofilaments is more preferably 15,000 to 100,000, particularly preferably 20,000 to 50,000, Further, in order to bind monofilaments into the form of a reinforcing fiber bundle, in the present invention, a sizing agent may also be used in addition to the component (B). By adhering the sizing agent to the reinforcing fiber bundle, in order to improve the handling property of the reinforcing fibers during transport and the processability thereof in the process of producing a molding material, one or more sizing agents, for example, various thermoplastic resins such as epoxy resins, urethane resins and acrylic resins, can also be used in combination in such an amount which does not adversely affect the objects of the present invention.

In cases where the (A') reinforcing fiber substrate is a unidirectional substrate, a woven fabric, a nonwoven fabric or a mat, the number of the reinforcing fiber monofilaments is not particularly restricted.

Further, in the present invention, in order to inhibit detachment of the monofilaments, the (A') reinforcing fiber substrate may also contain a binding agent in addition to the component (B). By adhering the binding agent to the reinforcing fiber substrate, for the purpose of improving the handling property of the reinforcing fibers during transport and the processability thereof in the process of producing a molding material, one or more binders, for example, various thermoplastic resins such as epoxy resins, urethane resins and acrylic resins, can be used in combination in such an amount which does not adversely affect the objects of the present invention.

<(B) Polyarylene Sulfide Prepolymer>

In the present invention, as the (B) polyarylene sulfide prepolymer, a polyarylene sulfide prepolymer which contains a cyclic polyarylene sulfide represented by the above-described Formula (a) in an amount of at least 50 wt % and has a weight-average molecular weight of less than 10,000 is preferably used.

In a more preferred embodiment, the polyarylene sulfide prepolymer contains the cyclic polyarylene sulfide in an amount of not less than 70 wt %, more preferably not less than 80 wt %, particularly preferably not less than 90 wt %. Further, the upper limit of the amount of the cyclic polyarylene sulfide contained in the polyarylene sulfide prepolymer is not particularly restricted; however, from the standpoint of the productivity, it is in the range of, for example, not more than 98 wt %, preferably not more than 95 wt %.

Normally, the higher the weight ratio of the cyclic polyarylene sulfide in the polyarylene sulfide prepolymer, the higher does the polymerization degree of the (B') polyarylene sulfide obtained by heating tend to become. That is, in the present invention, by adjusting the ratio of the cyclic polyarylene sulfide contained in the (B) polyarylene sulfide prepolymer, the polymerization degree of the (B') polyarylene sulfide can be adjusted.

Examples of the method of producing the (B) polyarylene sulfide prepolymer include the above-described method [B1] and [B2].

In the present invention, the (B) polyarylene sulfide prepolymer may also contain, for example, a thermoplastic resin, a thermosetting resin, an elastomer, a rubber component, a flame retardant, an inorganic filler, an electro conductivity-improving component such as carbon black, a crystal nucleating agent, an antioxidant, an ultraviolet absorber, a damping agent, an antibacterial agent, an insect repellent, a deodorizer, a coloring agent, a pigment, a dye, a heat stabilizer, a mold-releasing agent, an adhesive, an antistatic agent, a plasticizer, a lubricant, a foaming agent, an anti-foaming agent and/or a coupling agent, in such an amount which does not impairs the effects of the present invention.

In the present invention, a variety of zero-valent transition metal compounds can be used as a polymerization catalyst. As such zero-valent transition metal compound, the above-described (D) zero-valent transition metal compound is preferably used.

In the present invention, a variety of low-valent iron compounds can be used as a polymerization catalyst. As such low-valent iron compound, the above-described (E) low-valent iron compound is preferably used.

<Method of Producing Fiber-Reinforced Molding Base Material>

The method of producing a fiber-reinforced molding base material according to an embodiment of the present invention comprises at least the following steps.

Step (I): withdrawing and continuously feeding (A') a continuous reinforcing fiber substrate;

Step (II): compositing the component (A') with (B) a polyarylene sulfide prepolymer;

Step (III): heating the composite obtained in the step (II) to convert the component (B) into (B') a polyarylene sulfide; and Step (IV): cooling the composite obtained in the step (III) and taking up the thus cooled composite.

Further, the method of producing a fiber-reinforced molding base material according to the present invention is characterized in that, in the above-described step (III), the (B) polyarylene sulfide prepolymer is converted into the (B') polyarylene sulfide by polymerizing the (B) polyarylene sulfide prepolymer under heat in the presence of (D) a zero-valent transition metal compound or (E) a low-valent iron compound, These steps can be carried out, off-line; however, from the standpoints of the economical efficiency and the productivity, it is preferred that the steps (I) to (IV) be carried out on-line.

The expression "the steps (I) to (IV) are carried out on-line" used herein means that all of the steps (I) to (IV) are carried out on-line continuously (see, for example, FIGS. 12 to 14) or intermittently.

These steps will now be each described.

<Step (I)>

The step (I) is a step of feeding (A') a continuous reinforcing fiber substrate to the production line. Here, in order to carry out the production with good economical efficiency and productivity, it is important that the (A') continuous reinforcing fiber substrate be fed continuously. The term "continuously" used herein means that the (A') continuous reinforcing fiber substrate, which is a starting material, is fed without being completely cut. The feeding rate may be constant, or the feeding may be stopped and resumed intermittently. Further, in order to improve the shapability of the resulting fiber-reinforced molding base material, a step of cutting a part of the (A') continuous reinforcing fiber substrate to make a slit (notch) thereon may also be incorporated. The term "continuous reinforcing fiber substrate" refers to a reinforcing fiber substrate in such a condition where it can be continuously fed.

Further, the step (I) is also intended to withdraw and position the (A') continuous reinforcing fiber substrate in a certain arrangement. That is, the (A') continuous reinforcing fiber substrate to be fed may be in the form of a yarn, a unidirectionally aligned sheet or a preform having a predetermined shape. Specifically, for example, a method in which a bundle of continuous reinforcing fibers is applied to a creel, withdrawn therefrom and then allowed to pass through a roller to be fed to the production line; a method in which plural bundles of continuous reinforcing fibers are unidirectionally arranged into the form of a sheet and the sheet is then passed through a roll bar and fed to the production line; or a method in which the (A') continuous reinforcing fiber substrate, which has been rolled in advance in the form of a woven fabric, a nonwoven fabric or a mat, is applied to a creel, withdrawn therefrom and then allowed to pass through a roller to be fed to the production line, can be employed. Here, a method utilizing a reinforcing fiber bundle is preferably employed since it can be withdrawn at a high rate, and a method utilizing a roll is also preferably employed since such a method is capable of producing a large amount of fiber-reinforced molding base material at once.

In addition, for example, a method in which a bundle of continuous reinforcing fibers is allowed to pass through a plurality of roll bars, which are arranged to assume a prescribed shape, and then fed to the production line can also be employed. Moreover, in cases where the (A') continuous reinforcing fiber substrate has been processed into a planar form, the substrate in a zigzagly-wound condition or the like may be directly fed to the production line. Here, from the standpoint of production management, it is more preferred to install a drive unit on various rollers and roll bars because this enables to adjust the feeding rate and the like.

Further, from the standpoint of the productivity, it is preferred that the step (I) also comprise a process of heating the (A') continuous reinforcing fiber substrate to 50 to 500° C., preferably 80 to 400° C., more preferably 100 to 300° C. By heating the (A') continuous reinforcing fiber substrate, the fixation of the (B) polyarylene sulfide prepolymer onto the (A') continuous reinforcing fiber substrate can be improved in the subsequent step (II). In addition, the heating can also soften the sizing agent or the like adhered to the reinforcing fiber bundle, thereby opening the reinforcing fiber bundle. The heating method is not particularly restricted, and examples thereof include a non-contact heating method by means of hot air or an infrared heater and a contact-heating method by means of a pipe heater or electromagnetic induction.

Further, in the step (I), for example, in cases where the (A') continuous reinforcing fiber substrate is a reinforcing fiber bundle or a unidirectionally-oriented substrate, it is preferred that the step (I) include a fiber-opening operation. The term "fiber-opening" used herein refers to an operation of separating the fibers of a reinforcing fiber bundle, and this operation is expected to have an effect of further improving the impregnation property of the (B) polyarylene sulfide prepolymer. By such fiber-opening operation, the thickness of the reinforcing fiber bundle is reduced. When the reinforcing fiber bundle has a width of w1 (mm) and a thickness of t1 (μm) prior to the fiber-opening and a width of w2 (mm) and a thickness of t2 (μm) after the fiber-opening, the fiber-opening ratio, (w2/t2)/(w1/t1), is preferably 2.0 or higher, more preferably 2.5 or higher.

The method of opening the fibers of a reinforcing fiber bundle is not particularly restricted, and examples thereof include a method in which the reinforcing fiber bundle is alternately passed through concave and convex rolls; a method in which a drum-type roll is used; a method in which tension fluctuation is applied to axial oscillation; a method in which the tension of the reinforcing fiber bundle is fluctuated using two friction bodies that are in vertical reciprocating motion; and a method in which air is blown against the reinforcing fiber bundle.

<Step (II)>

The step (II) is a step of compositing the (A') continuous reinforcing fiber substrate with (B) a polyarylene sulfide prepolymer. The compositing method is not particularly restricted, and preferred examples thereof include the following 4 methods [c1] to [c4] based on the morphology of the (B) polyarylene sulfide prepolymer.

[c1]: A method of compositing the (B) polyarylene sulfide prepolymer, which assumes at least one form selected from the group consisting of particulate-form, fiber-form and flake-form, with the (A') continuous reinforcing fiber substrate in a gas phase. That is, the (B) polyarylene sulfide prepolymer assuming at least one form selected from the group consisting of particulate-form, fiber-form and flake-form is dispersed in a gas phase and the (A') continuous reinforcing fiber substrate is allowed to pass through the gas phase. Specific examples of this method include a method in which the (B) polyarylene sulfide prepolymer is applied to a fluidized bed or the like and the (A') continuous reinforcing fiber substrate is allowed to pass therethrough; a method in which the (B) polyarylene sulfide prepolymer is directly applied to the (A') continuous reinforcing fiber substrate; and a method in which the (B) polyarylene sulfide prepolymer is electrically charged to be electrostatically adhered to the (A') continuous reinforcing fiber substrate.

[c2]: A method of compositing the (B) polyarylene sulfide prepolymer, which assumes at least one form selected from the group consisting of particulate-form, fiber-form and flake-form, with the (A') continuous reinforcing fiber substrate in a liquid phase. That is, the (B) polyarylene sulfide prepolymer assuming at least one form selected from the group consisting of particulate-form, fiber-form and flake-form is dispersed or dissolved in a liquid phase and the (A') continuous reinforcing fiber substrate is allowed to pass through the liquid phase. Here, the term "dispersed" means that the (B) polyarylene sulfide prepolymer maintains a preferred size in the below-described respective forms without undergoing secondary aggregation to form a coarse aggregate of 1 mm or larger. The method of dispersing or dissolving the (B) polyarylene sulfide prepolymer in a liquid phase is not particularly restricted, and examples thereof include a method which utilizes a stirring apparatus; a method which utilizes a vibratory apparatus; a method which utilizes an ultrasonic generator; and a method which utilizes a jet apparatus. From the standpoint of maintaining the dispersed or dissolved state, it is more preferred that these method be employed also in the liquid phase through which the (A') continuous reinforcing fiber substrate is allowed to pass.

The liquid phase used here is, for example, water or an organic solvent. From the standpoints of the economical efficiency and the productivity, it is more preferred to use pure water or industrial water. Further, in order to assist the dispersion of the (B) polyarylene sulfide prepolymer, a variety of surfactants, such as anionic, cationic or nonionic surfactants, may also be used in combination. The amount of the surfactant(s) to be used is not particularly restricted; however, it is preferably in the range of, for example, 0.01 to 5 wt %.

Further, in the method [c2], a particularly preferred form of the (B) polyarylene sulfide prepolymer is emulsion or dispersion. In this case, from the standpoint of the dispersibility, the (B) polyarylene sulfide prepolymer has an average particle size of preferably 0.01 to 100 μm, more preferably 0.05 to 50 μm, still more preferably 0.1 to 20 μm.

When the (B) polyarylene sulfide prepolymer is in the form of particles, from the standpoints of the processability and handling property of the particles, the particles have an average size of preferably 50 to 300 μm, more preferably 80 to 250 μm, still more preferably 100 to 200 μm. Further, when the (B) polyarylene sulfide prepolymer is in the form of fibers, the fibers have an average diameter of preferably 0.5 to 50 more preferably 1 to 30 µm, still more preferably 5 to 20 µm. The average fiber length is not particularly restricted; however, it is preferably in the range of, for example, 1 to 10 mm. Moreover, when the (B) polyarylene sulfide prepolymer is in the form of flakes, the flakes have the same thickness as that of the above-described particles and the length of the flakes is preferably 5 to 100 times of their thickness.

The average particle size can be determined by using a laser diffraction/scattering-type particle size distribution analyzer. The average fiber diameter, the average fiber length and the thickness and length of the flakes can be easily measured under a light microscope. Here, when measuring the average fiber diameter, the average fiber length and the thickness and length of the flakes under a light microscope, the measurement may be made at 400 arbitrary points at a magnification ×20 to ×100 and the average of the measured values can be calculated.

In cases where an organic solvent is used as the liquid phase, the organic solvent is not particularly restricted as long as it does not inhibit the polymerization of (B) polyarylene sulfide prepolymer performed by heating and causes substantially no undesirable side reaction such as decomposition or cross-linking of the resulting (B') polyarylene sulfide. Examples of such organic solvent include N-methyl-2-pyrrolidone, dimethyl formamide, dimethyl sulfoxide, acetone, methyl ethyl ketone, diethyl ketone, dimethyl ether, dipropyl ether, tetrahydrofuran, chloroform, methylene chloride, trichloroethylene, ethylene dichloride, dichloroethane, tetrachloroethane, chlorobenzene, methanol, ethanol, propanol, butanol, pentanol, ethylene glycol, propylene glycol, phenol, cresol, polyethylene glycol, benzene, toluene and xylene. Alternatively, an inorganic compound such as carbon dioxide, nitrogen or water can also be used as a solvent in a supercritical liquid state. The above-described solvents may be used individually, or two or more thereof may be used as a mixture.

Specific examples of the method [c2] include a method in which an emulsion or dispersion of the (B) polyarylene sulfide prepolymer is fed to a tank and the (A') continuous reinforcing fiber substrate is allowed to pass therethrough; a method in which the (A') continuous reinforcing fiber substrate is allowed to pass the tank with the aid of a jet flow; and a method in which an emulsion or dispersion of the cyclic polyarylene sulfide is directly sprayed onto the (A') continuous reinforcing fiber substrate.

Further, in the method [c2], from the standpoint of the productivity, it is more preferred that the used water or organic solvent be removed (liquid removal) after allowing the (A') continuous reinforcing fiber substrate to pass through the above-described tank. Examples of liquid removal method include air-blowing, hot-air drying and suction filtration. In this case, the removal rate of water or organic solvent from the composite is not particularly restricted; however, it is preferably 50 to 100%, more preferably 70 to 100%, still more preferably 90 to 100%. Further, from the productivity and environmental standpoints, it is particularly preferred that, after the liquid removal, the liquid phase be recovered, circulated and reused. Here, the liquid removal rate can be easily determined from the difference in the mass of the composite before and after the liquid removal operation.

[c3]: A method of compositing the (B) polyarylene sulfide prepolymer, which assumes at least one form selected from the group consisting of film-form, sheet-form and nonwoven fabric-form, with the (A') continuous reinforcing fiber substrate. The term "film-form" used herein means that the (B) polyarylene sulfide prepolymer has an average thickness of 200 µm or less, while the term "sheet-form" means that the (B) polyarylene sulfide prepolymer has an average thickness of greater than 200 µm. Further, the term "nonwoven fabric-form" means that the (B) polyarylene sulfide prepolymer is in the form of a fiber sheet or web in which the fibers are unidirectionally or randomly oriented and bound with each other by any of interlacing, fusion or adhesion. Here, the average thickness can be determined by laminating a plurality of sheets or films, measuring the thickness of the resulting laminate at 10 arbitrary points using calipers and then dividing the measured thickness by the number of laminated sheets or films.

Specific examples of the method [c3] include a method in which the (A') continuous reinforcing fiber substrate is transferred onto a conveyor and the (B) polyarylene sulfide prepolymer in the form of a film is laminated on either or both sides of the (A') continuous reinforcing fiber substrate using a hot roller; a method in which the (B) polyarylene sulfide prepolymer in the form of a nonwoven fabric is fixed by punching; and a method in which the (A') continuous reinforcing fiber substrate and the (B) polyarylene sulfide prepolymer in the form of a nonwoven fabric are intertwined with the aid of air jet.

Further, in the method [c3], from the standpoints of the economical efficiency and the productivity, it is preferred that the (B) polyarylene sulfide prepolymer in any form be processed into a roll. When it is difficult to process the (B) polyarylene sulfide prepolymer into a roll individually, for example, it is preferred that the (B) polyarylene sulfide prepolymer be processed into the respective form, applied onto a mold-releasing paper and then processed into a roll,

[c4]: A method of heat-melting the (B) polyarylene sulfide prepolymer and feeding the resultant in contact with (A') continuous reinforcing fiber substrate. In this method, the heat-melting can be carried out using an apparatus such as an extruder, a plunger or a melting bath, and it is preferred that the apparatus has a function of transferring molten (B) polyarylene sulfide prepolymer, such as a screw or a gear pump.

Specific examples of the method [c4] include a method in which the (B) polyarylene sulfide prepolymer is fed to a molding die such as a T-die or a slit die while being melted in an extruder and the (A') continuous reinforcing fiber substrate is allowed to pass through the molding die; a method in which the (B) polyarylene sulfide prepolymer is fed to a melting bath in the same manner with the aid of a gear pump and the (A') continuous reinforcing fiber substrate is allowed to pass through the melting bath while being stretched; a method in which molten (B) polyarylene sulfide prepolymer is fed to a kiss coater with the aid of a plunger pump, from which kiss coater the molten (B) polyarylene sulfide prepolymer is applied onto the (A') continuous reinforcing fiber substrate; and a method in which molten (B) polyarylene sulfide prepolymer is fed onto a heated rotary roll in the same manner and the (A') continuous reinforcing fiber substrate is then allowed to pass on the roll surface.

Further, in the method [c4], it is preferred that the heat-melting temperature be set such that polymerization reaction of the (B) polyarylene sulfide prepolymer is inhibited as much as possible. The heat-melting is performed at a temperature of 180 to 270° C., preferably 190 to 260° C., more preferably 200° C. to 250° C. When the heating is performed at a temperature lower than 180° C., there is an undesirable tendency that the (B) polyarylene sulfide prepolymer is not melted or the melting of the (B) polyarylene sulfide prepolymer requires a long time. Meanwhile, when the heating is performed at a temperature higher than 270° C., polymerization of the (B) polyarylene sulfide prepolymer may progress rapidly, causing an increase in the viscosity due to generation of (B') polyarylene sulfide.

Further, it is preferred that the step (II) also comprise a process of heating the resulting composite, which is composed of the (A') continuous reinforcing fiber substrate and the (B) polyarylene sulfide prepolymer, to preferably 100 to 300° C., more preferably 150 to 270° C., still more preferably 180 to 250° C. By this heating process, the (B) polyarylene sulfide prepolymer is softened or melted and thus can be more strongly fixed onto (A') continuous reinforcing fiber substrate, which is advantageous for improving the productivity. Further, by applying pressure simultaneously with or immediately after this heating process, the (B) polyarylene sulfide prepolymer can exert an effect of impregnating into the (A') continuous reinforcing fiber substrate, which is particularly preferred. In this case, from the standpoint of the productivity, the pressure to be applied is preferably 0.1 to 5 MPa, more preferably 0.3 to 4 MPa, still more preferably 0.5 to 3 MPa.

Specifically, for example, a method in which a plurality of pressure rollers are arranged inside a heated chamber and the composite is allowed to pass therethrough; a method in which calender rolls are arranged vertically and the composite is allowed to pass therethrough; or a method in which the composite is heated and pressed simultaneously using a hot roller can be employed.

<Step (III)>

The step (III) is a step of heating the composite obtained in the above-described step (II), which is composed of the (A') continuous reinforcing fiber substrate and the (B) polyarylene sulfide prepolymer, thereby converting the (B) polyarylene sulfide prepolymer into (B') a polyarylene sulfide. It is particularly important that the (B) polyarylene sulfide prepolymer be converted into (B') a polyarylene sulfide by polymerizing the (B) polyarylene sulfide prepolymer under heat in the presence of (D) a zero-valent transition metal compound or (E) a low-valent iron compound.

In this case, the heating is performed at 180 to 320° C., preferably 190 to 300° C., more preferably 200° C. to 260° C. When the heating is performed at a temperature lower than 180° C., the polymerization does not sufficiently progress, so that the resulting fiber-reinforced molding base material may contain an excessive amount of the low-molecular-weight (B) polyarylene sulfide prepolymer and thus have poor moldability, or the completion of the polymerization may take an excessively long time, leading to deterioration of the productivity. By performing the heating in the presence of (D) a zero-valent transition metal compound or (E) a low-valent iron compound, in the above-described temperature range, the (B) polyarylene sulfide prepolymer can be easily converted into (B') a polyarylene sulfide.

In the step (III), from the standpoint of attaining excellent productivity and economical efficiency, a shorter reaction time for completing the polymerization is preferred since it allows a reduction in the length of the step and an increase in the taking up rate. The reaction time is preferably not longer than 60 minutes, more preferably not longer than 10 minutes, still more preferably not longer than 3 minutes. The lower limit of the reaction time is not particularly restricted, and, it may be, for example, not shorter than 0.05 minute.

Further, in the step (III), from the standpoint of inhibiting the occurrence of undesirable side reactions during polymerization of the (B) polyarylene sulfide prepolymer, such as cross-linking reaction and decomposition reaction, it is preferred that the heating be performed in a non-oxidizing atmosphere. The term "a non-oxidizing atmosphere" used herein refers to an atmosphere having an oxygen concentration of not higher than 5% by volume, preferably not higher than 2% by volume, and more preferably an oxygen-free atmosphere, that is, an inert gas atmosphere such as nitrogen, helium or argon. Thereamong, particularly from the standpoints of the economical efficiency and the ease of handling, a nitrogen atmosphere is preferred.

Further, in the step (III), it is preferred that the heating be performed under reduced pressure of 0.1 to 50 kPa. In this case, it is more preferred that the atmosphere inside the reaction system be first converted to a non-oxidizing atmosphere and then adjusted to have a reduced pressure condition. The term "under reduced pressure" used herein means that the pressure inside the reaction system is lower than the atmospheric pressure, and the heating is performed under reduced pressure of more preferably 0.1 to 50 kPa, still more preferably 0.1 to 10 kPa.

Further, in the step (III), by applying pressure simultaneously with or immediately after the heating, impregnation of the (B) polyarylene sulfide prepolymer and the resulting (13') polyarylene sulfide into the (A') continuous reinforcing fiber substrate can be preferably further improved. Here, from the standpoint of the balance between the impregnation property and the productivity, the pressure to be applied is preferably 0.5 to 10 MPa, more preferably 1 to 8 MPa, still more preferably 2 to 6 MPa.

Specifically, for example, a method in which the composite is allowed to pass through a nitrogen-substituted system under pressure applied by a double-head press from both the above and the below; a method in which the composite is, under pressure, allowed to pass through a plurality of calender rolls that are arranged in a nitrogen-substituted heating furnace; or a method in which, after placing the composite between high-temperature press molds, the press molds are tightly closed to apply pressure and simultaneously, the atmosphere inside the thus closed molds is replaced with nitrogen and brought into a reduced pressure condition to perform polymerization, after which the press molds are opened and the resulting composite is withdrawn therefrom, can be employed. In order to improve the impregnation property, these apparatuses may be used in combination as well. Further, in order to increase the length of the system, the production line may assume a zigzag form. Alternatively, the composite which has passed through the apparatus may be folded back to the same apparatus and used for a plurality of times in a looping manner.

<Step (IV)>

The step (IV) is a step of cooling and taking up the composite produced in the step (III). The cooling method is not particularly restricted, and examples of applicable method include a method of cooling by air blast; a method of cooling by spraying of cooling water; a method in which the composite is allowed to pass through a cooling bath; and a method in which the composite is allowed to pass over a cooling plate.

In the step (IV), a fiber-reinforced molding base material is produced on-line, the taking up rate directly affects the processing rate; therefore, from the standpoint of the economical efficiency and the productivity, a higher taking up rate is more preferred. The taking up rate is preferably 1 to 100 m/min, more preferably 5 to 100 m/min, still more preferably 10 to 100 m/min.

Specific examples of taking up method include a method of taking up the resulting base material by a nip roller; a method of winding the resulting base material using a drum winder; and a method in which the resulting base material is held by a fixture and taken up along with the fixture. Further, at the time of taking up the resulting base material, the base material may be passed through a slitter and partially cut, or may be processed into a sheet of a prescribed length using a guillotine cutter or the like. Moreover, the resulting base material may be cut at a prescribed length using a strand cutter or the like, or may be kept in the form of a roll.

Further, in the method of producing a fiber-reinforced molding base material according to the present invention, other step(s) may also be incorporated as long as the effects of the present invention are not thereby impaired. Examples of such step include electron beam irradiation step, plasma treatment step, strong magnetic field-imparting step, surface material lamination step, protection film application step and post-curing step.

In the fiber-reinforced molding base material obtained by the production method of the present invention, from the standpoint of the balance between its moldability and the mechanical characteristics of the molded article produced therefrom, the ratio of (a) polyarylene sulfide is preferably 10 to 90% by mass, more preferably 20 to 80% by mass, still more preferably 30 to 70% by mass, taking the amount of the fiber-reinforced molding base material as 100% by mass. When the ratio is less than 10% by mass, fluffing of the reinforcing fibers may easily occur during the production of the fiber-reinforced molding base material. Meanwhile, when the ratio is higher than 90% by mass, the reinforcing effect of the reinforcing fibers may not be sufficiently exerted in the resulting molded article.

The ratio of the (IT) polyarylene sulfide can be easily adjusted by controlling the feed amount of the (A') continuous reinforcing fiber substrate and that of the (B) polyarylene sulfide prepolymer. For example, the feed amount of the (A') continuous reinforcing fiber substrate can be adjusted by changing the taking up rate in the step (IV), and the feed amount of the (B) polyarylene sulfide prepolymer can be adjusted by using a metering feeder or the like in the step (II).

Further, in the production method of the present invention, in accordance with the usage and intended purpose of the resulting fiber-reinforced molding base material, base materials having different impregnation rates can be produced. Examples of such base materials include prepregs having a further improved impregnation property, semi-impregnated semipregs and fabrics having a low impregnation property. In general, a base material having superior impregnation property is more effective in short-time molding; however, there may be a problem in terms of the shapability into a form having a curved surface.

Accordingly, in the first preferred embodiment of the fiber-reinforced molding base material obtained by the production method of the present invention, the impregnation rate of (B') polyarylene sulfide is 50% to 100%. Such a molding base material is excellent in terms of producing a molded article having a simpler planar shape with good productivity.

Further, in the second preferred embodiment of the fiber-reinforced molding base material obtained by the production method of the present invention, the impregnation rate of (B') polyarylene sulfide is 20% to less than 50%. Such a molding base material can be shaped to have a certain level of curved surface and is, therefore, excellent in terms of minimizing the reduction in the productivity during the molding process.

Moreover, in the third preferred embodiment of the fiber-reinforced molding base material obtained by the production method of the present invention, the impregnation rate of (B') polyarylene sulfide is higher than 0% but less than 20%. Such a molding base material is excellent in terms of producing a molded article having a more complex shape or a molded article which is not required to be completely impregnated.

The term "impregnation rate" used herein refers to a rate (%) which is obtained by observing a cross-section of the subject fiber-reinforced molding base material under a light microscope and dividing the area of the molding base material impregnated with polyarylene sulfide by a total of this area and the void area.

Here, when measuring these areas under a light microscope, the measurement can be made for the 20 arbitrary images at a magnification of ×20 to ×100 and the average of the measured values can be calculated.

The impregnation rate can be controlled by, for example, adjusting the temperature and the applied pressure when compositing the (B) polyarylene sulfide prepolymer in the step (II), or the temperature and the applied pressure when polymerizing the (B) polyarylene sulfide prepolymer into (B') polyarylene sulfide in the step (III). In general, the higher the above-described temperature and applied pressure, the more can the impregnation rate be increased. Also, the more refined the morphology of the (B) polyarylene sulfide prepolymer, the better can the impregnation property be improved.

The fiber-reinforced molding base material obtained in the present invention can be applied to molding methods having excellent productivity, such as autoclave molding, press molding, filament winding molding, stamping molding, injection molding and transfer molding. Also, the fiber-reinforced molding base material contains a thermoplastic resin as the matrix resin; therefore, it can be molded in a short time. Further, integral molding of the fiber-reinforced molding base material, such as outsert molding, can also be easily carried out. Moreover, adhesion techniques having excellent productivity, such as correction treatment by heating, thermal welding, vibration welding and ultrasonic welding, can be utilized after the molding operation. The resulting molded article reflects the properties of (B') polyarylene sulfide and thus exhibits excellent heat resistance, chemical resistance, mechanical characteristics and flame retardancy; therefore, the molded article can be subjected to a variety of applications.

The molded article is useful in a wide variety of applications including: automobile-related components, members and outer plates; airplane-related components, members and outer plates, such as landing gear pods, winglets, spoilers, edges, rudders, fairings and ribs; electrical/electronic instruments such as personal computers, displays, cell phones and personal digital assistances; chassis and members of OA equipments; sporting goods and parts thereof, such as various rackets, golf club shafts, yatch, boards, ski equipments and fishing rods; industrial materials such as rods, panels, flooring materials, joints, hinges and gears; and satellite-related components.

The contents described in the specifications and/or drawings of Japanese Patent Application Nos. 2001-005731, 2001-005732, 2011-005733 and 2001-005734 based on each of which the priority is claimed are hereby incorporated by reference.

EXAMPLES

The present invention will now be described more concretely by way of examples thereof.

The evaluation methods used in the present invention are described below.

(1) Measurement of Melting Point

In accordance with JIS K7121 (1987), a sample was measured at a heating rate of 10° C./min using a DSC system (TA3000, manufactured by Mettler-Toledo International Inc.) and the melting peak temperature was defined as the melting point of the sample.

(2) Average Fiber Length of Reinforcing Fibers Contained in Molded Article Obtained from Molding Material A section of a molded article was cut out and heat-pressed at 300° C. to obtain a 30 μm-thick film. The fibers dispersed in the thus obtained film were observed under a light microscope at a magnification of ×150. The lengths of the fibers were measured in the order of 1 μm and the weight-average fiber length (Lw) and the number-average fiber length (Ln) were determined using the following equations.

Weight-average fiber length $(Lw) = \Sigma(Li \times Wi/100)$

Number-average fiber length $(Ln) = (\Sigma Li)/N\text{total}$

Li: Measured fiber length (i=1, 2, 3, . . . , n)

Wi: Weight ratio of fiber having a length Li (i=1, 2, 3, . . . , n)

Ntotal: Total number of fibers for which the length was measured.

(3) Density of Molded Article Obtained from Molding Material

The density of a molded article was measured in accordance with the method A (underwater substitution method) described in the section 5 of JIS K7112 (1999). A 1 cm×1 cm test piece was cut out from the molded article and the test piece was loaded to a heat-resistant glass container. This container was vacuum-dried at a temperature of 80° C. for 12 hours and then cooled to room temperature in a desiccator so as to prevent moisture absorption. Here, ethanol was used as the immersion liquid.

(4) Flexural Test of Molded Article Obtained from Molding Material and Fiber-Reinforced Molding Material In accordance with ASTM D790 (1997), the support span was set at 100 mm using a 3-point bend fixture (indenter: 10 mm, support point: 4 mm), and the flexural strength and the flexural elastic modulus were measured at a crosshead speed of 2.8 mm/min. As the testing apparatus, "INSTRON" (registered trademark) universal tester (Model 4201, manufactured by Instron Corp.) was employed.

(5) Izod Impact Test of Molded Article Obtained from Molding Material

In accordance with ASTM D256 (1993), an Izod impact test (with mold notch) was performed. The Izod impact strength (J/m) of a test piece was measured at a thickness of 3.2 mm and a water content of 0.1 wt % or less.

(6) Average Molecular Weight of (B) Polyarylene Sulfide

The average molecular weight of (B') polyarylene sulfide was determined by gel permeation chromatography (GPC) in terms of the polystyrene-based weight-average molecular weight (Mw) and number-average molecular weight (Mn). In addition, the dispersion degree (Mw/Mn) was calculated from these molecular weight values. The GPC measurement conditions are shown below.

Apparatus: SSC-7100 (column name: GPC3506; manufactured by Senshu Scientific Co., Ltd.)

Eluent: 1-chloronaphthalene

Flow rate: 1.0 mL/min

Column temperature: 210° C.

Detector temperature: 210° C.

Further, the weight-average molecular weight of the (B') polyarylene sulfide contained in a molded article was determined by performing GPC measurements separately for the molded article and (C) a thermoplastic resin, which is the same kind as the one used in the molded article, and subtracting a peak corresponding to the (C) thermoplastic resin from a peak corresponding to the molded article in the resulting GPC chart of the molded article. The results were evaluated based on the following binary criteria, where a rating of "good" or better was regarded satisfactory.

Good: The (B') polyarylene sulfide had a molecular weight of 10,000 or higher.

Bad: The (B') polyarylene sulfide had a molecular weight of less than 10,000.

(7) Conversion Rate of (B) Polyarylene Sulfide Prepolymer

The conversion rate of (B) polyarylene sulfide prepolymer into (B') polyarylene sulfide was determined by performing high-performance liquid chromatography (HPLC) in accordance with the method described below.

A solution, which was obtained by a method where 10 mg of (B') polyarylene sulfide was dissolved at 250° C. in about 5 g of 1-chloronaphthalene or a method where 50 mg of a molded article was dissolved at 250° C. in about 25 g of 1-chloronaphthalene, was cooled to room temperature to form precipitates. The component insoluble to 1-chloronaphthalene was filtered out using a membrane filter having a pore size of 0.45 μm to recover a component soluble to 1-chloronaphthalene. The amount of unreacted cyclic polyarylene sulfide was quantified by performing HPLC measurement of the thus obtained soluble component and the conversion rate of the (B) polyarylene sulfide prepolymer into (B') polyarylene sulfide was calculated. The conditions of the HPLC measurement are shown below.

Apparatus: LC-10Avp Series, manufactured by Shimadzu Corporation

Column: MIGHTYSIL RP-18 GP150-4.6 (5 μm)

Detector: photodiode array detector (UV=270 nm)

The conversion rate was evaluated based on the following 4 criteria, where a rating of "fair" or better was regarded satisfactory.

Excellent: The conversion rate of the (B) polyarylene sulfide prepolymer was 90% or higher.

Good: The conversion rate of the (B) polyarylene sulfide prepolymer was 80% to less than 90%.

Fair: The conversion rate of the (B) polyarylene sulfide prepolymer was 70% to less than 80%.

Bad: The conversion rate of the (B) polyarylene sulfide prepolymer was less than 70%.

(8) Weight Reduction of (B') Polyarylene Sulfide Caused by Heating

Using a thermogravimetric analyzer (TGA7, manufactured by Perkin-Elmer), the weight reduction rate was measured under the following conditions. Here, as the sample, fine particles of 2 min or smaller were employed.

Measurement atmosphere: under nitrogen gas flow (purity: not less than 99.99%)

Weight of loaded sample: about 10 mg

Measurement Conditions:

(a) The sample was kept at a programmed temperature of 50° C. for 1 minute (b) The sample was then heated from the programmed temperature of 50° C. to 400° C. at a heating rate of 20° C./min.

The weight reduction rate, ΔWr, was determined by the above-described equation (i) based on the sample weight at 330° C. relative to the sample weight at 100° C. in the heating of the above-described (b).

(9) Evaluation of Equipment Contamination by Decomposition Gas Produced by Injection-Molding of Molding Material The equipment contamination caused by injection-molding performed at a prescribed temperature was evaluated based on the condition of odor generation from the injection-molding machine and visual observation of the contamination on the mold surface. The subject molded article had a thin-plate shape of 150 mm in width, 150 mm in length and 1.2 mm in thickness, and the measurement was performed for 20 samples. The equipment contamination was evaluated based on the following 4 criteria, where a rating of "fair" or better was regarded satisfactory.

Good: There was no odor generation and no contamination was observed on the mold surface.

Fair: There was no odor generation; however, a small amount of contamination was observed on the mold surface.

Bad: An odor was generated and a small amount of contamination was observed on the mold surface.

Worse: An odor was generated and contamination was observed on the mold surface.

(10) Average Particle Size of Polyarylene Sulfide Powder

The average particle size was measured using a laser-diffraction particle size distribution analyzer (LMS-24, manufactured by Seishin Enterprise Co., Ltd.).

(11) Basis Weight of Fiber-Reinforced Molding Base Material

A 50 mm×50 mm sheet was cut out from a fiber-reinforced molding base material and the weight thereof, W (g), was measured. The basis weight of the base material can be calculated by the equation, W×400 (g/m$^2$).

(12) Impregnation Rate of Fiber-Reinforced Molding Base Material

The term "impregnation rate" used in the present invention represents a degree at which the (A') continuous reinforcing fiber substrate of a fiber-reinforced molding base material is impregnated with a resin. In the present invention, the produced fiber-reinforced molding base material is cut and the cross-section thereof is observed under a light microscope in the width direction over a length of about 10 mm. By this, the cross-sectional shape (round or oval), resin portion and voids of the reinforcing fiber bundle can be observed. Here, a region created by connecting the fibers forming the outermost layer of the (A') continuous reinforcing fiber substrate constitutes the inner part of the (A') continuous reinforcing fiber substrate. The impregnation rate (%) was determined by dividing the area of the resin portion inside this region by the total of this area and the area of the voids. These areas were measured by analyzing the resin portion and the voids in a binary fashion with contrast using an image software.

(13) Evaluation of Productivity of Fiber-Reinforced Molding Base Material

In the production of a fiber-reinforced molding base material by a prescribed method, the productivity of the fiber-reinforced molding base material was evaluated in terms of the processing rate, processing temperature, conversion rate of (B) polyarylene sulfide prepolymer and the like. The productivity was evaluated based on the following 4 criteria, where a rating of "fair" or better was regarded satisfactory.

Good: A fiber-reinforced molding base material was supplied continuously; the temperature of the step (III) was not higher than 320° C.; and the conversion rate was 70% or higher.

Fair: A fiber-reinforced molding base material was supplied intermittently; the temperature of the step (III) was not higher than 320° C.; and the conversion rate was 70% or higher.

Bad: A fiber-reinforced molding base material was supplied continuously; the temperature of the step (III) was higher than 320° C.; and the conversion rate was 70% or higher.

Worse: A fiber-reinforced molding base material was supplied intermittently; the temperature of the step (III) was higher than 320° C.; and the conversion rate was lower than 70%.

(14) Analysis of X-Ray Absorption Fine Structure (XAFS)

The X-ray absorption fine structure of iron compound was analyzed under the following conditions, Test facility: High Energy Accelerator Research Organization, Photon Factory Spectrometer: Si(111)2 crystal spectrometer Mirror: light-collecting mirror Absorption edge: Fe K (7,113 eV) absorption edge Detectors used: an ionization chamber and a Lytle detector Reference Example 1

<Preparation of Polyphenylene Sulfide Prepolymer>

To an autoclave equipped with a stirrer, 118 kg (1,000 mol) of 47.5% sodium hydrosulfide, 42.3 kg (1,014 mol) of 96% sodium hydroxide, 163 kg (1,646 mol) of N-methyl-2-pyrrolidone (hereinafter, may be abbreviated as "NMP"), 24.6 kg (300 mol) of sodium acetate and 150 kg of ion-exchanged water were loaded, and the resulting mixture was slowly heated to 240° C. over a period of 3 hours at atmospheric pressure under nitrogen gas flow, thereby distilling out 211 kg of water and 4 kg of NMP through a fractionating column. The reaction vessel was then cooled to 160° C. It is noted here that, during this liquid removal operation, 0.02 mol of hydrogen sulfide was released from the system per 1 mol of the loaded sulfur component.

Next, 147 kg (1,004 mol) of p-dichlorobenzene and 129 kg (1,300 mol) of NMP were added and the reaction vessel was hermetically sealed under nitrogen gas. The reaction system was heated to 270° C. at a rate of 0.6° C./min with stirring at 240 rpm and kept at this temperature for 140 minutes. Thereafter, the reaction system was cooled to 250° C. at a rate of 1.3° C./min while injecting thereto 18 kg (1,000 mol) of water over a period of 15 minutes and further cooled to 220° C. at a rate of 0.4° C./min. Then, the reaction system was rapidly cooled to around room temperature to yield a slurry (Sa). This slurry (Sa) was diluted with 376 kg of NMP to obtain a slurry (Sb).

Then, 14.3 kg of the thus obtained slurry (Sb) was heated to 80° C. and separated by filtration through a screen (80-mesh, pore size: 0.175 mm) into a crude PPS resin and 10 kg of a slurry (Sc). The thus obtained slurry (Sc) was loaded to a rotary evaporator and the atmosphere therein was replaced with nitrogen. Subsequently, after treating the slurry (Sc) for 1.5 hours under reduced pressure at 100 to 160° C., the slurry (Sc) was further treated for 1 hour in a vacuum dryer at 160° C. The resulting solid contained 3 wt % of NMP.

After adding 12 kg (1.2 times amount of the slurry (Sc)) of ion-exchanged water to this solid, the resultant was re-slurried by stirring at 70° C. for 30 minutes. The thus obtained slurry was suction-filtered through a glass filter having a pore size of 10 to 16 µm. After adding 12 kg of ion-exchanged water to the resulting white cake and re-slurrying the resultant by stirring at 70° C. for 30 minutes, the thus obtained slurry was suction-filtered in the same manner and vacuum-dried at 70° C. for 5 hours to obtain 100 g of a polyphenylene sulfide oligomer. The above-described operations were repeated until a prescribed amount of polyphenylene sulfide prepolymer was obtained.

A 4-g fraction of the thus obtained polyphenylene sulfide oligomer was recovered and subjected to 3-hour Soxhlet extraction with 120 g of chloroform. Chloroform was distilled off from the resulting extract to obtain a solid, which was then re-dissolved at room temperature by adding thereto 20 g of chloroform, thereby obtaining a slurry mixture. This slurry mixture was slowly added dropwise to 250 g of methanol with stirring and the resulting precipitate was suction-filtered through a glass filter having a pore size of 10 to 16 μm. The resulting white cake was vacuum-dried at 70° C. for 3 hours to obtain a white powder.

This white powder had a weight-average molecular weight of 900. From the absorption spectrum obtained by infrared spectroscopic analysis, the white powder was shown to be the polyphenylene sulfide prepolymer. Further, as a result of analyzing the thermal characteristics of the white powder using a differential scanning calorimeter (heating rate: 40° C./min), the white powder was found to show a broad endothermic peak at about 200 to 260° C., with the peak temperature being 215° C.

In addition, based on the results of the mass spectral analysis of the components resolved by high-performance liquid chromatography as well as the molecular weight information obtained by MALDI-TOF-MS, this white powder was found to be a mixture composed of a cyclic polyphenylene sulfide having 4 to 11 repeating units and a linear polyphenylene sulfide having 2 to 11 repeating units, in which the weight ratio of the cyclic polyphenylene sulfide and the linear polyphenylene sulfide was 9:1.

The thus obtained polyphenylene sulfide prepolymer was freeze-pulverized and mechanically classified using a mesh to recover particles of the polyphenylene sulfide prepolymer having an average size of 120 Further, particles of (D) zero-valent transition metal compound were also recovered in the same manner and these two kinds of particles were mechanically mixed at a certain ratio to obtain particles (P).

A prescribed solvent for dissolving the polyphenylene sulfide prepolymer and dissolving or dispersing the (D) zero-valent transition metal compound was selected and a solution containing the polyphenylene sulfide prepolymer and the (D) zero-valent transition metal compound was prepared. The solvent was then removed from the thus obtained solution to yield a particle (P') composed of the polyphenylene sulfide prepolymer and the (D) zero-valent transition metal compound. This particle (P') was mixed into an industrial water containing 0.03% by mass of a surfactant and the resulting mixture was forcibly stirred to prepare a dispersion (L) having an average particle size of 8 μm and a solid content of 10%.

The polyphenylene sulfide prepolymer and the (D) zero-valent transition metal compound were mixed and then heated at 180 to 270° C. to obtain a molten mixture. Using a knife coater, this molten mixture was coated onto a mold-releasing paper at a prescribed thickness to prepare a film (F) having a basis weight of 25 g/m².

Reference Example 2

<Preparation of Polyphenylene Sulfide Prepolymer 1>

To an autoclave equipped with a stirrer, 16.54 kg (140 mol) of 47.5% sodium hydrosulfide, 5.92 kg (142 mol) of 96% sodium hydroxide, 22.88 kg (232 mol) of N-methyl-2-pyrrolidone (hereinafter, may be abbreviated as "NMP"), 3.44 kg (42 mol) of sodium acetate and 21 kg of ion-exchanged water were loaded, and the resulting mixture was slowly heated to about 240° C. over a period of about 3 hours at atmospheric pressure under nitrogen gas flow, thereby distilling out 30 kg of water and 550 g of NMP through a fractionating column. The reaction vessel was then cooled to 160° C. It is noted here that, during this liquid removal operation, 0.02 mol of hydrogen sulfide was released from the system per 1 mol of the loaded sulfur component.

Next, 20.6 kg (140.6 mol) of p-dichlorobenzene and 18 kg (182 mol) of NMP were added and the reaction vessel was hermetically sealed under nitrogen gas. The reaction system was heated to 270° C. at a rate of 0.6° C./min with stirring at 240 rpm and kept at this temperature for 140 minutes. Thereafter, the reaction system was cooled to 250° C. at a rate of 1.3° C./min while injecting thereto 2.52 kg (105 mol) of water over a period of 15 minutes and further cooled to 220° C. at a rate of 0.4° C./min. Then, the reaction system was rapidly cooled to around room temperature to yield 80 kg of a slurry (Sa). This slurry (Sa) was diluted with 52 kg of NMP to obtain a slurry (Sb).

Then, 132 kg of the thus obtained slurry (Sb) was heated to 80° C. and separated by filtration through a screen (80-mesh, pore size: 0.175 mm) into a crude PPS resin and 100 kg of a slurry (Sc). The thus obtained slurry (Sc) was loaded to a rotary evaporator and the atmosphere thereof was replaced with nitrogen. Subsequently, after treating the slurry (Sc) for 1.5 hours under reduced pressure at 100 to 160° C., the slurry (Sc) was further treated for 1 hour in a vacuum dryer at 160° C. The resulting solid contained 3 wt % of NMP.

After adding 120 kg (1,2 times amount of the slurry (Sc)) of ion-exchanged water to this solid, the resultant was re-slurried by stirring at 70° C. for 30 minutes. The thus obtained slurry was suction-filtered through a glass filter having a pore size of 10 to 16 μm. After adding 120 kg of ion-exchanged water to the resulting white cake and re-slurrying the resultant by stirring at 70° C. for 30 minutes, the thus obtained slurry was suction-filtered in the same manner and vacuum-dried at 70° C. for 5 hours to obtain 1.2 kg of a polyphenylene sulfide oligomer.

The thus obtained polyphenylene sulfide oligomer was then subjected to 3-hour Soxhlet extraction with 36 kg of chloroform. Chloroform was distilled off from the resulting extract to obtain a solid, which was then re-dissolved at room temperature by adding thereto 6 kg of chloroform, thereby obtaining a slurry mixture. This slurry mixture was slowly added dropwise to 75 kg of methanol with stirring and the resulting precipitate was suction-filtered through a glass filter having a pore size of 10 to 16 μm. The resulting white cake was vacuum-dried at 70° C. for 3 hours to obtain 360 g of a white powder.

This white powder had a weight-average molecular weight of 900. From the absorption spectrum obtained by infrared spectroscopic analysis, the white powder was shown to be the polyphenylene sulfide prepolymer. Further, as a result of analyzing the thermal characteristics of the white powder using a differential scanning calorimeter (heating rate: 40° C./min), the white powder was found to show a broad endothermic peak at about 200 to 260° C., with the peak temperature being about 215° C.

In addition, based on the results of the mass spectral analysis of the components resolved by high-performance liquid chromatography as well as the molecular weight information obtained by MALDI-TOF-MS, this white powder was found to be a mixture composed of a cyclic polyphenylene sulfide having 4 to 11 repeating units and a linear polyphenylene sulfide having 2 to 11 repeating units, in which the weight ratio of the cyclic polyphenylene sulfide and the linear polyphenylene sulfide was about 9:1.

Reference Example 3

<Preparation of Polyphenylene Sulfide Prepolymer 2>

To an autoclave equipped with a stirrer, 1.8 kg (7.5 mol) of sodium sulfide nonahydrate, 15.6 g (0.375 mol) of 96% sodium hydroxide, 77.7 kg (777 mol) of NMP and 1.13 g (7.65 mol) of p-dichlorobenzene were loaded, and the reaction vessel was hermetically sealed under nitrogen gas.

The reaction system was heated with stirring at 240 rpm from room temperature to 200° C. over a period of about 2 hours. Subsequently, the reaction system was further heated to 220° C. at a rate of 1.0° C./min and kept at this temperature for 10 hours. Thereafter, the reaction system was cooled to around room temperature to yield a slurry (Sd). This slurry (Sd) in an amount of 80 kg was diluted with 320 kg of ion-exchanged water, and the resultant was stirred at 70° C. for 30 minutes and then filtered through a glass filter having an average pore size of 10 to 16 µm. The thus recovered solid component was dispersed in 80 kg of ion-exchanged water, and the resulting dispersion was stirred at 70° C. for 30 minutes and then filtered in the same manner. Thereafter, the solid component was dispersed in 80 kg of 0.5% aqueous acetic acid solution, and the resulting dispersion was stirred at 70° C. for 30 minutes and then filtered in the same manner. The thus obtained solid component was once again dispersed in 80 kg of ion-exchanged water, and the resulting dispersion was stirred at 70° C. for 30 minutes and then filtered in the same manner. The resulting hydrous cake was dried overnight in a 70° C. vacuum dryer to obtain 600 g of dry cake.

A 600-g fraction of the dry cake obtained in this manner was recovered and subjected to 3-hour Soxhlet extraction with 18 kg of tetrahydrofuran. Tetrahydrofuran was subsequently distilled off from the resulting extract. Then, 18 kg of acetone was added to the thus obtained solid, and the resultant was stirred and suction-filtered through a glass filter having a pore size of 10 to 16 µm to obtain a white cake. This white cake was vacuum-dried at 70° C. for 3 hours to obtain 150 g of a white powder. The white powder was analyzed by infrared spectroscopy and its absorption spectrum proved that the white powder was polyphenylene sulfide.

From the results of analyzing the white powder by high-performance liquid chromatography, this white powder was found to be a mixture of a cyclic polyphenylene sulfide and a linear polyphenylene sulfide in which the weight ratio of the cyclic polyphenylene sulfide and the linear polyphenylene sulfide was about 1:1.5. That is, the white powder was shown to be a polyphenylene sulfide prepolymer containing about 40 wt % of cyclic polyphenylene sulfide and about 60 wt % of linear polyphenylene sulfide. It is also noted here that, as a result of GPC measurement, this polyphenylene sulfide prepolymer was found to have a weight-average molecular weight of 1,500.

Reference Example 4

To an autoclave equipped with a stirrer, 8.27 kg (70.0 mol) of 47.5% sodium hydrosulfide, 2.96 kg (71.0 mol) of 96% sodium hydroxide, 11.44 kg (116 mol) of N-methyl-2-pyrrolidone (NMP), 1.72 kg (21.0 mol) of sodium acetate and 10.5 kg of ion-exchanged water were loaded, and the resulting mixture was slowly heated to about 240° C. over a period of about 3 hours at atmospheric pressure under nitrogen gas flow, thereby distilling out 14.8 kg of water and 280 g of NMP through a fractionating column. The reaction vessel was then cooled to 160° C. It is noted here that, during this liquid removal operation, 0.02 mol of hydrogen sulfide was released from the system per 1 mol of the loaded sulfur component.

Next, 10.3 kg (70.3 mol) of p-dichlorobenzene and 9.00 kg (91.0 mol) of NMP were added and the reaction vessel was hermetically sealed under nitrogen gas. The reaction system was heated to 270° C. at a rate of 0.6° C./min with stirring at 240 rpm and kept at this temperature for 140 minutes. Thereafter, the reaction system was cooled to 250° C. at a rate of 1.3° C./min while injecting thereto 1.26 kg (70 mol) of water over a period of 15 minutes and further cooled to 220° C. at a rate of 0.4° C./min. Then, the reaction system was rapidly cooled to around room temperature to yield a slurry (Sa). This slurry (Sa) was diluted with 20.0 kg of NMP to obtain a slurry (Sb).

Then, 10 kg of the thus obtained slurry (Sb) was heated to 80° C. and filtered through a screen (80-mesh, pore size: 0.175 mm) to obtain a slurry-containing granular PPS resin as a mesh-on component and about 7.5 kg of a slurry (Sc) as a filtrate.

The thus obtained slurry (Sc) in an amount of 1,000 g was loaded to a rotary evaporator and the atmosphere therein was replaced with nitrogen. Subsequently, after treating the slurry (Sc) for 1.5 hours under reduced pressure at 100 to 150° C., the slurry (Sc) was further treated for 1 hour in a vacuum dryer at 150° C. to obtain a solid.

After adding 1,200 g (1.2 times amount of the slurry (Sc)) of ion-exchanged water to the thus obtained solid, the resultant was re-slurried by stirring at 70° C. for 30 minutes. Then, a dispersion was prepared by dispersing 3 g of RADIOLITE #800S (manufactured by Showa Chemical Industry Co., Ltd.) in 10 g of ion-exchanged water and this dispersion was suction-filtered through a glass filter having a pore size of 10 to 16 µm, thereby laminating RADIOLITE on the filter. Using this filter, solid-liquid separation of the slurry was performed. Thereafter, the resulting brown cake was slurried again by adding thereto 1,200 g of ion-exchanged water and stirring the resultant at 70° C. for 30 minutes. The thus obtained slurry was suction-filtered in the same manner and then vacuum-dried at 70° C. for 5 hours to obtain 14.0 g of a polyphenylene sulfide mixture.

A 10-g fraction of the thus obtained polyphenylene sulfide mixture was recovered and then brought into contact with 240 g of a solvent, which was chloroform, by Soxhlet extraction method for 5 hours at a bath temperature of about 80° C. to obtain an extract. The thus obtained extract was in the form of a slurry partially containing a solid component at room temperature. After removing about 200 g of chloroform from the extracted slurry by distillation using an evaporator, the resultant was slowly added dropwise to 500 g of methanol with stirring over a period of about 10 minutes. After the completion of this dropwise addition, the resultant was continued to be stirred for another 15 minutes or so. Then, the resultant was suction-filtered through a glass filter having a pore size of 10 to 16 µm and the thus recovered white cake was vacuum-dried at 70° C. for 3 hours to obtain 3.0 g of a white powder. The yield of the white powder was 31% based on the amount of the polyphenylene sulfide mixture.

This white powder had a weight-average molecular weight of 900. From the absorption spectrum obtained by infrared spectroscopic analysis, the white powder was confirmed to be a compound composed of phenylene sulfide units. In addition, based on the results of the mass spectral analysis of the components resolved by high-performance liquid chromatography (apparatus: LC-10 manufactured by Shimadzu Corporation, column: C18, detector: photodiode array) as well as the molecular weight information obtained by MALDI-TOF-MS, the white powder was found to contain a cyclic compound having 4 to 12 p-phenylene sulfide units as a main structural unit in an amount of about 94% based on the weight ratio.

The thus obtained polyphenylene sulfide prepolymer was freeze-pulverized and mechanically classified using a mesh to recover particles of the polyphenylene sulfide prepolymer having an average size of 120 μm. Further, particles of (E) a low-valent iron compound were also recovered in the same manner and these two kinds of particles were mechanically mixed at a certain ratio to obtain particles (P").

Example 1

To the polyphenylene sulfide prepolymer prepared in Reference Example 1, tetrakis(triphenylphosphine)palladium was added as the (D) zero-valent transition metal compound in an amount of 0.5 mol % based on the amount of sulfur atoms contained in the polyphenylene sulfide prepolymer. The resulting mixture was melted in a 250° C. melting bath and then fed to a kiss coater using a gear pump. Using the kiss coater, the polyphenylene sulfide prepolymer was applied onto a roll heated to 260° C., thereby forming a coating film.

Then, by allowing carbon fibers, "TORAYCA" (registered trademark) (T700S-24K, manufactured by Toray Industries, Inc.), to pass on this roll in contact, a prescribed amount of the polyphenylene sulfide prepolymer was adhered per unit length of the resulting carbon fiber bundle.

The carbon fibers to which the polyphenylene sulfide prepolymer was adhered were then allowed to pass through 10 rolls (φ: 50 mm) that were freely rotating with the aid of bearings heated to 260° C. and alternately arranged above and below a straight-line, thereby thoroughly impregnating a component (B) into a component (A).

Thereafter, a component (C), "TORELINA" (registered trademark) A900 (polyphenylene sulfide resin manufactured by Toray Industries, Inc.; melting point=278° C.), was melted at 330° C. in a uniaxial extruder and extruded into a crosshead die attached to the tip of the extruder. Simultaneously with this, the composite obtained in the above was also continuously fed into the crosshead die, thereby coating the melted component (C) onto the composite. In this process, the amount of the component (C) was adjusted such that the reinforcing fiber content became 20 wt %.

The strand obtained in the above-described manner was cooled and then cut at a length of 7 mm using a cutter to obtain a columnar pellet (long-fiber pellet), which is the molding material of the present invention. This columnar pellet had a core-in-sheath structure, The thus obtained long-fiber pellet had no fluffing caused by transport and exhibited good handling property. The long-fiber pellet was dried under vacuum at 150° C. for 5 hours or longer. The thus dried long-fiber pellet was molded using a mold which was prepared for each test piece and attached to an injection-molding machine (J150EII-P, manufactured by The Japan Steel Works, Ltd.). As for the molding conditions, the molding was carried out at a cylinder temperature of 320° C., a mold temperature of 150° C. and a cooling time of 30 seconds. After this molding process, the resulting molded article was dried under vacuum at 80° C. for 12 hours and dry test pieces thereof, which were stored in a desiccator at room temperature for 3 hours, were subsequently evaluated. The evaluation results are shown in Table 1.

Example 2

A columnar pellet (long-fiber pellet), the molding material of the present invention, was produced in the same manner as in Example 1, except that tris(dibenzylideneacetone) dipalladium was used in place of tetrakis(triphenylphosphine)palladium as the (D) zero-valent transition metal compound and that the added amount thereof was changed to 1 mol % based on the amount of sulfur atoms contained in the polyphenylene sulfide prepolymer. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 1.

Example 3

A columnar pellet (long-fiber pellet), the molding material of the present invention, was produced in the same manner as in Example 1, except that bis[1,2-bis(diphenylphosphino) ethane]palladium was used in place of tetrakis(triphenylphosphine)palladium as the (D) zero-valent transition metal compound. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 1.

Example 4

A columnar pellet (long-fiber pellet), the molding material of the present invention, was produced in the same manner as in Example 1 except that, in place of tetrakis(triphenylphosphine)palladium used as the (D) zero-valent transition metal compound, a complex was formed in the system by using palladium acetate and triphenylphosphine in combination in amounts of 0.5 mol % and 2 mol %, respectively, based on the amount of sulfur atoms contained in the polyphenylene sulfide prepolymer. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 1.

Example 5

A columnar pellet (long-fiber pellet), the molding material of the present invention, was produced in the same manner as in Example 1 except that, in place of tetrakis(triphenylphosphine)palladium used as the (D) zero-valent transition metal compound, a complex was formed in the system by using palladium chloride and 1,2-bis(diphenylphosphino) ethane in combination in amounts of 0.5 mol % and 1 mol %, respectively, based on the amount of sulfur atoms contained in the polyphenylene sulfide prepolymer. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 1.

Example 6

A columnar pellet (long-fiber pellet), the molding material of the present invention, was produced in the same manner as in Example 1, except that tetrakis(triphenylphosphine)nickel was used in place of tetrakis(triphenylphosphine)palladium as the (D) zero-valent transition metal compound and that the added amount thereof was changed to 1 mol % based on the amount of sulfur atoms contained in the polyphenylene sulfide prepolymer. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 1.

Example 7

A columnar pellet (long-fiber pellet), the molding material of the present invention, was produced in the same manner as in Example 1 except that, in place of tetrakis(triphenylphosphine)palladium used as the (D) zero-valent transition metal compound, a complex was formed in the system by using nickel chloride and 1,2-bis(diphenylphosphino)ethane in combination in amounts of 1 mol % and 2 mol %, respectively, based on the amount of sulfur atoms contained in the polyphenylene sulfide prepolymer. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 1.

Comparative Example 1

A columnar pellet (long-fiber pellet), which is a molding material, was produced in the same manner as in Example 1, except that the (D) zero-valent transition metal compound was not added. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 1.

Comparative Example 2

A columnar pellet (long-fiber pellet), which is a molding material, was produced in the same manner as in Example 1, except that diphenyl sulfide was used in place of the (D) zero-valent transition metal compound, that the added amount thereof was changed to 1 mol % based on the amount of sulfur atoms contained in the polyphenylene sulfide prepolymer and that the furnace temperature was set at 260° C. to 300° C. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 1.

Comparative Example 3

A columnar pellet (long-fiber pellet), which is a molding material, was produced in the same manner as in Example 1, except that palladium chloride was used in place of tetrakis(triphenylphosphine)palladium as the (D) zero-valent transition metal compound. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 1.

Comparative Example 4

A columnar pellet (long-fiber pellet), which is a molding material, was produced in the same manner as in Example 1, except that nickel chloride was used in place of tetrakis(triphenylphosphine)palladium as the (D) zero-valent transition metal compound, that the added amount thereof was changed to 1 mol % based on the amount of sulfur atoms contained in the polyphenylene sulfide prepolymer and that the furnace temperature was set at 260° C. to 300° C. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 1.

TABLE 1

| | | Example 1 | Example 2 | Example 3 | Example 4 | Example 5 | Example 6 |
|---|---|---|---|---|---|---|---|
| (Molding material) | | | | | | | |
| Component (A) Carbon fiber | wt % | 20 | 20 | 20 | 20 | 20 | 20 |
| Component (B) Polyarylene sulfide prepolymer | wt % | 10 | 10 | 10 | 10 | 10 | 10 |
| Component (C) Thermoplastic resin | Type | PPS | PPS | PPS | PPS | PPS | PPS |
| | wt % | 70 | 70 | 70 | 70 | 70 | 70 |
| Component (D) Zero-valent transition metal compound | Type | Pd(tpp)$_4$[2)] | Pd$_2$(dba)$_3$[3)] | Pd(dppe)$_2$[4)] | Pd(OAc)$_2$[5)] | PdCl$_2$ | Ni(tpp)$_4$[8)] |
| | mol %[1)] | 0.5 | 1 | 0.5 | 0.5 | 0.5 | 1 |
| | Type | — | — | — | tpp[6)] | dppe[7)] | — |
| | mol %[1)] | | | | 2 | 1 | |
| (Process condition) | | | | | | | |
| Kiss coater temperature | ° C. | 250 | 250 | 250 | 250 | 250 | 250 |
| Furnace temperature | ° C. | 260 | 260 | 260 | 260 | 260 | 260 |
| Extrusion temperature | ° C. | 330 | 330 | 330 | 330 | 330 | 330 |

TABLE 1-continued

|  |  |  |  |  |  |  |  |
|---|---|---|---|---|---|---|---|
| Injection-molding temperature | ° C. | 320 | 320 | 320 | 320 | 320 | 320 |
| Die temperature | ° C. | 150 | 150 | 150 | 150 | 150 | 150 |
| (Molded article properties) |  |  |  |  |  |  |  |
| Number-average fiber length | mm | 0.45 | 0.50 | 0.50 | 0.55 | 0.55 | 0.50 |
| Weight-average fiber length | mm | 0.60 | 0.70 | 0.65 | 0.75 | 0.70 | 0.70 |
| Density | — | 1.42 | 1.42 | 1.42 | 1.41 | 1.41 | 1.41 |
| Flexural modulus | GPa | 15 | 16 | 16 | 15 | 15 | 15 |
| Flexural strength | MPa | 270 | 280 | 275 | 270 | 275 | 265 |
| Izod impact | J/m | 85 | 95 | 90 | 85 | 90 | 85 |
| Weight-average molecular weight of polyarylene sulfide (B') | — | good | good | good | good | good | good |
| Conversion rate of polyarylene sulfide prepolymer (B) | — | excellent | good | excellent | fair | fair | fair |

|  |  | Example 7 | Comparative Example 1 | Comparative Example 2 | Comparative Example 3 | Comparative Example 4 |
|---|---|---|---|---|---|---|
| (Molding material) |  |  |  |  |  |  |
| Component (A) Carbon fiber | wt % | 20 | 20 | 20 | 20 | 20 |
| Component (B) Polyarylene sulfide prepolymer | wt % | 10 | 10 | 10 | 10 | 10 |
| Component (C) Thermoplastic resin | Type | PPS | PPS | PPS | PPS | PPS |
|  | wt % | 70 | 70 | 70 | 70 | 70 |
| Component (D) Zero-valent transition metal compound | Type | $NiCl_2$ | — | PhSSPh[9] | $PdCl_2$ | $NiCl_2$ |
|  | mol %[1] | 1 | — | 1 | 0.5 | 1 |
|  | Type | dppe | — | — | — | — |
|  | mol %[1] | 2 |  |  |  |  |
| (Process condition) |  |  |  |  |  |  |
| Kiss coater temperature | ° C. | 250 | 250 | 250 | 250 | 250 |
| Furnace temperature | ° C. | 260 | 260 | 260 | 260 | 260 |
| Extrusion temperature | ° C. | 330 | 330 | 330 | 330 | 330 |
| Injection-molding temperature | ° C. | 320 | 320 | 320 | 320 | 320 |
| Die temperature | ° C. | 150 | 150 | 150 | 150 | 150 |
| (Molded article properties) |  |  |  |  |  |  |
| Number-average fiber length | mm | 0.55 | 0.55 | 0.55 | 0.50 | 0.45 |
| Weight-average fiber length | mm | 0.70 | 0.70 | 0.75 | 0.65 | 0.70 |
| Density | — | 1.41 | 1.41 | 1.41 | 1.41 | 1.41 |
| Flexural modulus | GPa | 15 | 15 | 15 | 15 | 15 |
| Flexural strength | MPa | 265 | 255 | 250 | 245 | 255 |
| Izod impact | J/m | 85 | 75 | 75 | 70 | 75 |
| Weight-average molecular weight of polyarylene sulfide (B') | — | good | bad | bad | bad | bad |
| Conversion rate of polyarylene sulfide prepolymer (B) | — | fair | bad | bad | bad | bad |

[1] Mol % based on the amount of sulfur atoms contained in polyarylene sulfide prepolymer (B)
[2] Tetrakis(triphenylphosphine)palladium
[3] Tris(dibenzylideneacetone)dipalladium
[4] Bis[1,2-bis(diphenylphosphino)ethane]palladium
[5] Palladium acetate
[6] Triphenylphosphine
[7] 1,2-bis(diphenylphosphino)ethane
[8] Tetrakis(triphenylphosphine)nickel
[9] Diphenylsulfide From the results of Examples and Comparative Examples that are shown in Table 1, the followings are clear. It is seen that, since the molded articles obtained from the molding materials of Examples 1 to 3 and 6 contain the (D) zero-valent transition metal compound, these molded articles have, as compared to those of Comparative Examples 1 to 4, a higher weight-average molecular weight of the (B') polyarylene sulfide and a higher conversion rate of the (B) polyarylene sulfide prepolymer as well as superior mechanical characteristics. Further, it is also seen that, in the molded articles obtained from the molding materials of Examples 4, 5 and 7, since the (D) zero-valent transition metal compound is formed within the system, these molded articles have, as compared to those of Comparative Examples 1 to 4, a higher weight-average molecular weight of the (B') polyarylene sulfide and a higher conversion rate of the (B) polyarylene sulfide prepolymer as well as superior mechanical characteristics.

Example 8

A columnar pellet (long-fiber pellet), the molding material of the present invention, was produced in the same manner as in Example 1, except that the composition of the polyphenylene sulfide prepolymer and that of the (C) thermoplastic resin were changed to 20% by mass and 60% by mass, respectively, with respect to the total amount of the resulting molding material. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 2.

Example 9

A columnar pellet (long-fiber pellet), the molding material of the present invention, was produced in the same manner as in Example 1, except that the composition of the polyphenylene sulfide prepolymer and that of the (C) thermoplastic resin were changed to 30% by mass and 50% by mass, respectively, with respect to the total amount of the resulting molding material. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 2.

Comparative Example 5

A columnar pellet (long-fiber pellet), which is a molding material, was produced in the same manner as in Example 8, except that the (D) zero-valent transition metal compound was not added. The thus obtained columnar pellet had a core-in-sheath structure. This long-fiber pellet was injection-molded in the same manner as in Example 8 and the resulting molded article was subjected to the respective evaluations. The processing conditions and the evaluation results are shown in Table 2.

Comparative Example 6

A columnar pellet (long-fiber pellet), which is a molding material, was produced in the same manner as in Example 9, except that the (D) zero-valent transition metal compound was not added. The thus obtained columnar pellet had a core-in-sheath structure. This long-fiber pellet was injection-molded in the same manner as in Example 9 and the resulting molded article was subjected to the respective evaluations. The processing conditions and the evaluation results are shown in Table 2.

TABLE 2

|  |  | Example 8 | Example 9 | Comparative Example 5 | Comparative Example 6 |
|---|---|---|---|---|---|
| (Molding material) |  |  |  |  |  |
| Component (A) Carbon fiber | wt % | 20 | 20 | 20 | 20 |
| Component (B) Polyarylene sulfide prepolymer | wt % | 20 | 30 | 20 | 30 |
| Component (C) Thermoplastic resin | Type | PPS | PPS | PPS | PPS |
|  | wt % | 60 | 50 | 60 | 50 |
| Component (D) Zero-valent transition metal compound | Type | Pd(tpp)$_4$[2] | Pd(tpp)$_4$[2] | — | — |
|  | mol %[1] | 0.5 | 0.5 |  |  |
| (Process condition) |  |  |  |  |  |
| Kiss coater temperature | ° C. | 250 | 250 | 250 | 250 |
| Furnace temperature | ° C. | 260 | 260 | 260 | 260 |
| Extrusion temperature | ° C. | 330 | 330 | 330 | 330 |
| Injection-molding temperature | ° C. | 320 | 320 | 320 | 320 |
| Die temperature | ° C. | 150 | 150 | 150 | 150 |
| (Molded article properties) |  |  |  |  |  |
| Number-average fiber length | mm | 0.55 | 0.65 | 0.60 | 0.65 |
| Weight-average fiber length | mm | 0.65 | 0.70 | 0.70 | 0.75 |
| Density | — | 1.42 | 1.42 | 1.41 | 1.41 |
| Flexural modulus | GPa | 15 | 15 | 14 | 13 |
| Flexural strength | MPa | 265 | 260 | 200 | 130 |
| Izod impact | J/m | 85 | 85 | 50 | 30 |
| Weight-average molecular weight of polyarylene sulfide (B') | — | good | good | bad | bad |
| Conversion rate of polyarylene sulfide prepolymer (B) | — | excellent | excellent | bad | bad |

[1]Mol % based on the amount of sulfur atoms contained in polyarylene sulfide prepolymer (B)
[2]Tetrakis(triphenylphosphine)palladium From the results of Examples and Comparative Examples that are shown in Table 2, the followings are clear. It is seen that, since the molded articles obtained from the molding materials of Examples 8 and 9 contain the (D) zero-valent transition metal compound, these molded articles have, as compared to those of Comparative Examples 5 and 6, a higher weight-average molecular weight of the (B') polyarylene sulfide and a higher conversion rate of the (B) polyarylene sulfide prepolymer as well as superior mechanical characteristics. In particular, since the molded article of Example 9 have considerably superior mechanical characteristics as compared the molded article of Comparative Example 6, it is seen that an addition of the (D) zero-valent transition metal compound has more prominent effect of improving the mechanical characteristics of the resulting molded article as the composition ratio of the (B) polyarylene sulfide prepolymer in the molding material increases.

Example 10

A columnar pellet (long-fiber pellet), the molding material of the present invention, was produced in the same manner as in Example 1, except that "AMILAN" (registered trademark) CM3001 (nylon 66 resin manufactured by Toray Industries, Inc.; melting point=265° C.) was used in place of polyphenylene sulfide as the (C) thermoplastic resin, that the extrusion temperature of the (C) thermoplastic resin in the production of the molding material was set at 280° C. and that the injection-molding temperature of the molding material was changed to 300° C. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 3.

Example 11

A columnar pellet (long-fiber pellet), the molding material of the present invention, was produced in the same manner as in Example 1, except that "ULTEM" (registered trademark) 1000R (PEI resin manufactured by GE Plastics Japan, Ltd.; Distortion temperature under load=200° C., amorphous resin) was used in place of polyphenylene sulfide as the (C) thermoplastic resin, that the extrusion temperature of the (C) thermoplastic resin in the production of the molding material was set at 360° C. and that the injection-molding temperature of the molding material was changed to 380° C. The thus obtained columnar pellet had a core-in-sheath structure. This long-fiber pellet was injection-molded in the same manner as in Example 1 and the resulting molded article was subjected to the respective evaluations. The processing conditions and the evaluation results are shown in Table 3.

TABLE 3

|  |  | Example 10 | Example 11 |
| --- | --- | --- | --- |
| (Molding material) |  |  |  |
| Component (A) Carbon fiber | wt % | 20 | 20 |
| Component (B) Polyarylene sulfide prepolymer | wt % | 10 | 10 |
| Component (C) Thermoplastic resin | Type | PA | PEI |
|  | wt % | 70 | 70 |
| Component (D) Zero-valent transition metal compound | Type | Pd(tpp)$_4$[2] | Pd(tpp)$_4$[2] |
|  | mol %[1] | 0.5 | 0.5 |
| (Process condition) |  |  |  |
| Kiss coater temperature | ° C. | 250 | 250 |
| Furnace temperature | ° C. | 260 | 260 |
| Extrusion temperature | ° C. | 280 | 360 |
| Injection-molding temperature | ° C. | 300 | 380 |
| Die temperature | ° C. | 150 | 150 |
| (Molded article properties) |  |  |  |
| Number-average fiber length | mm | 0.55 | 0.50 |
| Weight-average fiber length | mm | 0.65 | 0.70 |
| Density | — | 1.27 | 1.39 |
| Flexural modulus | GPa | 14 | 17 |
| Flexural strength | MPa | 250 | 285 |
| Izod impact | J/m | 100 | 60 |
| Weight-average molecular weight of polyarylene sulfide (B') | — | good | good |
| Conversion rate of polyarylene sulfide prepolymer (B) | — | excellent | excellent |

[1] Mol % based on the amount of sulfur atoms contained in polyarylene sulfide prepolymer (B)
[2] Tetrakis(triphenylphosphine)palladium From the results of Examples that are shown in Table 3, the followings are clear. It is seen that the molded articles obtained from the molding materials of Examples 10 and 11 can be easily produced and molded as in the case of Example 1. Further, it is also seen and that, since these molded articles contain the (D) zero-valent transition metal compound, they have a high weight-average molecular weight of the (B') polyarylene sulfide and a high conversion rate of the (B) polyarylene sulfide prepolymer as well as superior mechanical characteristics.

Example 12

To the (B) polyphenylene sulfide prepolymer prepared in Reference Example 1, tetrakis(triphenylphosphine)palladium was added as the (D) zero-valent transition metal compound in an amount of 0.5 mol % based on the amount of sulfur atoms contained in the (B) polyphenylene sulfide prepolymer, and the resulting mixture was melted in a 250° C. melting bath to obtain a molten mixture. This molten mixture was then fed to a kiss coater using a gear pump. Using the kiss coater, the (B) polyphenylene sulfide prepolymer was applied onto a roll heated to 250° C., thereby forming a coating film.

Then, by allowing carbon fibers, "TORAYCA" (registered trademark) (T700S-24K, manufactured by Toray Industries, Inc.), to pass on this roll in contact, a prescribed amount of the polyphenylene sulfide prepolymer was adhered per unit length of the (A) carbon fiber bundle.

The carbon fibers to which the (B) polyphenylene sulfide prepolymer was adhered were fed to a furnace heated to 260° C. The carbon fibers were allowed to pass through 10 rolls (φ: 50 mm), which were freely rotating with the aid of bearings and alternately arranged above and below a straight-line, as well as 10 roll bars (φ: 200 mm), which were arranged in a zigzag fashion in the furnace, for a plurality of times in a looping manner, thereby thoroughly impregnating the (A) carbon fiber bundle with the (B) polyphenylene sulfide prepolymer over a total period of 10 minutes so as to convert the (B) polyphenylene sulfide prepolymer into (B') polyphenylene sulfide. Thereafter, the resultant was withdrawn from the furnace, cooled by blowing air thereto, and then wound up by a drum winder to obtain a composite composed of (A) a bundle of continuous reinforcing fibers and (B') polyarylene sulfide.

Here, a total of ten 10 mm-long strands were cut from the wound composite. The strands were then refluxed with 1-chloronaphthalene at 210° C. for 6 hours using a Soxhlet extractor so as to separate the carbon fibers from the (B') polyarylene sulfide, and the molecular weight of the extracted (B') polyarylene sulfide was measured. The thus obtained PPS had a weight-average molecular weight (Mw) of 19,700 and a dispersion degree (Mw/Mn) of 1.95. Further, the conversion rate of the (B) polyarylene sulfide prepolymer in the extracted (B') polyarylene sulfide was measured to be 93%.

Thereafter, a component (C), "TORELINA" (registered trademark) A900 (PPS resin manufactured by Toray Industries, Inc.; melting point=278° C.), was melted at 330° C. using a uniaxial extruder and extruded into a crosshead die attached to the tip, of the extruder. Simultaneously with this, the composite obtained in the above was also continuously fed into the crosshead die, thereby coating the melted component (C) onto the composite. In this process, the amount of the component (C) was adjusted such that the reinforcing fiber content became 20 wt %.

The strand obtained in the above-described manner was cooled and then cut at a length of 7 mm using a cutter to obtain a columnar pellet (long-fiber pellet), which is the molding material of the present invention. This columnar pellet had a core-in-sheath structure.

The thus obtained long-fiber pellet had no fluffing caused by transport and exhibited good handling property. The long-fiber pellet was dried under vacuum at 150° C. for 5 hours or longer. The thus dried long-fiber pellet was molded using a mold which was prepared for each test piece and attached to an injection-molding machine (J150EII-P, manufactured by The Japan Steel Works, Ltd.). As for the molding conditions, the molding was carried out at a cylinder temperature of 320° C., a mold temperature of 150° C. and a cooling time of 30 seconds. After this molding process, the resulting molded article was dried under vacuum at 80° C. for 12 hours and dry test pieces thereof, which were stored in a desiccator at room temperature for 3 hours, were subsequently evaluated. The evaluation results are shown in Table 4.

Example 13

A columnar pellet (long-fiber pellet), the molding material of the present invention, was produced in the same manner as in Example 12, except that the furnace temperature was set at 300° C. The thus obtained columnar pellet had a core-in-sheath structure. From the composite obtained therefrom, the (B') polyarylene sulfide was extracted in the same manner as in Example 12 and subjected to the measurements. The thus extracted (B') polyarylene sulfide had a weight-average molecular weight (Mw) of 24,800 and a dispersion degree (Mw/Mn) of 2.30. Further, the conversion rate of the (B) polyarylene sulfide prepolymer in the extracted (B') polyarylene sulfide was measured to be 93%.

In addition, the thus obtained long-fiber pellet was injection-molded in the same manner as in Example 12 and the resulting molded article was subjected to the respective evaluations. The processing conditions and the evaluation results are shown in Table 4.

Example 14

A columnar pellet (long-fiber pellet), the molding material of the present invention, was produced in the same manner as in Example 12, except that tris(dibenzylideneacetone)dipalladium was used in place of tetrakis(triphenylphosphine)palladium as the (D) zero-valent transition metal compound and that the added amount thereof was changed to 1 mol % based on the amount of sulfur atoms contained in the polyphenylene sulfide prepolymer. The thus obtained columnar pellet had a core-in-sheath structure. From the composite obtained therefrom, the (B') polyarylene sulfide was extracted in the same manner as in Example 12 and subjected to the measurements. The thus extracted (B') polyarylene sulfide had a weight-average molecular weight (Mw) of 49,500 and a dispersion degree (Mw/Mn) of 1.83. Further, the conversion rate of the (B) polyarylene sulfide prepolymer in the extracted (B') polyarylene sulfide was measured to be 81%.

In addition, the thus obtained long-fiber pellet was injection-molded in the same manner as in Example 12 and the resulting molded article was subjected to the respective evaluations. The processing conditions and the evaluation results are shown in Table 4.

Example 15

A columnar pellet (long-fiber pellet), the molding material of the present invention, was produced in the same manner as in Example 14, except that the furnace temperature was set at 300° C. The thus obtained columnar pellet had a core-in-sheath structure. From the composite obtained therefrom, the (B') polyarylene sulfide was extracted in the same manner as in Example 12 and subjected to the measurements. The thus extracted (B') polyarylene sulfide had a weight-average molecular weight (Mw) of 44,100 and a dispersion degree (Mw/Mn) of 1.89. Further, the conversion rate of the (B) polyarylene sulfide prepolymer in the extracted (B') polyarylene sulfide was measured to be 87%.

In addition, the thus obtained long-fiber pellet was injection-molded in the same manner as in Example 12 and the resulting molded article was subjected to the respective evaluations. The processing conditions and the evaluation results are shown in Table 4.

Example 16

A columnar pellet (long-fiber pellet), the molding material of the present invention, was produced in the same manner as in Example 12, except that bis[1,2-bis(diphenylphosphino)ethane]palladium was used in place of tetrakis(triphenylphosphine)palladium as the (D) zero-valent transition metal compound. The thus obtained columnar pellet had a core-in-sheath structure. From the composite obtained therefrom, the (B') polyarylene sulfide was extracted in the same manner as in Example 12 and subjected to the measurements. The thus extracted (B') polyarylene sulfide had a weight-average molecular weight (Mw) of 31,900 and a dispersion degree (Mw/Mn) of 2.15. Further, the conversion rate of the (B) polyarylene sulfide prepolymer in the extracted (B') polyarylene sulfide was measured to be 99%.

In addition, the thus obtained long-fiber pellet was injection-molded in the same manner as in Example 12 and the resulting molded article was subjected to the respective evaluations. The processing conditions and the evaluation results are shown in Table 4.

Comparative Example 7

A columnar pellet (long-fiber pellet), which is a molding material, was produced in the same manner as in Example 12, except that the (D) zero-valent transition metal compound was not added and that the amount of the (B) polyphenylene sulfide prepolymer adhered to the composite and the amount of the component (C) coated onto the composite were changed such that the content of the (B') polyphenylene sulfide was changed from 10 wt % to 30 wt % and that of the thermoplastic resin was changed from 70 wt % to 50 wt %. The thus obtained columnar pellet had a core-in-sheath structure. From the composite obtained therefrom, the (B') polyarylene sulfide was extracted in the same manner as in Example 12 and subjected to the measurements. The conversion rate of the (B) polyarylene sulfide prepolymer in the extracted (B') polyarylene sulfide was measured to be mere 2%, Further, the thus obtained long-fiber pellet was injection-molded in the same manner as in Example 12 and the resulting molded article was subjected to the respective evaluations. The processing conditions and the evaluation results are shown in Table 4.

Comparative Example 8

A columnar pellet (long-fiber pellet), which is a molding material, was produced in the same manner as in Example 12, except that the (D) zero-valent transition metal compound was not added. The thus obtained columnar pellet had a core-in-sheath structure. From the composite obtained therefrom, the (B') polyarylene sulfide was extracted in the same manner as in Example 12 and subjected to the measurements. The conversion rate of the (B) polyarylene sulfide prepolymer in the extracted (B') polyarylene sulfide was measured to be mere 2%.

Further, the thus obtained long-fiber pellet was injection-molded in the same manner as in Example 12 and the resulting molded article was subjected to the respective evaluations. The processing conditions and the evaluation results are shown in Table 4.

Comparative Example 9

A columnar pellet (long-fiber pellet), which is a molding material, was produced in the same manner as in Example 13, except that the (D) zero-valent transition metal compound was not added. The thus obtained columnar pellet had a core-in-sheath structure. From the composite obtained therefrom, the (B') polyarylene sulfide was extracted in the same manner as in Example 12 and subjected to the measurements. The conversion rate of the (B) polyarylene sulfide prepolymer in the extracted (B') polyarylene sulfide was measured to be 12%.

Further, the thus obtained long-fiber pellet was injection-molded in the same manner as in Example 12 and the resulting molded article was subjected to the respective evaluations. The processing conditions and the evaluation results are shown in Table 4.

Comparative Example 10

A columnar pellet (long-fiber pellet), which is a molding material, was produced in the same manner as in Example 13, except that diphenyl sulfide was used in place of the (D) zero-valent transition metal compound. The thus obtained columnar pellet had a core-in-sheath structure. From the composite obtained therefrom, the (B') polyarylene sulfide was extracted in the same manner as in Example 12 and subjected to the measurements. The thus extracted (B') polyarylene sulfide had a weight-average molecular weight (Mw) of 14,700 and a dispersion degree (Mw/Mn) of 1.33. Further, the conversion rate of the (B) polyarylene sulfide prepolymer in the extracted (B') polyarylene sulfide was measured to be 16%.

In addition, the thus obtained long-fiber pellet was injection-molded in the same manner as in Example 12 and the resulting molded article was subjected to the respective evaluations. The processing conditions and the evaluation results are shown in Table 4.

TABLE 4

|  |  | Example 12 | Example 13 | Example 14 | Example 15 | Example 16 |
|---|---|---|---|---|---|---|
| (Molding material) |  |  |  |  |  |  |
| Component (A) Carbon fiber | wt % | 20 | 20 | 20 | 20 | 20 |
| Component (B') Polyarylene sulfide | wt % | 10 | 10 | 10 | 10 | 10 |
| Component (C) Thermoplastic resin | Type wt % | PPS 70 | PPS 70 | PPS 70 | PPS 70 | PPS 70 |
| Component (D) Zero-valent transition metal compound | Type mol %[1] | Pd(tpp)$_4$[2] 0.5 | Pd(tpp)$_4$ 0.5 | Pd$_2$(dba)$_3$[3] 1 | Pd$_2$(dba)$_3$ 1 | Pd(dppe)$_2$[4] 0.5 |
| (PAS properties) |  |  |  |  |  |  |
| Weight-average molecular weight | — | 19,700 | 24,800 | 49,500 | 44,100 | 31,900 |
| Dispersion degree | — | 1.95 | 2.30 | 1.83 | 1.89 | 2.15 |
| Conversion rate | % | 93 | 93 | 81 | 87 | 99 |
| (Process condition) |  |  |  |  |  |  |
| Kiss coater temperature | ° C. | 250 | 250 | 250 | 250 | 250 |
| Furnace temperature | ° C. | 260 | 300 | 260 | 300 | 260 |
| Extrusion temperature | ° C. | 330 | 330 | 330 | 330 | 330 |
| Injection-molding temperature | ° C. | 320 | 320 | 320 | 320 | 320 |
| Die temperature | ° C. | 150 | 150 | 150 | 150 | 150 |
| (Molded article properties) |  |  |  |  |  |  |
| Number-average fiber length | mm | 0.45 | 0.50 | 0.50 | 0.55 | 0.50 |
| Weight-average fiber length | mm | 0.60 | 0.65 | 0.70 | 0.70 | 0.65 |
| Density | — | 1.41 | 1.41 | 1.42 | 1.42 | 1.42 |
| Flexural modulus | GPa | 15 | 15 | 16 | 16 | 16 |
| Flexural strength | MPa | 270 | 275 | 280 | 280 | 275 |
| Izod impact | J/m | 85 | 90 | 90 | 100 | 90 |
| Evaluation of contamination | — | good | good | good | good | good |

|  |  | Comparative Example 7 | Comparative Example 8 | Comparative Example 9 | Comparative Example 10 |
|---|---|---|---|---|---|
| (Molding material) |  |  |  |  |  |
| Component (A) Carbon fiber | wt % | 20 | 20 | 20 | 20 |
| Component (B') Polyarylene sulfide prepolymer | wt % | 30 | 10 | 10 | 10 |
| Component (C) Thermoplastic resin | Type wt % | PPS 50 | PPS 70 | PPS 70 | PPS 70 |
| Component (D) | Type | — | — | — | PhSSPh[5] |

TABLE 4-continued

| | | | | | |
|---|---|---|---|---|---|
| Zero-valent transition metal compound | mol %[1] | | | | 1 |
| (PAS properties) | | | | | |
| Weight-average molecular weight | — | — | — | — | 44,700 |
| Dispersion degree | — | — | — | — | 1.33 |
| Conversion rate | % | 2 | 2 | 12 | 16 |
| (Process condition) | | | | | |
| Kiss coater temperature | °C. | 250 | 250 | 250 | 250 |
| Furnace temperature | °C. | 260 | 260 | 300 | 300 |
| Extrusion temperature | °C. | 330 | 330 | 330 | 330 |
| Injection-molding temperature | °C. | 320 | 320 | 320 | 320 |
| Die temperature | °C. | 150 | 150 | 150 | 150 |
| (Molded article properties) | | | | | |
| Number-average fiber length | mm | 0.60 | 0.60 | 0.55 | 0.55 |
| Weight-average fiber length | mm | 0.95 | 0.80 | 0.70 | 0.75 |
| Density | — | 1.42 | 1.41 | 1.41 | 1.40 |
| Flexural modulus | GPa | 13 | 15 | 15 | 15 |
| Flexural strength | MPa | 130 | 245 | 250 | 250 |
| Izod impact | J/m | 30 | 80 | 75 | 75 |
| Evaluation of contamination | — | worse | bad | bad | bad |

[1] Mol % based on the amount of sulfur atoms contained in PAS
[2] Tetrakis(triphenylphosphine)palladium
[3] Tris(dibenzylideneacetone)dipalladium
[4] Bis[1,2-bis(diphenylphosphino)ethane]palladium
[5] Diphenylsulfide From the results of Examples and Comparative Examples that are shown in Table 4, the followings are clear. It is seen that, since the long-fiber pellets of Examples 12 to 16 contain the (D) zero-valent transition metal catalyst, these long-fiber pellets have, as compared to those of Comparative Examples 7 to 9, a considerably higher conversion rate of the (B) polyarylene sulfide prepolymer into the (B') polyarylene sulfide and superior handling property. Further, it is also seen that the long-fiber pellets of Examples 12 to 16 causes no equipment contamination when molded and the resulting molded articles have excellent mechanical characteristics and outer appearance. Moreover, since the long-fiber pellet of Comparative Example 7 contains a large amount of (B) polyarylene sulfide prepolymer having a low conversion rate, the pellet has poor mechanical characteristics and causes a particularly high level of equipment contamination when molded. By comparing Examples 12 to 16 and Comparative Examples 10, it is seen that the (D) zero-valent transition metal catalyst has superior contribution to the conversion of the (B) polyarylene sulfide prepolymer into (B') polyarylene sulfide Example 17

To the (B) polyphenylene sulfide prepolymer prepared in Reference Example 1, tetrakis(triphenylphosphine)palladium was added as the (D) zero-valent transition metal compound in an amount of 1 mol % based on the amount of sulfur atoms contained in the polyphenylene sulfide prepolymer, and the resulting mixture was melted in a 250° C. melting bath to obtain a molten mixture. This molten mixture was then fed to a kiss coater using a gear pump. Using the kiss coater, the (B) polyphenylene sulfide prepolymer was applied onto a roll heated to 250° C., thereby forming a coating film.

Then, by allowing carbon fibers, "TORAYCA" (registered trademark) (T700S-24K, manufactured by Toray Industries, Inc.), to pass on this roll in contact, a prescribed amount of the (B) polyphenylene sulfide prepolymer was adhered per unit length of the (A) carbon fiber bundle.

The carbon fibers to which the (B) polyphenylene sulfide prepolymer was adhered were fed to a furnace heated to 300° C. The carbon fiber were allowed to pass through 10 rolls (φ: 50 mm), which were freely rotating with the aid of bearings and alternately arranged above and below a straight-line, as well as 10 roll bars (φ: 200 mm), which were arranged in a zigzag fashion in the furnace, for a plurality of times in a looping manner, thereby thoroughly impregnating the carbon fiber bundle with the polyphenylene sulfide prepolymer over a total period of 60 minutes to as to convert the polyphenylene sulfide prepolymer into (B') polyphenylene sulfide. Thereafter, the resultant was withdrawn from the furnace, cooled by blowing air thereto, and then wound up by a drum winder to obtain a composite composed of (A) a bundle of continuous reinforcing fibers and (B') polyarylene sulfide.

Here, a total of ten 10 mm-long strands were cut from the wound composite. The strands were then refluxed with 1-chloronaphthalene at 210° C. for 6 hours using a Soxhlet extractor so as to separate the carbon fibers from the (B') polyarylene sulfide, and the molecular weight of the extracted polyarylene sulfide was measured. The thus obtained PPS had a weight-average molecular weight (Mw) of 17,800 and a dispersion degree (Mw/Mn) of 2.11. Further, the conversion rate of the (B) polyarylene sulfide prepolymer in the extracted (B') polyarylene sulfide was measured to be 93%. Moreover, the weight reduction rate (ΔWr) of the extracted (B') polyarylene sulfide was measured to be 0.12%.

Thereafter, a component (C), "TORELINA" (registered trademark) A900 (PPS resin manufactured by Toray Industries, Inc.; melting point=278° C.), was melted at 330° C. in a uniaxial extruder and extruded into a crosshead die attached to the tip of the extruder. Simultaneously with this, the composite obtained in the above was also continuously fed into the crosshead die, thereby coating the melted component (C) onto the composite. In this process, the amount of the component (C) was adjusted such that the reinforcing fiber content became 20 wt %.

The strand obtained in the above-described manner was cooled and then cut at a length of 7 mm using a cutter to obtain a columnar pellet (long-fiber pellet), which is the molding material of the present invention. This columnar pellet had a core-in-sheath structure.

The thus obtained long-fiber pellet had no fluffing caused by transport and exhibited good handling property. The long-fiber pellet was dried under vacuum at 150° C. for 5 hours or longer. The thus dried long-fiber pellet was molded using a mold which was prepared for each test piece and attached to an injection-molding machine (J150EII-P, manufactured by The Japan Steel Works, Ltd.). As for the molding conditions, the molding was carried out at a cylinder temperature of 320° C., a mold temperature of 150° C. and a cooling time of 30 seconds. After this molding process, the resulting molded article was dried under vacuum at 80° C. for 12 hours and dry test pieces thereof, which were stored in a desiccator at room temperature for 3 hours, were subsequently evaluated. The evaluation results are shown in Table 5.

Example 18

A columnar pellet (long-fiber pellet), the molding material of the present invention, was produced in the same manner as in Example 17, except that tris(dibenzylideneacetone)dipalladium was used in place of tetrakis(triphenylphosphine)palladium as the (D) zero-valent transition metal compound. The thus obtained columnar pellet had a core-in-sheath structure. From the composite obtained therefrom, the (B') polyarylene sulfide was extracted in the same manner as in Example 1 and subjected to the measurements. The thus extracted (B') polyarylene sulfide had a weight-average molecular weight (Mw) of 42,200 and a dispersion degree (Mw/Mn) of 1.9. Further, the conversion rate of the (B) polyarylene sulfide prepolymer in the extracted (B') polyarylene sulfide was measured to be 90%. Moreover, the weight reduction rate (ΔWr) of the extracted (B') polyarylene sulfide was measured to be 0.06%.

In addition, the thus obtained long-fiber pellet was injection-molded in the same manner as in Example 12 and the resulting molded article was subjected to the respective evaluations. The processing conditions and the evaluation results are shown in Table 5.

Example 19

A columnar pellet (long-fiber pellet), the molding material of the present invention, was produced in the same manner as in Example 17, except that tetrakis(triphenylphosphine)nickel was used in place of tetrakis(triphenylphosphine)palladium as the (D) zero-valent transition metal compound. The thus obtained columnar pellet had a core-in-sheath structure. From the composite obtained therefrom, the (B') polyarylene sulfide was extracted in the same manner as in Example 12 and subjected to the measurements. The thus extracted (B') polyarylene sulfide had a weight-average molecular weight (Mw) of 43,500 and a dispersion degree (Mw/Mn) of 1.69. Further, the conversion rate of the (B) polyarylene sulfide prepolymer in the extracted (B') polyarylene sulfide was measured to be 72%. Moreover, the weight reduction rate (ΔWr) of the extracted (B') polyarylene sulfide was measured to be 0.19%.

In addition, the thus obtained long-fiber pellet was injection-molded in the same manner as in Example 12 and the resulting molded article was subjected to the respective evaluations. The processing conditions and the evaluation results are shown in Table 5.

Comparative Example 11

A columnar pellet (long-fiber pellet), which is a molding material, was produced in the same manner as in Example 17, except that the (D) zero-valent transition metal compound was not added. The thus obtained columnar pellet had a core-in-sheath structure. From the composite obtained therefrom, the (B') polyarylene sulfide was extracted in the same manner as in Example 12 and subjected to the measurements. The thus extracted (B') polyarylene sulfide had a weight-average molecular weight (Mw) of 62,300 and a dispersion degree (Mw/Mn) of 1.77. Further, the conversion rate of the (B) polyarylene sulfide prepolymer in the extracted (B') polyarylene sulfide was measured to be 54%.

In addition, the thus obtained long-fiber pellet was injection-molded in the same manner as in Example 12 and the resulting molded article was subjected to the respective evaluations. The processing conditions and the evaluation results are shown in Table 5.

Comparative Example 12

A columnar pellet (long-fiber pellet), which is a molding material, was produced in the same manner as in Comparative Example 11, except that the furnace temperature was set at 340° C. The thus obtained columnar pellet had a core-in-sheath structure. From the composite obtained therefrom, the (B') polyarylene sulfide was extracted in the same manner as in Example 12 and subjected to the measurements. The thus extracted (B') polyarylene sulfide had a weight-average molecular weight (Mw) of 68,200 and a dispersion degree (Mw/Mn) of 2.04. Further, the conversion rate of the (B) polyarylene sulfide prepolymer in the extracted (B') polyarylene sulfide was measured to be 92%.

In addition, the thus obtained long-fiber pellet was injection-molded in the same manner as in Example 12 and the resulting molded article was subjected to the respective evaluations. The processing conditions and the evaluation results are shown in Table 5.

Comparative Example 13

A columnar pellet (long-fiber pellet), which is a molding material, was produced in the same manner as in Example 17, except that diphenyl sulfide was used in place of the (D) zero-valent transition metal compound. The thus obtained columnar pellet had a core-in-sheath structure. From the composite obtained therefrom, the (B') polyarylene sulfide was extracted in the same manner as in Example 12 and subjected to the measurements. The thus extracted (B') polyarylene sulfide had a weight-average molecular weight (Mw) of 49,900 and a dispersion degree (Mw/Mn) of 1.77. Further, the conversion rate of the (B) polyarylene sulfide prepolymer in the extracted (B') polyarylene sulfide was measured to be 63%.

In addition, the thus obtained long-fiber pellet was injection-molded in the same manner as in Example 12 and the resulting molded article was subjected to the respective evaluations. The processing conditions and the evaluation results are shown in Table 5.

Comparative Example 14

A columnar pellet (long-fiber pellet), which is a molding material, was produced in the same manner as in Example 17, except that thiophenol sodium salt was used in place of the (D) zero-valent transition metal compound. The thus obtained columnar pellet had a core-in-sheath structure. From the composite obtained therefrom, the (B') polyarylene sulfide was extracted in the same manner as in Example 12 and subjected to the measurements. The thus extracted (B') polyarylene sulfide had a weight-average molecular weight (Mw) of 26,900 and a dispersion degree (Mw/Mn) of 1.68. Further, the conversion rate of the (B) polyarylene sulfide prepolymer in the extracted (B') polyarylene sulfide was measured to be 35%.

In addition, the thus obtained long-fiber pellet was injection-molded in the same manner as in Example 12 and the resulting molded article was subjected to the respective evaluations. The processing conditions and the evaluation results are shown in Table 5.

Reference Example 5

Commercially available "TORELINA" (registered trademark) A900 (PPS resin manufactured by Toray Industries, Inc.; melting point=278° C.) was used and the weight reduction rate, $\Delta Wr$, was measured to be 0.25%.

TABLE 5

|  |  | Example 17 | Example 18 | Example 19 | Comparative Example 11 |
|---|---|---|---|---|---|
| (Molding material) |  |  |  |  |  |
| Component (A) Carbon fiber | wt % | 20 | 20 | 20 | 20 |
| Component (B') Polyarylene sulfide | wt % | 10 | 10 | 10 | 10 |
| Component (C) Thermoplastic resin | Type | PPS | PPS | PPS | PPS |
|  | wt % | 80 | 80 | 80 | 80 |
| Component (D) Zero-valent transition metal compound | Type | Pd(tpp)$_4$[3] | Pd$_2$(dba)$_3$[4] | Ni(tpp)$_4$[5] | — |
|  | mol %[1] | 1 | 1 | 1 |  |
| (PAS properties) |  |  |  |  |  |
| Weight-average molecular weight | — | 17,800 | 42,200 | 43,500 | 62,300 |
| Dispersion degree | — | 2.11 | 1.9 | 1.69 | 1.77 |
| Conversion rate | % | 93 | 90 | 72 | 54 |
| Weight reduction rate[8] | % | 0.12 | 0.06 | 0.19 | — |
| (Process condition) |  |  |  |  |  |
| Kiss coater temperature | ° C. | 250 | 250 | 250 | 250 |
| Furnace temperature | ° C. | 300 | 300 | 300 | 300 |
| Extrusion temperature | ° C. | 330 | 330 | 330 | 330 |
| Injection-molding temperature | ° C. | 320 | 320 | 320 | 320 |
| Die temperature | ° C. | 150 | 150 | 150 | 150 |
| (Molded article properties) |  |  |  |  |  |
| Number-average fiber length | mm | 0.50 | 0.55 | 0.50 | 0.60 |
| Weight-average fiber length | mm | 0.65 | 0.70 | 0.75 | 0.80 |
| Density | — | 1.41 | 1.42 | 1.42 | 1.41 |
| Flexural modulus | GPa | 15 | 16 | 16 | 15 |
| Flexural strength | MPa | 270 | 280 | 275 | 260 |
| Izod impact | J/m | 90 | 100 | 90 | 80 |
| Evaluation of contamination | — | good | good | good | fair |

|  |  | Comparative Example 12 | Comparative Example 13 | Comparative Example 14 | Refernece Example 5[1] |
|---|---|---|---|---|---|
| (Molding material) |  |  |  |  |  |
| Component (A) Carbon fiber | wt % | 20 | 20 | 20 | — |
| Component (B') Polyarylene sulfide | wt % | 30 | 10 | 10 | — |
| Component (C) Thermoplastic resin | Type | PPS | PPS | PPS | — |
|  | wt % | 80 | 80 | 80 |  |
| Component (D) Zero-valent transition metal compound | Type | — | PhSSPh[6] | PhSNa[7] | — |
|  | mol %[1] |  | 1 | 1 |  |
| (PAS properties) |  |  |  |  |  |
| Weight-average molecular weight | — | 68,200 | 49,900 | 26,900 | — |
| Dispersion degree | — | 2.04 | 1.77 | 1.68 | — |
| Conversion rate | % | 92 | 63 | 35 | — |
| Weight reduction rate[8] | % | — | — | — | 0.25 |
| (Process condition) |  |  |  |  |  |
| Kiss coater temperature | ° C. | 250 | 250 | 250 | — |
| Furnace temperature | ° C. | 340 | 300 | 300 | — |
| Extrusion temperature | ° C. | 330 | 330 | 330 | — |

TABLE 5-continued

| | | | | | |
|---|---|---|---|---|---|
| Injection-molding temperature | ° C. | 320 | 320 | 320 | — |
| Die temperature | ° C. | 150 | 150 | 150 | — |
| (Molded article properties) | | | | | |
| Number-average fiber length | mm | 0.40 | 0.55 | 0.65 | — |
| Weight-average fiber length | mm | 0.60 | 0.70 | 0.90 | — |
| Density | — | 1.42 | 1.41 | 1.41 | — |
| Flexural modulus | GPa | 16 | 16 | 15 | — |
| Flexural strength | MPa | 285 | 265 | 260 | — |
| Izod impact | J/m | 90 | 75 | 85 | — |
| Evaluation of contamination | — | good | fair | bad | — |

[1] PPS obtained by conventional method
[2] Mol % based on the amount of sulfur atoms contained in PAS
[3] Tetrakis(triphenylphosphine)palladium
[4] Tris(dibenzylideneacetone)dipalladium
[5] Tetrakis(triphenylphosphine)nickel
[6] Diphenylsulfide
[7] Thiophenol sodium salt
[8] Heat condition: Heating rate of 20° C./min from 100° C. to 330° C.

From the results of Examples and Comparative Examples that are shown in Table 5, the followings are clear. As compared to the molding materials of Comparative Examples 11, 13 and 14, the molding materials of the present invention that were obtained in Examples 17 to 19 have a higher conversion rate of the (B) polyphenylene sulfide prepolymer into the (B) polyarylene sulfide and superior handling property. Further, the molding materials of Examples 17 to 19 cause no equipment contamination when molded and the resulting molded articles have excellent mechanical characteristics and outer appearance. It is also seen that the molding materials of the present invention that were obtained in Examples 17 and 18 can achieve a conversion rate equivalent to that of the molding material of Comparative Example 12 at a lower furnace temperature. This effect is attributable to the presence of a zero-valent transition metal compound. Moreover, by comparing Examples 17 to 19 and Reference Example 5, it is seen that the (13) polyarylene sulfide used in the present invention can reduce the generation of decomposition gas.

(15) Preparation of Prepreg

A resin composition was incited at 230° C. and coated onto a mold-releasing paper at a prescribed thickness using a knife coater at 200° C., thereby preparing a resin film.

Then, two resin films were laminated on both sides of a sheet formed by unidirectionally aligning carbon fibers, "TORAYCA" (registered trademark) (T700S-24K, manufactured by Toray Industries, Inc.), and the resulting laminate was pressed at a pressure of 0.2 MPa using a roll heated to 230° C., thereby impregnating the fibers with the resin composition to prepare a unidirectional prepreg having a carbon fiber content shown in Table 6.

(16) Measurement of Fiber Weight Content of Prepreg

The thus obtained prepreg was cut into 10-cm-square pieces and the resin composition was dissolved with 100 ml of 1-chloronaphthalene at 230° C. for 30 minutes. After drying each prepreg piece, its fiber weight content was calculated based on the weight ratio before and after the above-described treatment. The number of measurements, n, was 3.

(17) Evaluation of Impregnation Property of Prepreg

The prepreg prepared in the above (15) was cut into 10-cm-square pieces and a duct tape was pasted on both sides. The part corresponding to where carbon fibers adhered on both sides of the tape when it was peeled was evaluated as an unimpregnated part, and the impregnation property of the prepreg was evaluated in terms of the area ratio of the unimpregnated part based on three criteria. In Tables, ratings of good (unimpregnated part=less than 5%), fair (unimpregnated part=5% to less than 10%) and poor (unimpregnated part=10% or larger) are indicated as "good", "fair" and "bad", respectively. The number of measurements, n, was 3.

(18) Preparation of Laminated Plate of Fiber-Reinforced Composite Material

In order to cut out test pieces for the flexural test prescribed in JIS K7074-1988 and the interlaminar shearing test prescribed in JIS K7078-1991, the unidirectional prepregs prepared in the above (15) were aligned by the fiber orientation and laminated to a thickness of 2±0.4 mm and 3±0.4 mm. Then, using a press-molding machine, the resulting laminates were each heat-pressed at a pressure of 1 MPa and the temperature shown in Table 6 for the molding time shown in Table 6, thereby preparing a laminated plate.

(19) Test of Flexural Strength

From the laminated plate prepared in the above (18), test pieces were cut out in the size prescribed in JIS K7074-1988 with the longer side thereof corresponding to the fiber axial direction. Each test piece was subjected to a three-point flexural test to determine the flexural strength at 0°.

(20) Test of Interlaminar Shear Strength

From the laminated plate prepared in the above (18), test pieces were cut out in the size prescribed in JIS K7078-1991 with the longer side thereof corresponding to the fiber axial direction. Each test piece was subjected to an interlaminar shearing test to determine the interlaminar shearing strength.

(21) Conversion Rate of (B) Polyarylene Sulfide Prepolymer

The conversion rate of (B) polyarylene sulfide prepolymer into (B') polyarylene sulfide was determined by using high-performance liquid chromatography (HPLC) in accordance with the following method.

A solution, which was obtained by dissolving 50 mg of the laminated plate prepared in the above (18) into about 25 g of 1-chloronaphthalene at 250° C., was cooled to room temperature to form precipitates. The component insoluble to 1-chloronaphthalene was filtered out using a membrane filter having a pore size of 0.45 μm to recover a component soluble to 1-chloronaphthalene. The amount of unreacted cyclic polyarylene sulfide was quantified by performing HPLC measurement of the thus obtained soluble component and the conversion rate of the (B) polyarylene sulfide prepolymer into (B') polyarylene sulfide was calculated. The conditions of the HPLC measurement are shown below, Apparatus: LC-10Avp Series, manufactured by Shimadzu Corporation
Column: MIGHTYSIL RP-18 GP150-4.6 (5 μm)
Detector: photodiode array detector (UV=270 nm)

Examples 20 to 23 and Comparative Examples 15 to 17

Using a resin composition having the formulation shown in Table 6, a prepreg and a fiber-reinforced composite material were prepared in accordance with the above-described methods, and the physical properties thereof were measured.

As shown in Table 6, the prepregs of the present invention obtained in Examples 20 to 23 exhibited excellent impregnation property. In addition, it is seen that the fiber-reinforced composite materials that were obtained from the prepregs of the present invention prepared in Examples 20 to 22 have a high conversion rate of the (B) polyarylene sulfide prepolymer into the (B') polyphenylene sulfide. Further, those fiber-reinforced composite materials that were obtained from the prepregs of the present invention prepared in Examples 20 to 23 had excellent strength and elastic modulus and exhibited particularly excellent interlaminar shearing strength. Moreover, these fiber-reinforced composite material can be molded by treating the respective prepregs at a low temperature.

On another front, as shown in Table 6, it is seen that, in the prepreg of Comparative Example 15 where no (D) zero-valent transition metal compound was added, the prepreg of Comparative Example 16 where a radical catalyst compound different from (D) zero-valent transition metal compound was added, and the prepreg of Comparative Example 17 where an ionic catalyst compound was added, because the respective resins were not sufficiently polymerized under the same conditions of molding temperature and molding time that were used for the prepregs of the present invention prepared in Examples 20 to 23, the resulting fiber-reinforced composite materials had a low flexural strength and interlaminar shearing strength.

TABLE 6

|  |  | Example 20 | Example 21 | Example 22 | Example 23 |
|---|---|---|---|---|---|
| Component (B) | Polyphenylene sulfide prepolymer 1 synthesized in Reference Example 2 (wt %) | 100 | 100 | 100 | 70 |
|  | Polyphenylene sulfide prepolymer 2 synthesized in Reference Example 3 (wt %) | — | — | — | 30 |
| Component (B): Weight ratio of Cyclic PPS in Polyphenylene sulfide prepolymer (%) | | 90 | 90 | 90 | 75 |
| Component (B): Weight-average molecular weight of polyphenylene sulfide prepolymer | | 900 | 900 | 900 | 1300 |
| Component (D) | Catalyst type | Pd(tpp)$_4$[2] | Pd(dppe)$_2$[3] | Pd$_2$(dba)$_3$[4] | Ni(tpp)$_4$[5] |
|  | Catalyst amount[1] (mol %) | 0.5 | 0.5 | 1 | 1 |
| Prepreg properties | | | | | |
| Component (A): Fiber weight content (wt %) | | 64 | 64 | 64 | 64 |
| Impregnation property | | good | good | good | good |
| Molding conditions of fiber-reinforced composite material laminate | | | | | |
| Molding temperature (° C.) | | 260 | 260 | 300 | 300 |
| Molding time (min) | | 10 | 10 | 10 | 60 |
| Properties of fiber-reinforced composite material laminate | | | | | |
| Conversion rate into polyphenylene sulfide | | 93 | 99 | 87 | — |
| 0° Flexural strength (MPa) | | 1730 | 1700 | 2050 | 1520 |
| 0° Flexural modulus (GPa) | | 125 | 123 | 142 | 118 |
| Interlaminate shear strength (MPa) | | 83 | 80 | 75 | 70 |

|  |  | Comparative Example 15 | Comparative Example 16 | Comparative Example 17 |
|---|---|---|---|---|
| Component (B) | Polyphenylene sulfide prepolymer 1 synthesized in Reference Example 2 (wt %) | 100 | 100 | 100 |
|  | Polyphenylene sulfide prepolymer 2 synthesized in Reference Example 3 (wt %) | — | — | — |
| Component (B): Weight ratio of Cyclic PPS in Polyphenylene sulfide prepolymer (%) | | 90 | 90 | 90 |
| Component (B): Weight-average molecular weight of polyphenylene sulfide prepolymer | | 900 | 900 | 900 |
| Component (D) | Catalyst type | — | PhSSPh[6] | PhSNa[7] |
|  | Catalyst amount[1] (mol %) | — | 1 | 1 |
| Prepreg properties | | | | |
| Component (A): Fiber weight content (wt %) | | 64 | 64 | 64 |
| Impregnation property | | good | good | good |
| Molding conditions of fiber-reinforced composite material laminate | | | | |
| Molding temperature (° C.) | | 300 | 300 | 300 |
| Molding time (min) | | 60 | 60 | 60 |
| Properties of fiber-reinforced composite material laminate | | | | |
| Conversion rate into polyphenylene sulfide | | 54 | 63 | 35 |
| 0° Flexural strength (MPa) | | 850 | 1150 | 800 |

TABLE 6-continued

| | | | |
|---|---|---|---|
| 0° Flexural modulus (GPa) | 95 | 105 | 85 |
| Interlaminate shear strength (MPa) | 45 | 50 | 41 |

[1]Mol % based on the amount of sulfur atoms contained in polyarylene sulfide prepolymer (B)
[2]Tetrakis(triphenylphosphine)palladium
[3]Bis[1,2-bis(diphenylphosphino)ethane]palladium
[4]Tris(dibenzylideneacetone)dipalladium
[5]Tetrakis(triphenylphosphine)nickel
[6]Diphenylsulfide
[7]Thiophenol sodium salt Example 24

The method of producing a fiber-reinforced molding base material according to the present invention will now be described referring to the apparatus shown in FIG. 12. It is noted here that the constitution of the apparatus used in the production method of this Example 24 is designated as "[i]", Step (I): A plurality of carbon fibers, "TORAYCA" (registered trademark) T700S-12K (manufactured by Toray Industries, Inc.), were aligned in a space of 100 mm in width such that the distance between the resulting reinforcing fiber bundles became 1 to 5 mm, and the resultant was fed to the production line. The reinforcing fiber bundles were set on a roll bar 5 and aligned in the form of a sheet. The reinforcing fiber bundles were then fed to an impregnation bath 6, where they were passed on rotary rollers 7. Subsequently, the reinforcing fiber bundles were passed through a hot-air drying furnace 8 and then provided to a double-belt press 105, from which the resulting reinforcing fiber bundles were withdrawn with a tension being applied by nip rollers 106. Here, the taking up rate was set at 3 m/min and, after this step became stable, the reinforcing fiber bundles were heated to 150° C. in an infrared heater 107 for preheating.

Step (II): The dispersion (L) composed of the polyphenylene sulfide prepolymer and (D) zero-valent transition metal compound, which was prepared in Reference Example 1, was fed to the impregnation bath by means of a pump 108 to completely immerse the rotary rollers into the dispersion, thereby applying the polyphenylene sulfide prepolymer to the reinforcing fiber bundles. In this process, the immersed length of the reinforcing fiber bundles was adjusted such that the amount of the polyphenylene sulfide prepolymer adhered became 67% in terms of the fiber weight content (Wf). The temperature of the hot-air drying furnace was adjusted to 140° C. so as to remove at least 90% of water content from the reinforcing fiber bundles. Here, as the (D) zero-valent transition metal compound, tetrakis(triphenylphosphine)palladium was selected, and the amount thereof was adjusted to be 0.5 mol % based on the amount of sulfur atoms contained in the polyphenylene sulfide prepolymer.

Step (III): Nitrogen was purged via a gas inlet port 10 of a chamber 9 covering the double-belt press so as to adjust the oxygen concentration in the chamber to be not higher than 1% by volume. Then, the composite was allowed to pass through the 30-1-long double-belt press arranged along the direction of the production line while being heat-pressed at a temperature of 260° C. and a pressure of 5 MPa, thereby polymerizing the polyphenylene sulfide prepolymer.

Step (IV): Polyphenylene sulfide was solidified on a 50° C. cooling plate 11 and the resulting reinforcing fiber bundles were withdrawn by the nip rollers and subsequently cut by a guillotine cutter 12 at 1-m intervals to yield a sheet-form fiber-reinforced molding base material 14 having a width of 100 mm. The above-described steps were all carried out on-line so as to continuously produce the fiber-reinforced molding base material. This fiber-reinforced molding base material obtained by the method of producing a fiber-reinforced molding base material according to the present invention was an extremely rigid unidirectional fiber base material having an impregnation rate of 85% and a basis weight of 75 g/m².

The matrix resin was extracted from the thus obtained fiber-reinforced molding base material and its weight-average molecular weight (Mw) and dispersion degree (Mw/Mn) as well as the conversion rate of the polyphenylene sulfide prepolymer were measured.

From the thus obtained fiber-reinforced molding base material, a plurality of pieces having a prescribed size were cut out and laminated with their fiber orientations being aligned. The resultant was heat-pressed at 350° C. and 3 MPa for 3 minutes using a press-molding machine and then cooled for 5 minutes using a cooling press machine to obtain a laminated plate. From this laminated plate, a test piece was cut out and subjected to a flexural test in the 0° direction. The processing conditions and the evaluation results are shown in Table 7.

Example 25

A fiber-reinforced molding base material was produced in the same manner as in Example 24, except that tris(dibenzylideneacetone)dipalladium was used in place of tetrakis (triphenylphosphine)palladium as the (D) zero-valent transition metal compound and that the added amount thereof was changed to 1 mol % based on the amount of sulfur atoms contained in the polyphenylene sulfide prepolymer. This fiber-reinforced molding base material obtained by the method of producing a fiber-reinforced molding base material according to the present invention was an extremely rigid unidirectional fiber base material having an impregnation rate of 84% and a basis weight of 75 g/m². From the thus obtained fiber-reinforced molding base material, polyphenylene sulfide was extracted in the same manner as in Example 24 and subjected to the measurements. Further, the fiber-reinforced molding base material was press-molded in the same manner as in Example 24 and the resulting molded article was subjected to the respective evaluations. The processing conditions and the evaluation results are shown in Table 7.

Comparative Example 18

A fiber-reinforced molding base material was produced in the same manner as in Example 24, except that the (D) the zero-valent transition metal compound was not added and that the temperature of the double-belt press in the step (III) was changed to 400° C. The fiber-reinforced molding base material obtained by this production method was an extremely rigid unidirectional fiber base material having an impregnation rate of 85% and a basis weight of 75 g/m².

From the thus obtained fiber-reinforced molding base material, polyphenylene sulfide was extracted in the same manner as in Example 24 and subjected to the measurements. Further, the fiber-reinforced molding base material was press-molded in the same manner as in Example 24 and the resulting molded article was subjected to the respective evaluations. The processing conditions and the evaluation results are shown in Table 7.

TABLE 7

|  |  | Example 24 | Example 25 | Comparative Example 18 |
|---|---|---|---|---|
| (Composition) |  |  |  |  |
| Component(A) Continuous reinforcing fibers base material | wt % | 67 | 67 | 67 |
| Component (B) Polyarylene sulfide prepolymer | wt % | 33 | 33 | 33 |
| Component (D) Zero-valent transition metal compound | Type mol %[1] | PPd(tpp)$_4$[2] 0.5 | Pd$_2$(dba)$_3$[3] 1 | — |
| (Properties of polyarylene sulfide ( B' ) ) |  |  |  |  |
| Weight-average molecular weight |  | 24,500 | 44,000 | — |
| Dispersion degree |  | 2.28 | 1.87 | — |
| Conversion rate | % | 93 | 87 | 94 |
| (Producing method) |  |  |  |  |
| Constitution of the apparatus <Step (I)> | — | [i] | [i] | [i] |
| Preheating temperature <Step (II)> | ° C. | 150 | 150 | 150 |
| Compositing temperature <Step (III)> | ° C. | 140 | 140 | 140 |
| Furnace temperature | ° C. | 300 | 300 | 400 |
| Healing time <Step (IV)> | min | 10 | 10 | 10 |
| Taking up speed | m/min | 3 | 3 | 3 |
| Productivity | — | good | good | bad |
| (Molded article properties) |  |  |  |  |
| Density | — | 1.47 | 1.47 | 1.47 |
| Flexural modulus | GPa | 124 | 121 | 120 |
| Flexural strength | MPa | 1750 | 1600 | 1580 |

[1] Mol % based on the amount of sulfur atoms contained in PAS
[2] Tetrakis(triphenylphosphine)palladium
[3] Tris(dibenzylideneacetone)dipalladium From the results of Examples and Comparative Examples that are shown in Table 7, it is clearly seen that, in the method of producing a fiber-reinforced molding material according to the present invention (Examples 24 and 25), since the (D) zero-valent transition metal catalyst is used, an equivalent conversion rate of the (13) polyarylene sulfide prepolymer can be achieved at a lower temperature as compared to the production method of Comparative Example 18.

Example 26

The method of producing a fiber-reinforced molding base material according to the present invention will now be further described referring to the apparatus shown in FIG. 13. It is noted here that the constitution of the apparatus used in the production method of this Example 26 is designated as "[ii]".

Step (I): A plurality of carbon fibers, "TORAYCA" (registered trademark) T700S-12K (manufactured by Toray Industries, Inc.), were aligned in a space of 100 mm in width such that the distance between the resulting reinforcing fiber bundles became 1 to 5 mm, and the resultant was fed to the production line. The reinforcing fiber bundles were set on a roll bar 21 and aligned in the form of a sheet. The reinforcing fiber bundles were fed to a belt conveyor 22 and then inserted between impregnation rollers 23 arranged in pairs, from which the resulting reinforcing fiber bundles were withdrawn by a drum winder 25 with a tension being applied by nip rollers 24. Here, the taking up rate was set at 10 m/min and, after this step became stable, the reinforcing fiber bundles were heated to 150° C. in an infrared heater 26 for preheating.

Step (II): The film (F) composed of the polyphenylene sulfide prepolymer and (D) zero-valent transition metal compound, which was prepared in Reference Example 1, was withdrawn and fed to a hot roller 28, which had been heated to 250° C., along with a mold-releasing paper by means of a winder 27. The film (F) was arranged such that the polyphenylene sulfide prepolymer was laminated on the reinforcing fiber bundles, and the mold-releasing paper was removed by a winder 29. Here, the amount of the polyphenylene sulfide prepolymer adhered was measured to be 67% in terms of the fiber weight content (Wf). Further, as the (D) zero-valent transition, metal compound, tetrakis(triphenylphosphine)palladium was selected, and the amount thereof was adjusted to be 0.5 mol % based on the amount of sulfur atoms contained in the polyphenylene sulfide prepolymer.

Step (III): Nitrogen was purged via a gas inlet port 31 of a heating chamber 30 having a length of 100 m in direction of the production line so as to adjust the oxygen concentration in the heating chamber to be not higher than 1% by volume. Then, the temperature of the heating chamber was set at 300° C. and the resulting laminate was allowed to pass through the impregnation rollers at a pressure of 1 MPa, thereby polymerizing the polyphenylene sulfide prepolymer.

Step (IV): Polyphenylene sulfide was solidified on a 50° C. cooling plate 32, and the resulting laminate was withdrawn by nip rollers and then wound by a drum winder to obtain a fiber-reinforced molding base material 34 having a width of 100 mm.

The above-described steps were all carried out on-line so as to continuously produce the fiber-reinforced molding base material. This fiber-reinforced molding base material obtained by the method of producing a fiber-reinforced molding base material according to the present invention was a unidirectional fiber base material having flexibility also in the fiber direction, whose impregnation rate was 44% and basis weight was 75 g/m².

The matrix resin was extracted from the thus obtained fiber-reinforced molding base material and its weight-average molecular weight (Mw) and dispersion degree (Mw/Mn) as well as the conversion rate of the polyphenylene sulfide prepolymer were measured.

From the thus obtained fiber-reinforced molding base material, a plurality of pieces having a prescribed size were cut out and laminated with their fiber orientations being aligned. The resultant was heat-pressed at 350° C. and 3 MPa for 3 minutes using a press-molding machine and then cooled for 5 minutes using a cooling press machine to obtain a laminated plate. From this laminated plate, a test piece was cut out and subjected to a flexural test in the 0° direction. The processing conditions and the evaluation results are shown in Table 8.

Example 27

A fiber-reinforced molding base material was produced in the same manner as in Example 26, except that tris(dibenzylideneacetone)dipalladium was used in place of tetrakis(triphenylphosphine)palladium as the (D) zero-valent transition metal compound and that the added amount thereof was changed to 1 mol % based on the amount of sulfur atoms contained in the polyphenylene sulfide prepolymer. This fiber-reinforced molding base material obtained by the method of producing a fiber-reinforced molding base material according to the present invention was a unidirectional fiber base material having flexibility also in the fiber direction, whose impregnation rate was 43% and basis weight was 75 g/m². From the thus obtained fiber-reinforced molding base material, polyphenylene sulfide was extracted in the same manner as in Example 26 and subjected to the measurements. Further, the fiber-reinforced molding base material was press-molded in the same manner as in Example 26 and the resulting molded article was subjected to the respective evaluations. The processing conditions and the evaluation results are shown in Table 8.

Comparative Example 19

A fiber-reinforced molding base material was produced in the same manner as in Example 26, except that the (D) the zero-valent transition metal compound was not added and that the temperature of the heating chamber 30 in the step (III) was changed to 400° C. The fiber-reinforced molding base material obtained by this production method was a unidirectional fiber base material having flexibility also in the fiber direction, whose impregnation rate was 45% and basis weight was 74 g/m². From the thus obtained fiber-reinforced molding base material, polyphenylene sulfide was extracted in the same manner as in Example 26 and subjected to the measurements. Further, the fiber-reinforced molding base material was press-molded in the same manner as in Example 26 and the resulting molded article was subjected to the respective evaluations. The processing conditions and the evaluation results are shown in Table 8.

TABLE 8

|  |  | Example 26 | Example 27 | Comparative Example 19 |
|---|---|---|---|---|
| (Composition) |  |  |  |  |
| Component(A) Continuous reinforcing fibers base material | wt % | 67 | 67 | 67 |
| Component (B) Polyarylene sulfide prepolymer | wt % | 33 | 33 | 33 |
| Component (D) Zero-valent transition metal compound | Type | PPd(tpp)₄[2] | Pd₂(dba)₃[3] | — |
|  | mol %[1] | 0.5 | 1 |  |
| (Properties of polyarylene sulfide ( B' ) ) |  |  |  |  |
| Weight-average molecular weight | — | 24,800 | 44,100 | — |
| Dispersion degree | — | 2.30 | 1.89 | — |
| Conversion rate | % | 93 | 87 | 95 |
| (Producing method) |  |  |  |  |
| Constitution of the apparatus <Step (I)> | — | [ii] | [ii] | [ii] |
| Preheating temperature <Step (II)> | ° C. | 150 | 150 | 150 |
| Compositing temperature <Step (III)> | ° C. | 250 | 250 | 250 |
| Furnace temperature | ° C. | 300 | 300 | 400 |
| Healing time | min | 10 | 10 | 10 |

TABLE 8-continued

|  |  | Example 26 | Example 27 | Comparative Example 19 |
|---|---|---|---|---|
| <Step (IV)> | | | | |
| Taking up speed | m/min | 10 | 10 | 10 |
| Productivity | — | good | good | bad |
| (Molded article properties) | | | | |
| Density | — | 1.47 | 1.47 | 1.47 |
| Flexural modulus | GPa | 125 | 122 | 121 |
| Flexural strength | MPa | 1800 | 1620 | 1600 |

[1])Mol % based on the amount of sulfur atoms contained in PAS
[2])Tetrakis(triphenylphosphine)palladium
[3])Tris(dibenzylideneacetone)dipalladium From the results of Examples and Comparative Examples that are shown in Table 8, it is clearly seen that, in the method of producing a fiber-reinforced molding material according to the present invention (Examples 26 and 27), since the (D) zero-valent transition metal catalyst is used, an equivalent conversion rate of the (B) polyarylene sulfide prepolymer can be achieved at a lower temperature as compared to the production method of Comparative Example 19.

Example 28

The method of producing a fiber-reinforced molding base material according to the present invention will now be further described referring to the apparatus shown in FIG. 14. It is noted here that the constitution of the apparatus used in the production method of this Example 28 is designated as "[iii]".

Step (I): A plurality of carbon fibers, "TORAYCA" (registered trademark) T700S-12K (manufactured by Toray Industries, Inc.), were aligned in a space of 100 mm in width such that the distance between the resulting reinforcing fiber bundles became 1 to 5 mm, and the resultant was fed to the production line. The reinforcing fiber bundles were set on a roll bar 41 and aligned in the form of a sheet. Then, the reinforcing fiber bundles were fed to calender rolls 42 and withdrawn by a drum winder 44 with a tension being applied by nip rollers 43. Here, the taking up rate was set at 5 m/min and, after this step became stable, the reinforcing fiber bundles were heated to 150° C. in an infrared heater 45 for preheating.

Step (II): Using a metering powder feeder 46, the particle (P) composed of the polyphenylene sulfide prepolymer and (D) zero-valent transition metal compound, which was prepared in Reference Example 1, was sprinkled from above and adhered onto the reinforcing fiber bundles such that the fiber weight content (Wf) of the resultant became 67%. Here, as the (D) zero-valent transition metal compound, tetrakis(triphenylphosphine)palladium was selected, and the amount thereof was adjusted to be 0.5 mol % based on the amount of sulfur atoms contained in the polyphenylene sulfide prepolymer.

Step (III): Nitrogen was purged via a gas inlet port 48 of a heating chamber 47 having a length of 50 m in direction of the production line so as to adjust the oxygen concentration in the heating chamber to be not higher than 1% by volume. Then, the temperature of the heating chamber was set at 260° C. and the resulting reinforcing fiber bundles were allowed to pass through calender rolls 42 at 260° C. with a tension being applied, thereby polymerizing the polyphenylene sulfide prepolymer.

Step (IV): Polyphenylene sulfide was solidified on a 50° C. cooling plate 49, and the resulting reinforcing fiber bundles were withdrawn by nip rollers and then wound by a drum winder to obtain a fiber-reinforced molding base material 51 having a width of 100 mm.

The above-described steps were all carried out on-line so as to continuously produce the fiber-reinforced molding base material. This fiber-reinforced molding base material obtained by the method of producing a fiber-reinforced molding base material according to the present invention was an extremely rigid unidirectional fiber base material having an impregnation rate of 75% and a basis weight of 75 g/m$^2$.

The matrix resin was extracted from the thus obtained fiber-reinforced molding base material and its weight-average molecular weight (Mw) and dispersion degree (Mw/Mn) as well as the conversion rate of the polyphenylene sulfide prepolymer were measured.

From the thus obtained fiber-reinforced molding base material, a plurality of pieces having a prescribed size were cut out and laminated with their fiber orientations being aligned. The resultant was heat-pressed at 350° C. and 3 MPa for 3 minutes using a press-molding machine and then cooled for 5 minutes using a cooling press machine to obtain a laminated plate. From this laminated plate, a test piece was cut out and subjected to a flexural test in the 0° direction. The processing conditions and the evaluation results are shown in Table 9.

Example 29

A fiber-reinforced molding base material was produced in the same manner as in Example 28, except that tris(dibenzylideneacetone)dipalladium was used in place of tetrakis(triphenylphosphine)palladium as the (D) zero-valent transition metal compound and that the added amount thereof was changed to 1 mol % based on the amount of sulfur atoms contained in the polyphenylene sulfide prepolymer. This fiber-reinforced molding base material obtained by the method of producing a fiber-reinforced molding base material according to the present invention was an extremely rigid unidirectional fiber base material having an impregnation rate of 75% and a basis weight of 75 g/m$^2$. From the thus obtained fiber-reinforced molding base material, polyphenylene sulfide was extracted in the same manner as in Example 28 and subjected to the measurements. Further, the fiber-reinforced molding base material was press-molded in the same manner as in Example 28 and the resulting molded article was subjected to the respective evaluations. The processing conditions and the evaluation results are shown in Table 9.

Example 30

A fiber-reinforced molding base material was produced in the same manner as in Example 28, except that bis[1,2-bis(diphenylphosphino)ethane]palladium was used in place of tetrakis(triphenylphosphine)palladium as the (D) zero-valent transition metal compound. This fiber-reinforced molding base material obtained by the method of producing a fiber-reinforced molding base material according to the present invention was an extremely rigid unidirectional fiber base material having an impregnation rate of 74% and a basis weight of 75 g/m$^2$. From the thus obtained fiber-reinforced molding base material, polyphenylene sulfide was extracted in the same manner as in Example 28 and subjected to the measurements. Further, the fiber-reinforced molding base material was press-molded in the same manner as in Example 28 and the resulting molded article was subjected to the respective evaluations. The processing conditions and the evaluation results are shown in Table 9.

Comparative Example 20

A fiber-reinforced molding base material was produced in the same manner as in Example 28, except that the (D) zero-valent transition metal compound was not added and that the temperatures of the heating chamber 47 and the calender rolls 42 in the step (III) were changed to 400° C. The fiber-reinforced molding base material obtained by this production method was an extremely rigid unidirectional fiber base material having an impregnation rate of 75% and a basis weight of 74 g/m$^2$. From the thus obtained fiber-reinforced molding base material, polyphenylene sulfide was extracted in the same manner as in Example 28 and subjected to the measurements. Further, the fiber-reinforced molding base material was press-molded in the same manner as in Example 28 and the resulting molded article was subjected to the respective evaluations. The processing conditions and the evaluation results are shown in Table 9.

Example 31

A fiber-reinforced molding base material was produced in the same manner as in Example 28, except that the amount of tetrakis(triphenylphosphine)palladium added as the (D) zero-valent transition metal compound was changed to 1 mol % based on the amount of sulfur atoms contained in the polyphenylene sulfide prepolymer; that the temperatures of the heating chamber 47 and the calender rolls 42 in the step (III) were changed to 300° C.; and that the heating chamber 47 was intermittently operated such that the heating time became 60 minutes. This fiber-reinforced molding base material obtained by the method of producing a fiber-reinforced molding base material according to the present invention was an extremely rigid unidirectional fiber base material having an impregnation rate of 75% and a basis weight of 75 g/m$^2$.

The matrix resin was extracted from the thus obtained fiber-reinforced molding base material and its weight-average molecular weight (Mw) and dispersion degree (Mw/Mn) as well as the conversion rate of the polyphenylene sulfide prepolymer were measured.

From the thus obtained fiber-reinforced molding base material, a plurality of pieces having a prescribed size were cut out and laminated with their fiber orientations being aligned. The resultant was heat-pressed at 350° C. and 3 MPa for 3 minutes using a press-molding machine and then cooled for 5 minutes using a cooling press machine to obtain a laminated plate. From this laminated plate, a test piece was cut out and subjected to a flexural test in the 0° direction. The processing conditions and the evaluation results are shown in Table 9.

Example 32

A fiber-reinforced molding base material was produced in the same manner as in Example 31, except that tris(dibenzylideneacetone)dipalladium was used in place of tetrakis(triphenylphosphine)palladium as the (D) zero-valent transition metal compound. This fiber-reinforced molding base material obtained by the method of producing a fiber-reinforced molding base material according to the present invention was an extremely rigid unidirectional fiber base material having an impregnation rate of 74% and a basis weight of 75 g/m$^2$. From the thus obtained fiber-reinforced molding base material, polyphenylene sulfide was extracted in the same manner as in Example 31 and subjected to the measurements. Further, the fiber-reinforced molding base material was press-molded in the same manner as in Example 31 and the resulting molded article was subjected to the respective evaluations. The processing conditions and the evaluation results are shown in Table 9.

Example 33

A fiber-reinforced molding base material was produced in the same manner as in Example 31, except that tetrakis(triphenylphosphine)nickel was used in place of tetrakis(triphenylphosphine)palladium as the (D) zero-valent transition metal compound. This fiber-reinforced molding base material obtained by the method of producing a fiber-reinforced molding base material according to the present invention was an extremely rigid unidirectional fiber base material having an impregnation rate of 74% and a basis weight of 75 g/m$^2$. From the thus obtained fiber-reinforced molding base material, polyphenylene sulfide was extracted in the same manner as in Example 31 and subjected to the measurements. Further, the fiber-reinforced molding base material was press-molded in the same manner as in Example 31 and the resulting molded article was subjected to the respective evaluations. The processing conditions and the evaluation results are shown in Table 9.

Comparative Example 21

A fiber-reinforced molding base material was produced in the same manner as in Example 31, except that the (D) zero-valent transition metal compound was not added. The fiber-reinforced molding base material obtained by this production method was an extremely rigid unidirectional fiber base material having an impregnation rate of 74% and a basis weight of 74 g/m$^2$. From the thus obtained fiber-reinforced molding base material, polyphenylene sulfide was extracted in the same manner as in Example 31 and subjected to the measurements. Further, the fiber-reinforced molding base material was press-molded in the same manner as in Example 31 and the resulting molded article was subjected to the respective evaluations. The processing conditions and the evaluation results are shown in Table 9.

Comparative Example 22

A fiber-reinforced molding base material was produced in the same manner as in Example 31, except that the (D)

zero-valent transition metal compound was not added and that the temperatures of the heating chamber 47 and the calender rolls 42 in the step (III) were changed to 340° C. The fiber-reinforced molding base material obtained by this production method was an extremely rigid unidirectional fiber base material having an impregnation rate of 76% and a basis weight of 74 g/m².

From the thus obtained fiber-reinforced molding base material, polyphenylene sulfide was extracted in the same manner as in Example 31 and subjected to the measurements. Further, the fiber-reinforced molding base material was press-molded in the same manner as in Example 31 and the resulting molded article was subjected to the respective evaluations. The processing conditions and the evaluation results are shown in Table 9.

Comparative Example 23

A fiber-reinforced molding base material was produced in the same manner as in Example 31, except that diphenyl sulfide was used in place of the (D) zero-valent transition metal compound. The fiber-reinforced molding base material obtained by this production method was a rigid unidirectional fiber base material having an impregnation rate of 74%.

From the thus obtained fiber-reinforced molding base material, polyphenylene sulfide was extracted in the same manner as in Example 31 and subjected to the measurements. Further, the fiber-reinforced molding base material was press-molded in the same manner as in Example 31 and the resulting molded article was subjected to the respective evaluations. The processing conditions and the evaluation results are shown in Table 9.

Comparative Example 24

A fiber-reinforced molding base material was produced in the same manner as in Example 31, except that thiophenol sodium salt was used in place of the (D) zero-valent transition metal compound. The fiber-reinforced molding base material obtained by this production method was a rigid unidirectional fiber base material having an impregnation rate of 73%.

From the thus obtained fiber-reinforced molding base material, polyphenylene sulfide was extracted in the same manner as in Example 31 and subjected to the measurements. Further, the fiber-reinforced molding base material was press-molded in the same manner as in Example 31 and the resulting molded article was subjected to the respective evaluations. The processing conditions and the evaluation results are shown in Table 9.

| | | Example 28 | Example 29 | Example 30 | Example 31 | Example 32 | Example 33 |
|---|---|---|---|---|---|---|---|
| (Composition) | | | | | | | |
| Component (A) Continuous reinfocing fibers base material | wt % | 67 | 67 | 67 | 67 | 67 | 67 |
| Component (B) Polyarylene sulfide prepolymer | wt % | 33 | 33 | 33 | 33 | 33 | 33 |
| Component (D) Zero-valent transition metal compound | Type mol %[1] | Pd(tpp)$_4$[2] 0.5 | Pd$_2$(dba)$_3$[3] 1 | Pd(dppe)$_2$[4] 0.5 | Pd(tpp)$_4$[2] 1 | Pd$_2$(dba)$_3$[3] 1 | Ni(tpp)$_4$[5] 1 |
| (Properties of polyarylene sulfide (B')) | | | | | | | |
| Weight-average molecular weight | — | 19,700 | 49,500 | 31,900 | 17,800 | 42,200 | 43,500 |
| Dispersion degree | — | 1.95 | 1.83 | 2.15 | 2.11 | 1.9 | 1.69 |
| Conversion rate | % | 93 | 81 | 99 | 93 | 90 | 72 |
| (Process condition) | | | | | | | |
| Constitution of the apparatus <Step (I)> | | [iii] | [iii] | [iii] | [iii] | [iii] | [iii] |
| Preheating temperature <Step (II)> | ° C. | 150 | 150 | 150 | 150 | 150 | 150 |
| Compositing temperature <Step (III)> | ° C. | — | — | — | — | — | — |
| Furnace temperature | ° C. | 260 | 260 | 260 | 300 | 300 | 300 |
| Heating time <Step (IV)> | min | 10 | 10 | 10 | 60 | 60 | 60 |
| Taking up speed | m/min | 5 | 5 | 5 | 5 | 5 | 5 |
| Productivity | | good | good | good | fair | fair | fair |
| (Molded article properties) | | | | | | | |
| Density | — | 1.46 | 1.47 | 1.47 | 1.47 | 1.47 | 1.47 |
| Flexural modulus | GPa | 125 | 122 | 127 | 126 | 124 | 103 |
| Flexural strength | MPa | 1810 | 1650 | 2000 | 1800 | 1780 | 1420 |

| | | Comparative Example 20 | Comparative Example 21 | Comparative Example 22 | Comparative Example 23 | Comparative Example 24 |
|---|---|---|---|---|---|---|
| (Composition) | | | | | | |
| Component (A) Continuous reinfocing fibers base material | wt % | 67 | 67 | 67 | 67 | 67 |

-continued

| | | | | | | |
|---|---|---|---|---|---|---|
| Component (B) Polyarylene sulfide prepolymer | wt % | 33 | 33 | 33 | 33 | 33 |
| Component (D) Zero-valent transition metal compound | Type mol %[1] | — — | — — | — — | PhSSPh[6] 1 | PhSNa[7] 1 |
| (Properties of polyarylene sulfide (B')) | | | | | | |
| Weight-average molecular weight | — | — | 62,300 | 68,200 | 49,900 | 26,900 |
| Dispersion degree | — | — | 1.77 | 2.04 | 1.77 | 1.68 |
| Conversion rate | % | 95 | 54 | 92 | 63 | 35 |
| (Process condition) | | | | | | |
| Constitution of the apparatus <Step (I)> | | [iii] | [iii] | [iii] | [iii] | [iii] |
| Preheating temperature <Step (II)> | ° C. | 150 | 150 | 150 | 150 | 150 |
| Compositing temperature <Step (III)> | ° C. | — | — | — | — | — |
| Furnace temperature | ° C. | 400 | 300 | 340 | 300 | 300 |
| Heating time <Step (IV)> | min | 10 | 60 | 60 | 60 | 60 |
| Taking up speed | m/min | 5 | 5 | 5 | 5 | 5 |
| Productivity | — | bad | worse | worse | worse | worse |
| (Molded article properties) | | | | | | |
| Density | — | 1.47 | 1.47 | 1.46 | 1.47 | 1.47 |
| Flexural modulus | GPa | 121 | 98 | 124 | 101 | 83 |
| Flexural strength | MPa | 1600 | 1050 | 1820 | 1200 | 810 |

[1]Mol % based on the amount of sulfur atoms contained in PAS
[2]Tetrakis(triphenylphosphine)palladium
[3]Tris(dibenzylideneacetone)dipalladium
[4]Bis[1,2-bis(diphenylphosphino)ethane]palladium
[5]Tetrakis(triphenylphosphine)nickel
[6]Diphenylsulfide
[7]Thiophenol sodium salt From the results of Examples and Comparative Examples that are shown in Table 9, it is clearly seen that, in the method of producing a fiber-reinforced molding material according to the present invention (Examples 28 to 30), since the (D) zero-valent transition metal catalyst is used, a high conversion rate of the (B) polyarylene sulfide prepolymer can be achieved at a lower temperature as compared to the production method of Comparative Example 20.

In addition, it is seen that, since the production methods of Examples 28 to 30 are capable of producing a fiber-reinforced molding base material continuously, in terms of the productivity and the cost, they are superior to those production methods of Examples 31 to 33 and Comparative Examples 21 to 24 where a fiber-reinforced molding base material is produced intermittently.

Further, it is also seen that, in the method of producing a fiber-reinforced molding material according to the present invention (Examples 31 to 33), since the (D) zero-valent transition metal catalyst is used, as compared to the production method of Comparative Example 21, the conversion rate of the (B) polyarylene sulfide prepolymer is higher, the productivity is better and the resulting molding materials have superior characteristics.

Moreover, it is seen that, in the method of producing a fiber-reinforced molding material according to the present invention (Examples 28 to 33), since the (D) zero-valent transition metal catalyst is used, as compared to the production method of Comparative Example 22, a fiber-reinforced molding base material having a higher conversion rate of the (B) polyarylene sulfide prepolymer can be obtained at a lower temperature. Therefore, the production methods of Examples 28 to 33 are superior to those of Comparative Example 22.

Furthermore, it is seen that, in the method of producing a fiber-reinforced molding material according to the present invention (Examples 28 to 33), since the (D) zero-valent transition metal catalyst is used, as compared to those production methods of Comparative Examples 23 and 24 where a polymerization catalyst other than the (D) zero-valent transition metal catalyst was used, the conversion rate of the (B) polyarylene sulfide prepolymer is higher, the productivity is better and the resulting molding materials have superior characteristics.

Example 34

To the polyphenylene sulfide prepolymer prepared in Reference Example 4, iron (III) chloride anhydride was added as a source of a low-valent iron compound in an amount of 1 mol % based on the amount of sulfur atoms contained in the polyphenylene sulfide prepolymer. The resulting mixture was melted in a 250° C. melting bath and then fed to a kiss coater using a gear pump. Using the kiss coater, the polyphenylene sulfide prepolymer was applied onto a roll heated to 260° C., thereby forming a coating film.

Then, by allowing carbon fibers, "TORAYCA" (registered trademark) (T700S-24K, manufactured by Toray Industries, Inc.), to pass on this roll in contact, a prescribed amount of the polyphenylene sulfide prepolymer was adhered per unit length of the resulting carbon fiber bundle, The carbon fibers to which the polyphenylene sulfide prepolymer was adhered were then allowed to pass through 10 rolls (φ: 50 mm) that were freely rotating with the aid of bearings heated to 260° C. and alternately arranged above and below a straight-line, thereby thoroughly impregnating a component (B) into a component (A).

Thereafter, a component (C), "TORELINA" (registered trademark) A900 (polyphenylene sulfide resin manufactured by Toray Industries, Inc.; inciting point=278° C.), was melted at 330° C. in a uniaxial extruder and extruded into a crosshead die attached to the tip of the extruder. Simultaneously with this, the composite obtained in the above was also continuously fed into the crosshead die, thereby coating the melted component (C) onto the composite. In this process, the amount of the component (C) was adjusted such that the reinforcing fiber content became 20 wt %.

The strand obtained in the above-described manner was cooled and then cut at a length of 7 mm using a cutter to obtain a columnar pellet (long-fiber pellet), which is the molding material of the present invention. This columnar pellet had a core-in-sheath structure.

The thus obtained long-fiber pellet had no fluffing caused by transport and exhibited good handling property. The long-fiber pellet was dried under vacuum at 150° C. for 5 hours or longer. The thus dried long-fiber pellet was molded using a mold which was prepared for each test piece and attached to an injection-molding machine (J150EII-P, manufactured by The Japan Steel Works, Ltd.). As for the molding conditions, the molding was carried out at a cylinder temperature of 320° C., a mold temperature of 150° C. and a cooling time of 30 seconds. After this molding process, the resulting molded article was dried under vacuum at 80° C. for 12 hours and dry test pieces thereof, which were stored in a desiccator at room temperature for 3 hours, were subsequently evaluated. The evaluation results are shown in Table 10.

In the molding process, as a result of examining the gas component generated from a discharged substance from the cylinder by purging, the presence of chlorine component was confirmed. The thus obtained molded article was melted in 1-chloronaphthalene at 250° C. to obtain carbon fibers and an iron compound as an insoluble portion. From the insoluble portion, the iron compound was isolated and subjected to XAFS measurement to analyze the valence state of the iron compound and the structure in the vicinity of the iron atom. As a result, in the absorption spectrum related to XANES, the shape of the spectrum was similar to that of iron (III) chloride, and also from the radial distribution function, a main peak similar to that of iron (III) chloride was observed at about 0.16 nm; therefore, it was confirmed that the iron compound comprised iron (III) chloride as the main component. However, in the absorption spectrum related to XANES, since a slight shoulder peak was observed near 7120 eV, which is the energy region where the top of the main peak of iron (II) chloride is observed, it was found that iron (II) chloride component was generated during the heating.

Comparative Example 25

A columnar pellet (long-fiber pellet), which is a molding material, was produced in the same manner as in Example 34, except that iron (III) oxide was used in place of the (E) low-valent iron compound and that the added amount thereof was changed to 0.5 mol % based on the amount of sulfur atoms contained in the polyphenylene sulfide prepolymer. The thus obtained columnar pellet had a core-in-sheath structure. This long-fiber pellet was injection-molded in the same manner as in Example 34 and the resulting molded article was subjected to the respective evaluations. The processing conditions and the evaluation results are shown in Table 10.

The thus obtained molded article melted in 1-chloronaphthalene at 250° C. to obtain carbon fibers and an iron compound as an insoluble portion. From the insoluble portion, the iron compound was isolated and subjected to XAFS measurement to analyze the valence state of the iron compound and the structure in the vicinity of the iron atom. As a result, in the absorption spectrum related to XANES, the shape of the spectrum was similar to that of iron (III) oxide, and in the radial distribution function, peaks thought to be resulting from the Fe—O bond, Fe—Fe bond and so on were observed at about 0.15 nm and at about 0.26 nm, similar to iron (III) oxide. Thus, it was found that the iron compound comprised iron (III) oxide as the main component.

Comparative Example 26

A columnar pellet (long-fiber pellet), which is a molding material, was produced in the same manner as in Example 34, except that the (E) low-valent iron compound was not added. The thus obtained columnar pellet had a core-in-sheath structure. This long-fiber pellet was injection-molded in the same manner as in Example 34 and the resulting molded article was subjected to the respective evaluations. The processing conditions and the evaluation results are shown in Table 10.

Comparative Example 27

A columnar pellet (long-fiber pellet), which is a molding material, was produced in the same manner as in Example 34, except that thiophenol sodium salt was used in place of the (E) low-valent iron compound. The thus obtained columnar pellet had a core-in-sheath structure. This long-fiber pellet was injection-molded in the same manner as in Example 34 and the resulting molded article was subjected to the respective evaluations. The processing conditions and the evaluation results are shown in Table 10.

TABLE 10

|  |  | Example 34 | Comparative Example 25 | Comparative Example 26 | Comparative Example 27 |
|---|---|---|---|---|---|
| (Molding material) |  |  |  |  |  |
| Component (A) Carbon fiber | wt % | 20 | 20 | 20 | 20 |
| Component (B) Polyarylene sulfide prepolymer | wt % | 10 | 10 | 10 | 10 |
| Component (C) Thermoplastic resin | Type | PPS | PPS | PPS | PPS |
|  | wt % | 70 | 70 | 70 | 7 O |

TABLE 10-continued

|  |  | Example 34 | Comparative Example 25 | Comparative Example 26 | Comparative Example 27 |
|---|---|---|---|---|---|
| Component (E) | Type | FeCl$_3$ | Pd(tpp)$_4$[2] | — | PhSNa[2] |
| Low-valent iron compound | mol %[1] | 1 | 0.5 |  | 1 |
| (Process condition) |  |  |  |  |  |
| Kiss coater temperature | °C. | 250 | 250 | 250 | 250 |
| Furnace temperature | °C. | 260 | 260 | 260 | 260 |
| Extrusion temperature | °C. | 330 | 330 | 330 | 330 |
| Injection-molding temperature | °C. | 320 | 320 | 320 | 320 |
| Die temperature | °C. | 150 | 150 | 150 | 150 |
| (Molded article properties) |  |  |  |  |  |
| Number-average fiber length | mm | 0.45 | 0.50 | 0.50 | 0.45 |
| Weight-average fiber length | mm | 0.60 | 0.60 | 0.65 | 0.60 |
| Density | — | 1.41 | 1.41 | 1.41 | 1.41 |
| Flexural modulus | GPa | 15 | 15 | 15 | 15 |
| Flexural strength | MPa | 260 | 255 | 250 | 250 |
| Izod impact | J/m | 80 | 70 | 70 | 65 |
| Weight-average molecular weight of polyarylene sulfide (B') | — | good | bad | bad | bad |

[1] Mol % based on the amount of sulfur atoms contained in polyarylene sulfide prepolymer (B)
[2] Thiophenol sodium salt From the results of Examples and Comparative Examples that are shown in Table 10, the followings are clear.

It is seen that, since the molding material of the present invention prepared in Example 34 contain the (E) low-valent iron compound, as compared to the molding materials of Comparative Examples 25 to 27, the (B') polyarylene sulfide in the resulting molded article has a higher weight-average molecular weight. It is also seen that, since the (B') polyarylene sulfide contained in the molding material of the present invention prepared in Example 34 has a high weight-average molecular weight, the resulting molded article has excellent mechanical characteristics.

Example 35

To the (B) polyphenylene sulfide prepolymer prepared in Reference Example 4, iron (III) chloride anhydride was added as a source of a low-valent iron compound in an amount of 1 mol % based on the amount of sulfur atoms contained in the polyphenylene sulfide prepolymer, and the resulting mixture was melted in a 250° C. melting bath to obtain a molten mixture. This molten mixture was then fed to a kiss coater using a gear pump. Using the kiss coater, the (B) polyphenylene sulfide prepolymer was applied onto a roll heated to 250° C., thereby forming a coating film.

Then, by allowing carbon fibers, "TORAYCA" (registered trademark) (T700S-24K, manufactured by Toray Industries, Inc.), to pass on this roll in contact, a prescribed amount of the (B) polyphenylene sulfide prepolymer was adhered per unit length of the resulting carbon fiber bundle.

The carbon fibers to which the (B) polyphenylene sulfide prepolymer was adhered were fed to a furnace heated to 300° C. The carbon fibers were allowed to pass through 10 rolls (φ: 50 mm), which were freely rotating with the aid of bearings and alternately arranged above and below a straight-line, as well as 10 roll bars (φ: 200 mm), which were arranged in a zigzag fashion in the furnace, for a plurality of times in a looping manner, thereby thoroughly impregnating the carbon fiber bundle with the polyphenylene sulfide prepolymer over a total period of 60 minutes so as to convert the polyphenylene sulfide prepolymer into (B') polyphenylene sulfide. Thereafter, the resultant was withdrawn from the furnace, cooled by blowing air thereto, and then wound up by a drum winder to obtain a composite composed of (A) a bundle of continuous reinforcing fibers and (B') polyarylene sulfide. In this step, when the gas component was examined in the furnace using a detector tube, the presence of a chlorine component was confirmed.

Further, a total of ten 10 mm-long strands were cut from the wound composite. The strands were then refluxed with 1-chloronaphthalene at 210° C. for 6 hours using a Soxhlet extractor, thereby extracting the (B') polyarylene sulfide. Then, the conversion rate of the (B) polyarylene sulfide prepolymer in the extracted (B') polyarylene sulfide was measured to be 81%.

From the wound-up composite, ten 10-mm-long strands were cut out and dissolved in 1-chloronaphthalene at 250° C. to obtain carbon fibers and an iron compound as an insoluble portion. From the insoluble portion, the iron compound was isolated and subjected to XAFS measurement to analyze the valence state of the iron compound and the structure in the vicinity of the iron atom. As a result, although a main peak was observed at the position similar to that of iron (II) chloride in the absorption spectrum related to XANES, the shape was different, and in the radial distribution function, a main peak thought to represent the same characteristic as that of iron (III) chloride and iron (II) chloride tetrahydrate was observed at about 0.16 nm, and a subpeak thought to represent the same characteristic as that of iron (II) chloride and iron (II) chloride tetrahydrate was observed at about 0.21 nm. Thus, it was confirmed that iron (II) chloride component which is a divalent iron compound existed together with a trivalent iron compound.

Thereafter, a component (C), "TORELINA" (registered trademark) A900 (PPS resin manufactured by Toray Industries, Inc.; melting point=278° C.), was melted at 330° C. in a uniaxial extruder and extruded into a crosshead die attached to the tip of the extruder. Simultaneously with this, the composite obtained in the above was also continuously fed into the crosshead die, thereby coating the melted component (C) onto the composite. In this process, the amount of the component (C) was adjusted such that the reinforcing fiber content became 20 wt %.

The strand obtained in the above-described manner was cooled and then cut at a length of 7 mm using a cutter to obtain a columnar pellet (long-fiber pellet), which is the molding material of the present invention. This columnar pellet had a core-in-sheath structure, The thus obtained long-fiber pellet had no fluffing caused by transport and exhibited good handling property. The long-fiber pellet was dried under vacuum at 150° C. for 5 hours or longer. The thus dried long-fiber pellet was molded using a mold which was prepared for each test piece and attached to an injection-molding machine (J150EII-P, manufactured by The Japan Steel Works, Ltd.). As for the molding conditions, the molding was carried out at a cylinder temperature of 320° C., a mold temperature of 150° C. and a cooling time of 30 seconds. After this molding process, the resulting molded article was dried under vacuum at 80° C. for 12 hours and dry test pieces thereof, which were stored in a desiccator at room temperature for 3 hours, were subsequently evaluated. The valuation results are shown in Table 11.

Comparative Example 28

A columnar pellet (long-fiber pellet), which is a molding material, was produced in the same manner as in Example 35, except that iron (III) oxide was used in place of the (E) low-valent iron compound and that the added amount thereof was changed to 0.5 mol % based on the amount of sulfur atoms contained in the polyphenylene sulfide prepolymer. The thus obtained columnar pellet had a core-in-sheath structure. From the composite obtained therefrom, the (B') polyarylene sulfide was extracted in the same manner as in Example 35 and subjected to the measurements. The conversion rate of the (B) polyarylene sulfide prepolymer in the extracted (B') polyarylene sulfide was measured to be 36%. Further, XAFS measurement was carried out to analyze the valence state of the iron compound and the structure in the vicinity of the iron atom. As a result, in the absorption spectrum related to XANES, the shape of the spectrum was similar to that of iron (III) oxide, and in the radial distribution function, peaks thought to be resulting from the Fe—O bond, Fe—Fe bond and so on were observed at about 0.15 nm and at about 0.26 nm, similar to iron (III) oxide. Thus, it was found that the iron compound comprised iron (III) oxide as the main component.

Further, the thus obtained long-fiber pellet was injection-molded in the same manner as in Example 35 and the resulting molded article was subjected to the respective evaluations. The processing conditions and the evaluation results are shown in Table 11.

Comparative Example 29

A columnar pellet (long-fiber pellet), which is a molding material, was produced in the same manner as in Example 35, except that the (E) low-valent iron compound was not added. The thus obtained columnar pellet had a core-in-sheath structure. From the composite obtained therefrom, the (B') polyarylene sulfide was extracted in the same manner as in Example 35 and subjected to the measurements. The conversion rate of the (B) polyarylene sulfide prepolymer in the extracted (B') polyarylene sulfide was measured to be 44%.

Further, the thus obtained long-fiber pellet was injection-molded in the same manner as in Example 35 and the resulting molded article was subjected to the respective evaluations. The processing conditions and the evaluation results are shown in Table 11.

Comparative Example 30

A columnar pellet (long-fiber pellet), which is a molding material, was produced in the same manner as in Example 35, except that thiophenol sodium salt was used in place of the (E) low-valent iron compound. The thus obtained columnar pellet had a core-in-sheath structure. From the composite obtained therefrom, the (B') polyarylene sulfide was extracted in the same manner as in Example 35 and subjected to the measurements. The conversion rate of the (B) polyarylene sulfide prepolymer in the extracted (B') polyarylene sulfide was measured to be 35%.

Further, the thus obtained long-fiber pellet was injection-molded in the same manner as in Example 35 and the resulting molded article was subjected to the respective evaluations. The processing conditions and the evaluation results are shown in Table 11.

TABLE 11

|  |  | Example 35 | Comparative Example 28 | Comparative Example 29 | Comparative Example 30 |
|---|---|---|---|---|---|
| (Molding material) |  |  |  |  |  |
| Component (A) Carbon fiber | wt % | 20 | 20 | 20 | 20 |
| Component (B') Polyarylene sulfide | wt % | 10 | 10 | 10 | 10 |
| Component (C) | Type | PPS | PPS | PPS | PPS |
| Thermoplastic resin | wt % | 80 | 80 | 80 | 80 |
| Component (E) | Type | $FeCl_3$ | $Fe_2O_3$ | — | $PhSNa$[2] |
| Low-valent iron compound | mol %[1] | 1 | 0.5 | — | 1 |
| (PAS properties) |  |  |  |  |  |
| Weight-average molecular weight |  | — | — | — | — |
| Dispersion degree |  | — | — | — | — |
| Conversion rate | % | 81 | 36 | 44 | 35 |
| Weight reduction rate[3] | % | — | — | — | — |
| (Process condition) |  |  |  |  |  |
| Kiss coater temperature | ° C. | 250 | 250 | 250 | 250 |
| Furnace temperature | ° C. | 300 | 300 | 300 | 300 |
| Extrusion temperature | ° C. | 330 | 330 | 330 | 330 |
| Injection-molding temperature | ° C. | 320 | 320 | 320 | 320 |
| Die temperature | ° C. | 150 | 150 | 150 | 150 |

TABLE 11-continued

|  |  | Example 35 | Comparative Example 28 | Comparative Example 29 | Comparative Example 30 |
|---|---|---|---|---|---|
| (Molded article properties) |  |  |  |  |  |
| Number-average fiber length | mm | 0.50 | 0.55 | 0.50 | 0.65 |
| Weight-average fiber length | mm | 0.65 | 0.65 | 0.60 | 0.90 |
| Density | — | 1.41 | 1.41 | 1.41 | 1.41 |
| Flexural modulus | GPa | 16 | 15 | 15 | 15 |
| Flexural strength | MPa | 270 | 255 | 260 | 260 |
| Izod impact | J/m | 90 | 75 | 80 | 85 |
| Evaluation of contamination | — | good | bad | bad | bad |

[1] Mol % based on the amount of sulfur atoms contained in PAS
[2] Thiophenol sodium salt
[3] Heat condition::Heating rate of 20° C./min from 100° C. to 330° C.

From the results of Examples and Comparative Examples that are shown in Table 11, the followings are clear.

It is seen that, since the molding material of the present invention prepared in Example 35 contains the (E) low-valent iron compound, as compared to the molding materials of Comparative Example 28 to 30, in the process of producing the molding material, the conversion rate of the (B) polyarylene sulfide prepolymer into the (B') polyarylene sulfide is high. It is also seen that, because of the high conversion rate of the (B) polyarylene sulfide prepolymer into the (B') polyarylene sulfide in the process of producing the molding material of the present invention prepared in Example 35, the molded article obtained therefrom has excellent mechanical characteristics.

Example 36 and Comparative Examples 31 to 33

Using a resin composition having the formulation shown in Table 12, a prepreg and a fiber-reinforced composite material were prepared in accordance with the above-described methods, and the physical properties thereof were measured.

In the step of molding the fiber-reinforced composite material laminate of Example 36, when the gas component was examined using a detector tube at the time of demolding the fiber-reinforced composite material laminate, the presence of a chlorine component was confirmed.

The fiber-reinforced composite material laminate obtained in Example 36 was dissolved in 1-chloronaphthalene at 250° C. to obtain carbon fibers and an iron compound as an insoluble portion. From the insoluble portion, the iron compound was isolated and subjected to XAFS measurement to analyze the valence state of the iron compound and the structure in the vicinity of the iron atom. As a result, although a main peak was observed at the position similar to that of iron (II) chloride in the absorption spectrum related to XANES, the shape was different, and in the radial distribution function, a main peak thought to represent the same characteristic as that of iron (III) chloride and iron (II) chloride tetrahydrate was observed at about 0.16 nm, and a subpeak thought to represent the same characteristic as that of iron (II) chloride and iron (II) chloride tetrahydrate was observed at about 0.21 nm. Thus, it was confirmed that iron (II) chloride component which is a divalent iron compound existed together with a trivalent iron compound.

The fiber-reinforced composite material laminate obtained in Comparative Example 31 was subjected to the XAFS measurement and analysis of the valence state of the iron compound and the structure in the vicinity of the iron atom in the same manner as in Example 36. As a result, in the absorption spectrum related to XANES, the shape of the spectrum was similar to that of iron (III) oxide, and in the radial distribution function, peaks thought to be resulting from the Fe—O bond, Fe—Fe bond and so on were observed at about 0.15 nm and at about 0.26 nm, similar to iron (III) oxide. Thus, it was found that the iron compound comprised iron (III) oxide as the main component.

As shown in Table 12, the fiber-reinforced composite material laminate of the present invention prepared in Example 36 has excellent impregnation property. Further, the fiber-reinforced composite material utilizing the fiber-reinforced composite material laminate of Example 36 has a high conversion rate of the polyarylene sulfide prepolymer into polyphenylene sulfide as well as excellent strength and elastic modulus. This composite material also exhibits particularly excellent interlaminar shearing strength. Moreover, this fiber-reinforced composite material can be molded by treating a prepreg at a low temperature.

Meanwhile as shown in Table 12, in the prepreg of Comparative Example 32 where a low-valent iron compound was not added and these prepregs of Comparative Examples 31 and 33 where a catalyst other than low-valent iron compound was added, because the respective resins are not sufficiently polymerized under the same conditions of molding temperature and molding time as in Examples, the resulting fiber-reinforced composite materials have a low flexural strength and interlaminar shearing strength.

TABLE 12

|  | Example 36 | Comparative Example 31 | Comparative Example 32 | Comparative Example 33 |
|---|---|---|---|---|
| Component (B): Polyphenylene sulfide prepolymer synthesized in Reference Example 4 (wt %) | 100 | 100 | 100 | 100 |
| Component (B): weight ratio of Cyclic PPS in Polyphenylene sulfide prepolymer (%) | 94 | 94 | 94 | 94 |
| Component (B: Polyphenylene sulfide prepolymer σ Weight-average molecular weight | 900 | 900 | 900 | 900 |

TABLE 12-continued

|  |  | Example 36 | Comparative Example 31 | Comparative Example 32 | Comparative Example 33 |
|---|---|---|---|---|---|
| Component (E) | Catalyst type | $FeCl_3$ | $Fe_2O_3$ | — | PhSNa[1] |
|  | Catalyst amount[2] (mol %) | 1 | 0.5 | — | 1 |
| Prepreg properties |  |  |  |  |  |
| Component (A): Fiber weight content (wt %) |  | 64 | 64 | 64 | 64 |
| Impregnation property |  | good | good | good | good |
| Molding conditions of fiber-reinforced composite material laminate |  |  |  |  |  |
| Molding temperature (° C.) |  | 300 | 300 | 300 | 300 |
| Molding time (min) |  | 60 | 60 | 60 | 60 |
| Properties of fiber-reinforced composite material laminate |  |  |  |  |  |
| Conversion rate into polyphenylene sulfide |  | 81 | 36 | 44 | 35 |
| 0° Flexural strength (MPa) |  | 1680 | 800 | 850 | 800 |
| 0° Flexural modulus (GPa) |  | 120 | 83 | 90 | 85 |
| Interlaminate shear strength (MPa) |  | 73 | 40 | 43 | 41 |

[1]Thiophenol sodium salt
[2]Mol % based on the amount of sulfur atoms contained in polyarylene sulfide prepolymer (B)

Example 37

The method of producing a fiber-reinforced molding base material according to the present invention will now be further described referring to the apparatus shown in FIG. 14. It is noted here that the constitution of the apparatus used in the production method of this Example 37 is designated as "[iii]".

Step (I): A plurality of carbon fibers, "TORAYCA" (registered trademark) T700S-12K (manufactured by Toray Industries, Inc.), were aligned in a space of 100 mm in width such that the distance between the resulting reinforcing fiber bundles became 1 to 5 mm, and the resultant was fed to the production line. The reinforcing fiber bundles were set on a roll bar 41 and aligned in the form of a sheet. Then, the reinforcing fiber bundles were fed to calender rolls 42 and withdrawn by a drum winder 44 with a tension being applied by nip rollers 43. Here, the taking up rate was set at 5 m/min and, after this step became stable, the reinforcing fiber bundles were heated to 150° C. in an infrared heater 45 for preheating.

Step (II): Using a metering powder feeder 46, the particles (P'") composed of the polyphenylene sulfide prepolymer and (E) low-valent iron compound, which was prepared in Reference Example 4, was sprinkled from above and adhered onto the reinforcing fiber bundles such that the fiber weight content (Wf) of the resultant became 67%. Here, as the source of low-valent iron metal compound, iron (III) chloride was selected, and the amount thereof was adjusted to be 1 mol % based on the amount of sulfur atoms contained in the polyphenylene sulfide prepolymer.

Step (III): Nitrogen was purged via a gas inlet port 48 of a heating chamber 47 having a length of 50 m in direction of the production line so as to adjust the oxygen concentration in the heating chamber to be not higher than 1% by volume. Then, the temperature of the heating chamber was set at 300° C. and the resulting reinforcing fiber bundles were allowed to pass through calender rolls 42 at 300° C. with a tension being applied. By intermittently operating the heating chamber 47 such that the heating time became 60 minutes, the polyphenylene sulfide prepolymer was polymerized.

Step (IV): Polyphenylene sulfide was solidified on a 50° C. cooling plate 49, and the resulting reinforcing fiber bundles were withdrawn by nip rollers and then wound by a drum winder to obtain a fiber-reinforced molding base material 51 having a width of 100 mm.

The above-described steps were all carried out on-line so as to continuously produce the fiber-reinforced molding base material. This fiber-reinforced molding base material obtained by the method of producing a fiber-reinforced molding base material according to the present invention was an extremely rigid unidirectional fiber base material having an impregnation rate of 75% and a basis weight of 75 g/m².

In the above-described step (III), when the gas component was examined in the heating chamber using a detector tube, the presence of a chlorine component was confirmed.

The matrix resin was extracted from the thus obtained fiber-reinforced molding base material and the conversion rate of the polyphenylene sulfide prepolymer was measured.

Further, the thus obtained fiber-reinforced molding base material was dissolved in 1-chloronaphthalene at 250° C. to obtain carbon fibers and an iron compound as an insoluble portion. From the insoluble portion, the iron compound was isolated and subjected to XAFS measurement to analyze the valence state of the iron compound and the structure in the vicinity of the iron atom. As a result, although a main peak was observed at the position similar to that of iron (II) chloride in the absorption spectrum related to XANES, the shape was different, and in the radial distribution function, a main peak thought to represent the same characteristic as that of iron (III) chloride and iron (II) chloride tetrahydrate was observed at about 0.16 nm, and a subpeak thought to represent the same characteristic as that of iron (II) chloride and iron (II) chloride tetrahydrate was observed at about 0.21 nm. Thus, it was confirmed that iron (II) chloride component which is a divalent iron compound existed together with a trivalent iron compound.

From the thus obtained fiber-reinforced molding base material, a plurality of pieces having a prescribed size were cut out and laminated with their fiber orientations being aligned. The resultant was heat-pressed at 350° C. and 3 MPa for 3 minutes using a press-molding machine and then cooled for 5 minutes using a cooling press machine to obtain a laminated plate. From this laminated plate, a test piece was cut out and subjected to a flexural test in the 0° direction. The processing conditions and the evaluation results are shown in Table 13.

Comparative Example 34

A fiber-reinforced molding base material was produced in the same manner as in Example 37, except that iron (III) oxide was used in place of the (E) low-valent iron compound and that the added amount thereof was changed to 0.5 mol % based on the amount of sulfur atoms contained in the polyphenylene sulfide prepolymer. The fiber-reinforced molding base material obtained by this production method was an extremely rigid unidirectional fiber base material having an impregnation rate of 75% and a basis weight of 75 g/m$^2$. From the thus obtained fiber-reinforced molding base material, polyphenylene sulfide was extracted in the same manner as in Example 35, and the conversion rate of the polyphenylene sulfide prepolymer was measured.

Further, XAFS measurement was carried out to analyze the valence state of the iron compound and the structure in the vicinity of the iron atom. As a result, in the absorption spectrum related to XANES, the shape of the spectrum was similar to that of iron (III) oxide, and in the radial distribution function, peaks thought to be resulting from the Fe—O bond, Fe—Fe bond and so on were observed at about 0.15 nm and at about 0.26 nm, similar to iron (III) oxide. Thus, it was found that the iron compound comprised iron (III) oxide as the main component.

In addition, the thus obtained fiber-reinforced molding base material was press-molded in the same manner as in Example 37 and the resulting molded article was subjected to the respective evaluations. The processing conditions and the evaluation results are shown in Table 13.

Comparative Example 35

A fiber-reinforced molding base material was produced in the same manner as in Example 37, except that the (E) low-valent iron compound was not added. This fiber-reinforced molding base material obtained by this production method was an extremely rigid unidirectional fiber base material having an impregnation rate of 74% and a basis weight of 75 g/m$^2$. From the thus obtained fiber-reinforced molding base material, polyphenylene sulfide was extracted in the same manner as in Example 37, and the conversion rate of the polyphenylene sulfide prepolymer was measured. Further, the thus obtained fiber-reinforced molding base material was press-molded in the same manner as in Example 37 and the resulting molded article was subjected to the respective evaluations. The processing conditions and the evaluation results are shown in Table 13.

Comparative Example 36

A fiber-reinforced molding base material was produced in the same manner as in Example 37, except that thiophenol sodium salt was used in place of the (E) low-valent iron compound. The thus obtained fiber-reinforced molding base material obtained by this production method was an extremely rigid unidirectional fiber base material having an impregnation rate of 74% and a basis weight of 75 g/m$^2$. From the thus obtained fiber-reinforced molding base material, polyphenylene sulfide was extracted in the same manner as in Example 37, and the conversion rate of the polyphenylene sulfide prepolymer was measured. Further, the thus obtained fiber-reinforced molding base material was press-molded in the same manner as in Example 37 and the resulting molded article was subjected to the respective evaluations. The processing conditions and the evaluation results are shown in Table 13.

TABLE 13

|  |  | Example 37 | Comparative Example 34 | Comparative Example 35 | Comparative Example 36 |
|---|---|---|---|---|---|
| (Composition) |  |  |  |  |  |
| Component (A) Continuous reinforcing fibers base material | wt % | 67 | 67 | 67 | 67 |
| Component (B) Polyarylene sulfide prepolymer | wt % | 33 | 33 | 33 | 33 |
| Component (E) Low-valent iron compound | Type | FeCl$_3$ | Fe$_2$O$_3$ | — | PhSNa[2)] |
|  | mol %[1)] | 1 | 0.5 |  | 1 |
| (Properties of polyarylene sulfide (B')) |  |  |  |  |  |
| Weight-average molecular weight |  | — | — | — | — |
| Dispersion degree |  | — | — | — | — |
| Conversion rate | % | 81 | 36 | 44 | 35 |
| (Producing method) |  |  |  |  |  |
| Constitution of the apparatus <Step (I)> |  | [iii] | [iii] | [iii] | [iii] |
| Preheating temperature <Step (II)> | ° C. | 150 | 150 | 150 | 150 |
| Compositing temperature <Step (III)> | ° C. | — | — | — | — |
| Furnace temperature | ° C. | 300 | 300 | 300 | 300 |
| Healing time <Step (IV)> | min | 60 | 60 | 60 | 60 |
| Taking up speed | m/min | 5 | 5 | 5 | 5 |
| Productivity | — | fair | worse | worse | worse |

TABLE 13-continued

|  | | Example 37 | Comparative Example 34 | Comparative Example 35 | Comparative Example 36 |
|---|---|---|---|---|---|
| (Molded article properties) | | | | | |
| Density | | — | 1.47 | 1.47 | 1.47 |
| Flexural modulus | GPa | 123 | 80 | 85 | 83 |
| Flexural strength | MPa | 1600 | 800 | 950 | 810 |

[1])Mol % based on the amount of sulfur atoms contained in PAS
[2])Thiophenol sodium salt From the results of Examples and Comparative Examples that are shown in Table 13, the followings are clear.

It is seen that, since the fiber-reinforced molding base material obtained by the method of producing a fiber-reinforced molding base material of the present invention (Example 37) contains the (E) low-valent iron compound, as compared to those fiber-reinforced molding base materials obtained by the production method of Comparative Examples 34 to 36, in the process of producing the fiber-reinforced molding base material, the conversion rate of the (B) polyarylene sulfide prepolymer into the (6) polyarylene sulfide is high. It is also seen that, because of the high conversion rate of the (B) polyarylene sulfide prepolymer into the (B') polyarylene sulfide in the process of producing the molding material of the present invention prepared in Example 37, the molded article obtained therefrom has excellent mechanical characteristics.

In the molding material according to the present invention, the molding material comprising (B) a polyarylene sulfide prepolymer has excellent fluidity and handling property. Also, when injection-molded, the molding material allows its reinforcing fibers to sufficiently disperse into the resulting molded article, so that a molded article having excellent mechanical characteristics can be easily produced. Therefore, the molding material can be applied to a wide variety of molding methods including injection molding, transfer molding, blow molding, insert molding, plunger molding, press molding, stamping molding and the like, and the scope of the application is not limited to these molding methods.

In the molding material according to the present invention, the molding material comprising the (B') polyarylene sulfide, when injection-molded, allows its reinforcing fibers to sufficiently disperse into the resulting molded article, so that a molded article having excellent heat resistance and mechanical characteristics can be easily produced without causing environmental contamination. Therefore, the molding material can be applied to a wide variety of molding methods including injection molding, transfer molding, blow molding, insert molding, plunger molding, press molding, stamping molding and the like, and the scope of the application is not limited to these molding methods.

The prepreg and the fiber-reinforced composite material of the present invention have a high fiber content and the prepreg has excellent handling property. A fiber-reinforced composite material produced from the prepreg is expected to have excellent mechanical properties, heat resistance and flame retardancy; therefore the fiber-reinforced composite material can be suitably used in aerospace applications and general industrial applications. Particularly, the fiber-reinforced composite material can be suitable used in those laminates for aircrafts, vehicles, ships and electrical/electronic instruments.

The method of producing a fiber-reinforced molding base material according to the present invention is capable of easily compositing a continuous reinforcing fiber substrate with a polyarylene sulfide and, therefore, can improve the economical efficiency and the productivity. This production method of the present invention is useful for producing fiber-reinforced molding base materials such as prepregs, semipregs and fabrics.

DESCRIPTION OF SYMBOLS

1: (A) Reinforcing fiber bundle
2: (B) polyarylene sulfide prepolymer or (B') polyarylene sulfide and (D) zero-valent transition metal compound or (E) low-valent iron compound
3: Composite comprising (A) reinforcing fiber bundle (A), (B) polyarylene sulfide prepolymer or (B') polyarylene sulfide, and (D) zero-valent transition metal compound or (E) low-valent iron compound
4: (C) Thermoplastic resin
5, 21, 41: Roll bar
6: Impregnation bath
7: Rotary roller
8: Hot-air drying furnace
105: Double-belt press
106, 24, 43: Nip roller
107, 26, 45: Infrared heater
108: Pump
9: Chamber
10, 31, 48: Gas inlet port
11, 32, 49: Cooling plate
12: Guillotine cutter
13, 33, 50: Bundle of reinforcing fibers
14, 34, 51: Fiber-reinforced molding base material
22: Belt conveyor
23: Impregnation roller
25, 44: Drum winder
27: Winder for withdrawal
28: Hot roller
29: Roll-up winder
30, 47: Heating chamber
42: Calender roll
46: Metering powder feeder

The invention claimed is:
1. A molding material comprising:
   a composite comprising 1 to 50 wt % of (A) a bundle of continuous reinforcing fibers and 0.1 to 40 wt % of (B) a polyarylene sulfide prepolymer or (B') a polyarylene sulfide; and
   10 to 98.9 wt % of (C) a thermoplastic resin adhered to said composite;
   wherein said composite further comprises (D) a zero-valent transition metal compound in an amount of

0.001 to 20 mol % based on the amount of sulfur atoms contained in said component (B) or (B')

wherein said component (B') is a polyarylene sulfide obtained by heat-polymerization of said component (B), wherein said component (B) comprises a cyclic polyarylene sulfide in an amount of at least 50 wt % and has a weight-average molecular weight of less than 10,000, and wherein said component (B) or (B)' and said (D) zero-valent transition metal compound are a melt-kneaded mixture.

2. The molding material according to claim 1, wherein said component (D) is a compound which comprises a metal belonging to one of Groups 8 to 11 and one of Periods 4 to 6 of periodic table.

3. The molding material according to claim 1, wherein said component (D) is a compound containing palladium and/or nickel.

4. The molding material according to claim 1, wherein said component (B') is a polyarylene sulfide which has a weight-average molecular weight of not less than 10,000 and a dispersion degree, which is represented by weight-average molecular weight/number-average molecular weight, of not higher than 2.5.

5. The molding material according to claim 1, wherein the weight reduction by heating of said component (B') satisfies the following equation:

$$\Delta Wr=(W1-W2)/W1\times 100 \leq 0.20(\%)$$

(wherein, ΔWr represents a weight reduction rate (%) which is calculated from a sample weight (W2) at 330° C. based on a sample weight (W1) at 100° C., the samples weights being determined by a thermogravimetric analysis where said sample is heated from 50° C. to an arbitrary temperature of not lower than 330° C. at a heating rate of 20° C./min in a non-oxidizing atmosphere under atmospheric pressure).

6. The molding material according to claim 1, wherein said component (A) comprises at least 10,000 carbon fiber monofilaments.

7. The molding material according to claim 1, wherein said component (C) is at least one selected from polyamide resins, polyether imide resins, polyamide imide resins, polyether ether ketone resins and polyphenylene sulfide resins.

8. The molding material according to claim 1, wherein said component (A) is arranged substantially parallel to the direction of the shaft center and the length of said component (A) is substantially the same as that of said molding material.

9. The molding material according to claim 8, which has a core-in-sheath structure in which said composite comprising said component (A), said component (B) or (B') and said component (D) or (E) low-valent iron compound constitutes a core structure and said component (C) surrounds said composite.

10. The molding material according to claim 9, which is in the form of a long-fiber pellet.

11. The molding material according to claim 1, wherein the lower limit of the molecular weight of the (B) polyarylene sulfide prepolymer is not less than 500.

12. The molding material according to claim 1, wherein the melting point of the (B) polyarylene sulfide prepolymer is 150 to 250° C.

13. The molding material according to claim 1, wherein the (B') polyarylene sulfide contains substantially no halogen other than chlorine.

14. The molding material according to claim 1, wherein two or more of the (D) zero-valent transition metal compounds are used as a mixture or in combination.

* * * * *